(12) United States Patent
Bakalash et al.

(10) Patent No.: US 8,041,670 B2
(45) Date of Patent: Oct. 18, 2011

(54) DATA AGGREGATION MODULE SUPPORTING DYNAMIC QUERY RESPONSIVE AGGREGATION DURING THE SERVICING OF DATABASE QUERY REQUESTS PROVIDED BY ONE OR MORE CLIENT MACHINES

(75) Inventors: Reuven Bakalash, Shdema (IL); Guy Shaked, Beer Sheva (IL); Joseph Caspi, Herzlyia (IL)

(73) Assignee: Yanicklo Technology Limited Liability Company, Wilmington, DE (US)

( * ) Notice: Subject to any disclaimer, the term of this patent is extended or adjusted under 35 U.S.C. 154(b) by 0 days.

(21) Appl. No.: 12/657,143

(22) Filed: Jan. 14, 2010

(65) Prior Publication Data

US 2010/0185581 A1    Jul. 22, 2010

Related U.S. Application Data

(63) Continuation of application No. 11/818,944, filed on Aug. 3, 2007, now abandoned, which is a continuation of application No. 10/854,034, filed on May 25, 2004, now abandoned, which is a continuation of application No. 10/153,164, filed on May 21, 2002, now abandoned, which is a continuation of application No. 09/514,611, filed on Feb. 28, 2000, now Pat. No. 6,434,544, which is a continuation-in-part of application No. 09/368,241, filed on Aug. 4, 1999, now Pat. No. 6,408,292.

(51) Int. Cl.
*G06F 17/30* (2006.01)
*G06F 7/00* (2006.01)
(52) U.S. Cl. .................. 707/603; 707/736; 707/770
(58) Field of Classification Search .................. None
See application file for complete search history.

(56) References Cited

U.S. PATENT DOCUMENTS 4,590,465 A    5/1986    Fuchs
(Continued)

FOREIGN PATENT DOCUMENTS

EP    0 314 279    5/1989
(Continued)

OTHER PUBLICATIONS

Scheuermann, P., J. Shim and R. Vingralek "Watchman: A Data Warehouse Intelligent Cache Manager", Proceedings of the 22nd International Conference on Very Large Databases (VLDB), 1996, pp. 51-62.*

(Continued)

*Primary Examiner* — Luke S Wassum
(74) *Attorney, Agent, or Firm* — Knobbe, Martens, Olson & Bear LLP

(57) ABSTRACT

Improved method of and apparatus for aggregating data elements in multidimensional databases (MDDB). In the preferred embodiment, the apparatus is realized in the form of a high-performance stand-alone (i.e. external) aggregation server which can be plugged-into conventional MOLAP systems to achieve significant improvements in system performance. In accordance with the principles of the present invention, the stand-alone aggregation server contains a scalable MDDB and a high-performance aggregation engine that are integrated into the modular architecture of the aggregation server. The stand-alone aggregation server of the present invention can uniformly distribute data elements among a plurality of processors, for balanced loading and processing, and therefore is highly scalable. The stand-alone aggregation server of the present invention can be used to realize (i) an improved MDDB for supporting on-line analytical processing (OLAP) operations, (ii) an improved Internet URL Directory for supporting on-line information searching operations by Web-enabled client machines, as well as (iii) diverse types of MDDB-based systems for supporting real-time control of processes in response to complex states of information reflected in the MDDB.

13 Claims, 28 Drawing Sheets

U.S. PATENT DOCUMENTS

| | | |
|---|---|---|
| 4,598,400 A | 7/1986 | Hillis |
| 4,641,351 A | 2/1987 | Preston, Jr. |
| 4,685,144 A | 8/1987 | McCubbrey et al. |
| 4,814,980 A | 3/1989 | Peterson et al. |
| 4,868,733 A | 9/1989 | Fujisawa et al. |
| 4,985,834 A | 1/1991 | Cline et al. |
| 4,985,856 A | 1/1991 | Kaufman et al. |
| 4,987,554 A | 1/1991 | Kaufmann |
| 4,989,141 A | 1/1991 | Lyons et al. |
| 5,095,427 A | 3/1992 | Tanaka et al. |
| 5,101,475 A | 3/1992 | Kaufman et al. |
| 5,189,608 A | 2/1993 | Lyons et al. |
| 5,197,005 A | 3/1993 | Shwartz et al. |
| 5,202,985 A | 4/1993 | Goyal |
| 5,222,216 A | 6/1993 | Parish et al. |
| 5,222,237 A | 6/1993 | Hillis |
| 5,257,365 A | 10/1993 | Powers et al. |
| 5,278,966 A | 1/1994 | Parks et al. |
| 5,280,474 A | 1/1994 | Nickolls et al. |
| 5,293,615 A | 3/1994 | Amada |
| 5,297,265 A | 3/1994 | Frank et al. |
| 5,297,280 A | 3/1994 | Potts, Sr. et al. |
| 5,299,321 A | 3/1994 | Iizuka |
| 5,307,484 A | 4/1994 | Baker et al. |
| 5,359,724 A | 10/1994 | Earle |
| 5,361,385 A | 11/1994 | Bakalash |
| 5,379,419 A | 1/1995 | Heffernan et al. |
| 5,381,518 A | 1/1995 | Drebin et al. |
| 5,386,556 A | 1/1995 | Hedin et al. |
| 5,404,506 A | 4/1995 | Fujisawa et al. |
| 5,410,693 A | 4/1995 | Yu et al. |
| 5,519,859 A | 5/1996 | Grace |
| 5,553,226 A | 9/1996 | Kiuchi et al. |
| 5,555,408 A | 9/1996 | Fujisawa et al. |
| 5,696,916 A | 12/1997 | Yamazaki et al. |
| 5,706,495 A | 1/1998 | Chadha et al. |
| 5,706,503 A | 1/1998 | Poppen et al. |
| 5,721,910 A | 2/1998 | Unger et al. |
| 5,742,806 A | 4/1998 | Reiner et al. |
| 5,745,764 A * | 4/1998 | Leach et al. ................ 719/316 |
| 5,751,928 A | 5/1998 | Bakalash |
| 5,761,652 A | 6/1998 | Wu et al. |
| 5,765,028 A | 6/1998 | Gladden |
| 5,767,854 A | 6/1998 | Anwar |
| 5,781,896 A * | 7/1998 | Dalal ................ 707/999.001 |
| 5,794,228 A | 8/1998 | French et al. |
| 5,794,229 A | 8/1998 | French et al. |
| 5,794,246 A | 8/1998 | Sankaran et al. |
| 5,799,300 A | 8/1998 | Agrawal et al. |
| 5,805,885 A * | 9/1998 | Leach et al. ................ 719/316 |
| 5,822,751 A * | 10/1998 | Gray et al. ............ 707/999.003 |
| 5,832,475 A | 11/1998 | Agrawal et al. |
| 5,848,424 A * | 12/1998 | Scheinkman et al. ........ 715/210 |
| 5,850,547 A | 12/1998 | Waddington et al. |
| 5,852,819 A | 12/1998 | Beller |
| 5,852,821 A | 12/1998 | Chen et al. |
| 5,857,184 A * | 1/1999 | Lynch ................ 707/999.001 |
| 5,864,857 A | 1/1999 | Ohata et al. |
| 5,867,501 A | 2/1999 | Horst et al. |
| 5,884,299 A | 3/1999 | Ramesh et al. |
| 5,890,151 A | 3/1999 | Agrawal et al. |
| 5,890,154 A | 3/1999 | Hsiao et al. |
| 5,901,287 A | 5/1999 | Bull et al. |
| 5,905,985 A | 5/1999 | Malloy et al. |
| 5,915,257 A | 6/1999 | Gartung et al. |
| 5,918,225 A | 6/1999 | White et al. |
| 5,918,232 A | 6/1999 | Pouschine et al. |
| 5,926,818 A | 7/1999 | Malloy |
| 5,926,820 A | 7/1999 | Agrawal et al. |
| 5,937,410 A | 8/1999 | Shen |
| 5,940,818 A | 8/1999 | Malloy et al. |
| 5,940,822 A | 8/1999 | Haderie et al. |
| 5,943,668 A | 8/1999 | Malloy et al. |
| 5,943,677 A | 8/1999 | Hicks |
| 5,946,692 A | 8/1999 | Faloutsos et al. |
| 5,946,711 A | 8/1999 | Donnelly |
| 5,963,212 A | 10/1999 | Bakalash |
| 5,963,936 A | 10/1999 | Cochrane et al. |
| 5,974,416 A | 10/1999 | Anand et al. |
| 5,978,788 A | 11/1999 | Castelli et al. |
| 5,978,796 A | 11/1999 | Malloy et al. |
| 5,987,467 A | 11/1999 | Ross et al. |
| 5,990,892 A | 11/1999 | Urbain |
| 5,991,754 A | 11/1999 | Raitto et al. |
| 5,999,192 A | 12/1999 | Selfridge et al. |
| 6,003,024 A | 12/1999 | Bair et al. |
| 6,003,029 A | 12/1999 | Agrawal et al. |
| 6,003,036 A | 12/1999 | Martin |
| 6,006,216 A | 12/1999 | Griffin et al. |
| 6,009,432 A | 12/1999 | Tarin |
| 6,014,670 A | 1/2000 | Zamanian et al. |
| 6,023,695 A | 2/2000 | Osborn et al. |
| 6,034,697 A | 3/2000 | Becker |
| 6,041,103 A | 3/2000 | LePorta et al. |
| 6,047,323 A | 4/2000 | Krause |
| 6,064,999 A | 5/2000 | Dalal |
| 6,073,140 A | 6/2000 | Morgan et al. |
| 6,078,918 A | 6/2000 | Allen et al. |
| 6,078,924 A | 6/2000 | Ainsbury et al. |
| 6,078,994 A | 6/2000 | Carey |
| 6,094,651 A | 7/2000 | Agrawal et al. |
| 6,108,647 A | 8/2000 | Poosala et al. |
| 6,115,705 A | 9/2000 | Larson |
| 6,115,714 A | 9/2000 | Gallagher et al. |
| 6,122,628 A | 9/2000 | Castelli et al. |
| 6,122,636 A | 9/2000 | Malloy et al. |
| 6,125,624 A | 10/2000 | Prociw |
| 6,134,541 A | 10/2000 | Castelli et al. |
| 6,141,655 A | 10/2000 | Johnson et al. |
| 6,151,584 A | 11/2000 | Papierniak et al. |
| 6,151,601 A | 11/2000 | Papierniak et al. |
| 6,154,766 A | 11/2000 | Yost et al. |
| 6,161,103 A | 12/2000 | Rauer et al. |
| 6,163,774 A | 12/2000 | Lore et al. |
| 6,167,396 A | 12/2000 | Lokken |
| 6,173,310 B1 | 1/2001 | Yost et al. |
| 6,182,060 B1 | 1/2001 | Hedgcock et al. |
| 6,182,061 B1 | 1/2001 | Matsuzawa et al. |
| 6,182,062 B1 | 1/2001 | Fujisawa et al. |
| 6,189,004 B1 | 2/2001 | Rasen et al. |
| 6,199,063 B1 | 3/2001 | Colby et al. |
| 6,205,447 B1 | 3/2001 | Malloy |
| 6,208,975 B1 | 3/2001 | Bull et al. |
| 6,209,036 B1 | 3/2001 | Aldred et al. |
| 6,212,515 B1 | 4/2001 | Rogers |
| 6,212,524 B1 | 4/2001 | Weissman et al. |
| 6,212,617 B1 | 4/2001 | Hardwick |
| 6,219,654 B1 | 4/2001 | Ruffin |
| 6,223,573 B1 | 5/2001 | Grewal et al. |
| 6,226,647 B1 | 5/2001 | Venkatasu-bramanian et al. |
| 6,249,791 B1 | 6/2001 | Osborn et al. |
| 6,256,676 B1 | 7/2001 | Taylor et al. |
| 6,260,050 B1 | 7/2001 | Yost et al. |
| 6,269,393 B1 | 7/2001 | Yost et al. |
| 6,275,818 B1 | 8/2001 | Subramanian et al. |
| 6,282,544 B1 | 8/2001 | Tse et al. |
| 6,285,994 B1 | 9/2001 | Bui et al. |
| 6,289,334 B1 | 9/2001 | Reiner et al. |
| 6,289,352 B1 | 9/2001 | Proctor |
| 6,301,579 B1 | 10/2001 | Becker |
| 6,317,750 B1 | 11/2001 | Tortolani et al. |
| 6,321,206 B1 | 11/2001 | Honarvar |
| 6,321,241 B1 | 11/2001 | Gartung et al. |
| 6,324,533 B1 | 11/2001 | Agrawal et al. |
| 6,324,623 B1 | 11/2001 | Carey |
| 6,330,564 B1 | 12/2001 | Hellerstein et al. |
| 6,332,130 B1 | 12/2001 | Notani et al. |
| 6,339,775 B1 | 1/2002 | Zamanian et al. |
| 6,356,900 B1 | 3/2002 | Egilsson et al. |
| 6,363,353 B1 | 3/2002 | Chen |
| 6,363,393 B1 | 3/2002 | Ribitzky |
| 6,366,905 B1 | 4/2002 | Netz |
| 6,366,922 B1 | 4/2002 | Althoff |
| 6,374,234 B1 | 4/2002 | Netz |
| 6,374,263 B1 | 4/2002 | Bunger et al. |
| 6,377,934 B1 | 4/2002 | Chen et al. |
| 6,381,605 B1 | 4/2002 | Kothuri et al. |

| Patent No. | Date | Inventor | Class |
|---|---|---|---|
| 6,385,301 B1 | 5/2002 | Nolting et al. | |
| 6,385,604 B1 * | 5/2002 | Bakalash et al. | 707/999.003 |
| 6,397,195 B1 | 5/2002 | Pinard et al. | |
| 6,401,117 B1 | 6/2002 | Narad et al. | |
| 6,405,173 B1 | 6/2002 | Honarvar et al. | |
| 6,405,207 B1 | 6/2002 | Petculescu et al. | |
| 6,405,208 B1 | 6/2002 | Raghavan et al. | |
| 6,408,292 B1 * | 6/2002 | Bakalash et al. | 707/999.002 |
| 6,411,313 B1 | 6/2002 | Conlon et al. | |
| 6,411,681 B1 | 6/2002 | Nolting et al. | |
| 6,411,961 B1 | 6/2002 | Chen | |
| 6,418,427 B1 | 7/2002 | Egilsson et al. | |
| 6,418,450 B2 | 7/2002 | Daudenarde | |
| 6,421,730 B1 | 7/2002 | Narad et al. | |
| 6,424,979 B1 | 7/2002 | Livingston et al. | |
| 6,430,545 B1 | 8/2002 | Honarvar et al. | |
| 6,430,547 B1 | 8/2002 | Busche et al. | |
| 6,434,544 B1 * | 8/2002 | Bakalash et al. | 707/999.002 |
| 6,434,557 B1 | 8/2002 | Egilsson et al. | |
| 6,438,537 B1 | 8/2002 | Netz et al. | |
| 6,441,834 B1 * | 8/2002 | Agassi et al. | 715/764 |
| 6,442,269 B1 | 8/2002 | Ehrlich et al. | |
| 6,442,560 B1 | 8/2002 | Berger et al. | |
| 6,446,059 B1 | 9/2002 | Berger et al. | |
| 6,446,061 B1 | 9/2002 | Doerre et al. | |
| 6,453,322 B1 | 9/2002 | DeKimpe et al. | |
| 6,456,999 B1 | 9/2002 | Netz | |
| 6,460,026 B1 | 10/2002 | Pasumansky | |
| 6,460,031 B1 | 10/2002 | Wilson et al. | |
| 6,470,344 B1 | 10/2002 | Kothuri et al. | |
| 6,473,750 B1 | 10/2002 | Petculescu et al. | |
| 6,473,764 B1 | 10/2002 | Petculescu et al. | |
| 6,477,536 B1 | 11/2002 | Pasumansky et al. | |
| 6,480,842 B1 * | 11/2002 | Agassi et al. | 707/999.004 |
| 6,480,848 B1 | 11/2002 | DeKimpe et al. | |
| 6,480,850 B1 | 11/2002 | Veldhuisen | |
| 6,484,179 B1 * | 11/2002 | Roccaforte | 707/737 |
| 6,487,547 B1 | 11/2002 | Ellison et al. | |
| 6,493,718 B1 | 12/2002 | Petculescu et al. | |
| 6,493,723 B1 | 12/2002 | Busche | |
| 6,493,728 B1 | 12/2002 | Berger | |
| 6,510,457 B1 | 1/2003 | Ayukawa et al. | |
| 6,513,019 B2 | 1/2003 | Lewis | |
| 6,532,458 B1 | 3/2003 | Chaudhuri et al. | |
| 6,535,866 B1 | 3/2003 | Iwadate | |
| 6,535,868 B1 | 3/2003 | Galeazzi et al. | |
| 6,535,872 B1 | 3/2003 | Castelli et al. | |
| 6,542,886 B1 | 4/2003 | Chaudhuri et al. | |
| 6,542,895 B1 | 4/2003 | DeKimpe et al. | |
| 6,545,589 B1 | 4/2003 | Fuller et al. | |
| 6,546,395 B1 | 4/2003 | DeKimpe et al. | |
| 6,546,545 B1 | 4/2003 | Honarvar et al. | |
| 6,549,907 B1 | 4/2003 | Fayyad et al. | |
| 6,557,008 B1 | 4/2003 | Temple et al. | |
| 6,560,594 B2 | 5/2003 | Cochrane et al. | |
| 6,567,796 B1 | 5/2003 | Yost et al. | |
| 6,567,814 B1 | 5/2003 | Bankier et al. | |
| 6,581,054 B1 | 6/2003 | Bogrett | |
| 6,581,068 B1 | 6/2003 | Bensoussan et al. | |
| 6,587,547 B1 | 7/2003 | Zirngibl et al. | |
| 6,587,857 B1 | 7/2003 | Carothers et al. | |
| 6,594,672 B1 | 7/2003 | Lampson et al. | |
| 6,601,034 B1 | 7/2003 | Honarvar et al. | |
| 6,601,062 B1 | 7/2003 | Deshpande | |
| 6,604,135 B1 | 8/2003 | Rogers et al. | |
| 6,606,638 B1 | 8/2003 | Tarin | |
| 6,609,120 B1 | 8/2003 | Honarvar et al. | |
| 6,615,096 B1 | 9/2003 | Durrant et al. | |
| 6,628,312 B1 | 9/2003 | Rao et al. | |
| 6,629,094 B1 | 9/2003 | Colby | |
| 6,633,875 B2 | 10/2003 | Brady | |
| 6,636,870 B2 * | 10/2003 | Roccaforte | 707/999.002 |
| 6,643,608 B1 | 11/2003 | Hershey et al. | |
| 6,643,661 B2 | 11/2003 | Polizzi et al. | |
| 6,662,174 B2 | 12/2003 | Shah et al. | |
| 6,671,715 B1 | 12/2003 | Langseth et al. | |
| 6,677,963 B1 | 1/2004 | Mani et al. | |
| 6,678,674 B1 | 1/2004 | Saeki | |
| 6,691,118 B1 | 2/2004 | Gongwer et al. | |
| 6,691,140 B1 | 2/2004 | Bogrett | |
| 6,694,316 B1 | 2/2004 | Langseth et al. | |
| 6,707,454 B1 | 3/2004 | Barg et al. | |
| 6,708,155 B1 | 3/2004 | Honarvar et al. | |
| 6,732,115 B2 | 5/2004 | Shah et al. | |
| 6,738,975 B1 | 5/2004 | Yee et al. | |
| 6,748,394 B2 | 6/2004 | Shah et al. | |
| 6,763,357 B1 | 7/2004 | Deshpande et al. | |
| 6,766,325 B1 | 7/2004 | Pasumansky et al. | |
| 6,775,674 B1 * | 8/2004 | Agassi et al. | 707/999.001 |
| 6,778,996 B2 * | 8/2004 | Roccaforte | 707/600 |
| 6,801,908 B1 | 10/2004 | Fuloria et al. | |
| 6,816,854 B2 | 11/2004 | Reiner et al. | |
| 6,826,593 B1 | 11/2004 | Acharya et al. | |
| 6,832,263 B2 | 12/2004 | Polizzi et al. | |
| 6,836,894 B1 | 12/2004 | Hellerstein et al. | |
| 6,842,758 B1 | 1/2005 | Bogrett | |
| 6,867,788 B1 | 3/2005 | Takeda | |
| 6,898,603 B1 | 5/2005 | Petculescu et al. | |
| 6,934,687 B1 | 8/2005 | Papierniak et al. | |
| 6,947,934 B1 | 9/2005 | Chen et al. | |
| 7,096,219 B1 | 8/2006 | Karch | |
| 7,315,849 B2 * | 1/2008 | Bakalash et al. | 707/999.002 |
| 7,333,982 B2 * | 2/2008 | Bakalash et al. | 707/600 |
| 7,392,248 B2 * | 6/2008 | Bakalash et al. | 707/999.005 |
| 7,529,730 B2 | 5/2009 | Potter et al. | |
| 7,778,899 B2 * | 8/2010 | Scumniotales et al. | 705/35 |
| 7,853,508 B2 * | 12/2010 | Scumniotales et al. | 705/36 R |
| 2001/0013030 A1 * | 8/2001 | Colby et al. | 707/1 |
| 2002/0016924 A1 | 2/2002 | Shah et al. | |
| 2002/0023122 A1 | 2/2002 | Polizzi et al. | |
| 2002/0029207 A1 * | 3/2002 | Bakalash et al. | 707/1 |
| 2002/0038229 A1 | 3/2002 | Shah et al. | |
| 2002/0038297 A1 | 3/2002 | Shah et al. | |
| 2002/0077997 A1 * | 6/2002 | Colby et al. | 707/1 |
| 2002/0091707 A1 * | 7/2002 | Keller | 707/104.1 |
| 2002/0099692 A1 | 7/2002 | Shah et al. | |
| 2002/0129003 A1 * | 9/2002 | Bakalash et al. | 707/1 |
| 2002/0129032 A1 * | 9/2002 | Bakalash et al. | 707/101 |
| 2002/0143783 A1 * | 10/2002 | Bakalash et al. | 707/100 |
| 2002/0184187 A1 * | 12/2002 | Bakalash et al. | 707/1 |
| 2002/0194167 A1 * | 12/2002 | Bakalash et al. | 707/3 |
| 2003/0018642 A1 * | 1/2003 | Bakalash et al. | 707/10 |
| 2003/0055832 A1 * | 3/2003 | Roccaforte | 707/100 |
| 2003/0200221 A1 * | 10/2003 | Bakalash et al. | 707/100 |
| 2003/0208503 A1 * | 11/2003 | Roccaforte | 707/101 |
| 2003/0217079 A1 * | 11/2003 | Bakalash et al. | 707/200 |
| 2003/0225736 A1 * | 12/2003 | Bakalash et al. | 707/1 |
| 2003/0225752 A1 * | 12/2003 | Bakalash et al. | 707/3 |
| 2003/0229652 A1 * | 12/2003 | Bakalash et al. | 707/200 |
| 2004/0073566 A1 | 4/2004 | Trivedi | |
| 2004/0236655 A1 * | 11/2004 | Scumniotales et al. | 705/36 |
| 2004/0243607 A1 * | 12/2004 | Tummalapalli | 707/100 |
| 2004/0247105 A1 | 12/2004 | Mullis et al. | |
| 2005/0038799 A1 * | 2/2005 | Jordan et al. | 707/100 |
| 2005/0055329 A1 * | 3/2005 | Bakalash et al. | 707/1 |
| 2005/0060325 A1 * | 3/2005 | Bakalash et al. | 707/100 |
| 2005/0060326 A1 * | 3/2005 | Bakalash et al. | 707/100 |
| 2005/0065940 A1 * | 3/2005 | Bakalash et al. | 707/100 |
| 2005/0076067 A1 * | 4/2005 | Bakalash et al. | 707/200 |
| 2005/0091237 A1 * | 4/2005 | Bakalash et al. | 707/100 |
| 2005/0114243 A1 * | 5/2005 | Scumniotales et al. | 705/35 |
| 2005/0149491 A1 * | 7/2005 | Bakalash et al. | 707/2 |
| 2007/0192295 A1 * | 8/2007 | Bakalash et al. | 707/3 |
| 2007/0233644 A1 * | 10/2007 | Bakalash et al. | 707/2 |
| 2008/0016043 A1 * | 1/2008 | Bakalash et al. | 707/3 |
| 2008/0016057 A1 * | 1/2008 | Bakalash et al. | 707/5 |
| 2008/0021864 A1 * | 1/2008 | Bakalash et al. | 707/1 |
| 2008/0021893 A1 * | 1/2008 | Bakalash et al. | 707/4 |
| 2008/0021915 A1 * | 1/2008 | Bakalash et al. | 707/101 |
| 2008/0059415 A1 * | 3/2008 | Bakalash et al. | 707/2 |
| 2008/0211817 A1 * | 9/2008 | Bakalash et al. | 345/505 |
| 2009/0076983 A1 * | 3/2009 | Scumniotales et al. | 705/36 R |
| 2009/0077107 A1 * | 3/2009 | Scumniotales et al. | 707/100 |
| 2009/0271379 A1 | 10/2009 | Bakalash et al. | |
| 2009/0271384 A1 | 10/2009 | Bakalash et al. | |
| 2009/0276410 A1 | 11/2009 | Bakalash et al. | |
| 2010/0042645 A1 | 2/2010 | Bakalash et al. | |

| | | | |
|---|---|---|---|
| 2010/0063958 | A1 | 3/2010 | Bakalash et al. |
| 2010/0100558 | A1 | 4/2010 | Bakalash et al. |
| 2010/0185581 | A1 | 7/2010 | Bakalash et al. |

FOREIGN PATENT DOCUMENTS

| | | |
|---|---|---|
| EP | 0 657 052 | 6/1995 |
| EP | 0 743 609 | 11/1996 |
| EP | 0336 584 | 2/1997 |
| EP | 0 869 444 | 10/1998 |
| EP | 1 266 308 | 12/2002 |
| JP | 9-265479 | 10/1997 |
| JP | 2001-565050 | 2/2001 |
| WO | WO 91/19269 | 12/1991 |
| WO | WO 94/004991 | 3/1994 |
| WO | WO 95/08794 | 3/1995 |
| WO | WO 98/22908 | 5/1998 |
| WO | WO 9822908 A1 * | 5/1998 |
| WO | WO 98/40829 | 9/1998 |
| WO | WO 98/49636 | 11/1998 |
| WO | WO 99/09492 | 2/1999 |
| WO | WO 01/011497 | 2/2001 |
| WO | WO 01/67303 | 9/2001 |

OTHER PUBLICATIONS

Mumick, I.S., D. Quass and B.S. Mumick "Maintenance of Data Cubes and Summary Tables in a Data Warehouse", ACM SIGMOD Record, vol. 26, No. 2, Jun. 1997, pp. 100-111.*

Kotidis, Y. and N. Roussopoulos "DynaMat: A Dynamic View Management System for Data Warehouses", Proceedings of ACM SIGMOD International Conference on Management of Data, Jun. 1-3, 1999.* comp.databases' website re Access DBMS? Not RDBMS? Jun. 1994.

Brady, C. et al.: comp.databases' website re Access DBMS? Not RDBMS? Comp.databases.Ms-access newsgroup thred Jun. 9, 1994.

Rana, et al., A Distributed Framework for Parallel Data Mining Using HP Java, BT technol J vol. 17 No. 3 Jul. 1999.

Rana, et al., A Distributed Framework for Parallel Data Mining Using HP Java, BT technol J vol. 17 No. 3 Jul. 1999. pp. 146-154.

Windows IT Pro's website re A New Kid on the OLAP Block by Karen Watterson, May 1, 1998.

Schumacher, Robin. BrioQuery Enterprise 4.0; Brio Technology's desktop OLAP tool, lexis.com; DBMS Magazine, vol. 9, No. 10, Sep. 1996.

Michael, J., et al. DM Review's website re Charles Schwab Plans for Continued Prosperity with Seagate Holos Oct. 1998.

Craig, Robert. Checking out OLAP Architectures; Technology Information.lexis, vol. 2, No. 12, Aug. 20, 1997.

Craig, Robert: "Checking Out OLAP Architectures: Technology Information", a Boucher Communications, Inc. publication, Section No. 12, nol. 2; 1997; p. 40, ISSN: 1085-2395.

Spitzer, Tom. Component architectures; component-based software development; technology information, Lexis, DBMS Magazine, vol. 10, No. 10, Sep. 1997.

Winter, R., Intelligent Enterprise's website re Databases: Back in the OLAP Game, vol. 1, No. 4, Dec. 15, 1998.

Kurz, Andreas, A Min Tjoa, Data Warehousing within Intranet: Prototype of a Web•based Executive Information System, Abstract, 1997.

Kurz, Andreas, A Min Tjoa, Data Warehousing within Intranet: Prototype of a Web•based Executive Information System, Abstract, 1997. pp. 627-632.

Elkins, S.B.. Islands of OLAP, DBMS Magazine, Apr. 1998.

Mckie, S., dbmsmag's website re What's New in 4.0, DBMS Magazine, Jul. 1996.

Reimers, How to Sort Through the OLAP Maze, Lexis, Software Magazine, vol. 17, No. 5, May 1997.

Bontempo et al., The IBM Data Warehouse Architecture, Communications of the ACM (vol. 41 No. 9), Sep. 1998.

Bontempo et al., The IBM Data Warehouse Architecture, Communications of the ACM (vol. 41 No. 9), Sep. 1998. pp. 38-48.

Davis, Judith. IBM's DB2 Spatial Extender: Managing Geo-Spatial Information Within the DBMS, IBM corporation, May 1998.

Information Builders Intros "Fusion" MODS Warehouse, Post•Newsweek Business Information Inc. Lexis, May 16, 1996.

Mattison, R.: A White Paper—Maximizing Database Performance with the OMNIDEX Query Accelerator 1998.

Chen et al., OLAP-Based Scalable Profiling of Customer Behavior, Abstract, 1999.

Chen et al., OLAP-Based Scalable Profiling of Customer Behavior, Abstract, DaWak '99 LNCS 1676 pp. 55-64 1999.

Pendse, N., The OLAP Report's website OLAP Architectures, 2005.

Pendse, N., The OLAP Report's website OLAP Architectures, Feb. 11, 2005.

Greenberg, Ilan. OLAP or ROLAP, InfoWorld, Jun. 10, 1996.

Pendse, N. The OLAP Report's website re Database Explosion, 1998.

Pendse, N. The OLAP Report's website re Database Explosion, Oct. 18, 1998.

Comp.databases' websites re OLAP Storage Algorithms, 1997.

Comp.databases' website re OLAP Storage Algorithms, Comp. database.olap newsgroup thread Apr. 1, 1997.

Biggs, Maggie. Pilot lands Impressive OLAP Suite, Product Reviews, Infoworld, vol. 20, No. 36, Sep. 7, 1998.

Codd et al., Providing OLAP to User-Analysts: An ITS Mandate. Hyperion Solutions Corporation 1993.

Harrington, et al.: "Relational Database Design Clearly Explained"; 1998, p. v-xiii, 1-62, Morgan Kaufman.

blgate.c1's website re Seagate Holos Roadmap 1997.

Yoshizawa et al., Sal Based Association Rule Mining Using Commercial RDBMS (IBM DB2 UDB EEE) Abstract, 2000.

Yoshizawa et al., SQL Based Association Rule Mining Using Commericial RDBMS (IBM DB2 UDB EEE) Da Wak 2000 LNCS 1874 pp. 301-306 2000.

Spinner, Karen. Unlocking the Data Warehouse with OLAP, Wall Street & Te chnology, vol. 15, No. 1, Jan. 1, 1997, p. PD18.

Taylor, The Warehouse Meets the Web, The Data Administration Newsletter (Mar. 21, 2005).

Nadeau et al., Achieving Scalability in OLAP Materialized View Selection (Extended Version), (2002).

Nadeau et al., Achieving Scalaboloty in OLAP Materialized View Selection (Extended Version, (2002) Proceedings of DOLAP '02 Nov. 8, 2002.

Whitney, R. Windows IT Pro Webs ite Page re: SOL Server Analysis Services 8.0, May 2000.

Radsen, Boost Warehouse Performance Technology Tutorial Part II (2002).

Rowe et al., Data Abstration, Views and Updates in Rigel (1979).

Rowe, et al., "Data Abstraction, Views and Updates in Rigel", Proceedings of the 1979 ACM Sigmod International Conference on Management of Data, pp. 71-81, 1979.

Graefe, DataCube: An Integrated Data and Compute Server Based on a Hypercube-Connected Dataflow Database Machine, Oregon Graduate Center (Jul. 1988).

Berson, et al, Data Warehousing, Data Mining, and OLAP, McGraw-Hill Companies, 1997, pp. 104-107.

Berson and Smith, Data Warehousing, Data Mining, and OLAP, McGraw-Hill Companies, 1997, pp. 98-100.

Watterson, K. Windows IT Pro Website p. re: DB2 OLAP Server 1.0, Sep. 1998.

Kalman, D. et al., DBMS Online's website re Sybase Inco's Dennis McEvoy—System 11 Strategy, Oct. 1995.

Mohan, DWMS: Data Warehousing Management System, Software AG of Far East, Inc., Proceedings of the 22nd VLDB Conference, 1996, pp. 588-.

Sbt's website re Data Management—A Bedtime Story for Database Managers 1990.

Data Sheet—Designed and Optimized for Business-Critical Data Warehousing, Informix Red Brick Warehouse 1999.

Website re Introduction to OLE DB for OLAP, 2005.

Microsoft website re Introduction to OLE DB for OLAP 2005.

Lau., Microsoft SQL Server 7.0 Performance Tuning Guide, SQL7 performance tuning.doc, Oct. 1998.

Lyco's website re prices on Microsoft SQL Server 7.0 for PC Sep. 11, 2005.

Gimarc and Spellman., Modeling Microsoft SQL Server 7.0, Abstract—SES Proceedings of CMG '98, Dec. 6-11, 1998.

Andrews, D. byte's website re Jeff Stamen, senior vice president of Oracle's OLAP division, discusses the convergence of multidimensional and relational OLAP databases, Aug. 1996.
Margaritis et al., Netcube: A Scalable Tool for Fast Data Mining and Compression, Abstract—Carnegie Mellon University, Proceedings of the 27th VLDB Conference 2001.
Pfeiff, B., Windowsitpro's website re OLAP: Resistance is Futile!, Apr. 1999.
Database olap's website re OLAP with Regression Analysis, Built for Analysts? Jun. 1990.
Brain, J. comp.databases.olap's newsgroup thread databases.olapss website re OLAP with Regression Analysis, Built for Analysts? Jun. 17, 1996.
Elkins., Open OLAP, DBMS, Apr. 1998.
Elkins., Open OLAP, DBMS, Apr. 1998, http://www.dbmsmag.com/9804d14.html, pp. 1-7.
Endress., Oracle 9i OLAP Release 2: A Relational-Multidimensional Database for Business Intelligence, Oracle Apr. 2001.
Oracle Express Relational Access Manager, A Source-Transparent Decision Support Solution 1998.
Oracle Express Server, Enhanced Corporate Performance 1998.
White Paper—Delivering OLAP to the Enterprise. Oracle Jan. 1997.
databases.olap's website re Oracle for reporting?, Nov. 2002.
comp.databases.olap newsgroup thread databases.olap's website re Oracle for reporting? Nov. 7, 2002.
PartitionAggregationss7.txt May 11, 2005.
Lexis—Red Brick, Accrue to embed Red Brick Warehouse RDBMS in online user response analysis system, M2 Presswire Dec. 11, 1996.
Colby et al., "Red Brick Vista™: Aggregate Computation and Management", Data Engineering, 1998. Proceedings, 14th International Conference on Orlando, FL, USA Feb. 23-27, 1998, Los Alamitos, CA USA, IEEE Comput. Soc, US, Feb. 23, 1998, pp. 174-177.
DBMS online's website re Red Brick Warehouse 5.1, Relational data warehousing and data mining are reaching new heights, Jun. 1998.
Rennhackkamp, J, DBMS online's website re Red Brick Warehouse 5.1, Relational data warehousing and data mining are reaching new heights Jun. 1998.
White Paper—Extending the Scale, Reach, and Range of Your Data Warehouse, Next-Generation Data Warehousing, Sybase Interactive Warehouse 1997.
DBMSmag's website re A Black Eye Heals as Sybase System 11 Recovers from Performance and Quality Problems in System 10, Nov. 1996.
DBMSmag's website re A Black Eye Heals as Sybase System 11 Recovers from Performance and Quality Problems in System 10, DMBS Magazine Nov. 1996.
Rennhackkamp, M. DBMSmag's website re A Black Eye Heals as Sybase 11Recovers from Performance and Quality Problems in System Nov. 10, 1996.
DBMS online's website re An Interactive Warehousing Architecture Can Extend the Scale of Your Information, Aug. 1997.
DBMS online's website re An Interactive Warehousing Architecture Can Extend the Scale of Your Information, DMBS Magazine, Aug. 1997.
Rennhackkamp, M. DBMS online's website re An Interactive Warehousing Architecture Can Extend the Scale of Your Information Aug. 1997.
Lexis—The Informix Enterprise Strategy, Information Access Company, DBMS Magazine, vol. 9, No. 7, p. 42, Jun. 1996.
McKie, S.—The Informix Enterprise Strategy, Information Access Company, DBMS Magazine vol. 9 No. 7 p. 42 Jun. 1996.
McKie, S.—The Informix Enterprise Strategy, Information Access Company, A Thomson Corporation, DBMS Magazine vol. 9 No. 7 p. 42 Jun. 1996.
Campbell, The New locking, logging, and Recover Architecture of Microsoft SQL Server 7.0, Microsoft Corporation, Proceeding of the 25th VLDB Conference, 1999.
Campbell, The New locking, Logging, and Recover Architecture of Microsoft SQL Server 7.0, Microsoft Corporation, Proceeding of the 25th VLDB Conference, 1999 p. 249.
Rigney, T., DBMS online's website re The Sybase Enterprise, May 1996.
Raden, Worlds in Collision, Merging Business and IT Architecture Perspectives to Evaluate Query and Analysis Tools Successfully, DBMS Magazine, Aug. 1997.
Nadeau & Teorey, Achieving Scalability in OLAP Materialized View Selection, DOLAP 02.
Nadeau & Teorey, Achieving Scalability in OLAP Materialized View Selection, DOLAP 02 Nov. 8, 2002.
Buzydlowski et al., A Framework for Object-Oriented On-Line Analytic Processing, Abstract—DOLAP Proceedings of DOLAP'98, 1998.
Buzydlowski et al., A Framework for Object-Oriented On-Line Analytic Processing, Abstract—DOLAP Proceedings of DOLAP '98, Nov. 7, 1998, pp. 10-15.
Buzydlowski et al., A Framework for Object-Oriented On-Line Analytic Processing, Abstract—DOLAP, 1998.
Liu and Ursu, A Framework for Global Optimization of Aggregate Queries, Abstract—CIKM, 1997.
Liu and Ursu, A Framework for Global Optimization of Aggregate Queries, Abstract—CIKM Proceedings of CIKM '97, 1997.
Liu and Ursu, A Framework for Global Optimization of Aggregate Queries, Abstract—CIKM Proceedings of CIKM '97, pp. 262-269.
Mangisengi., A Multidimensional Modeling Approach for OLAP within the Framework of the Relational Model Based on Quotient Relations, Abstract—DOLAP, 1998.
Mangisengi., A Multidimensional Modeling Approach for OLAP within the Framework of the Relational Model Based on Quotient Relations, Abstract—DOLAP Proceedings of DOLAP '98, 1998.
Mangisengi., A Multidimensional Modeling Approach for OLAP within the Framework of the Relational Model Based on Quotient Relations, Abstract—DOLAP Proceedings of DOLAP '98, pp. 40-46.
Trujillo et al., An Object Oriented Approach to Multidimensional Database Conceptual Modeling (OOMD), Abstract—DOLAP, 1999.
Trujillo et al, An Object Oriented Approach to Multidimensional Database Conceptual Modeling (OOMD), Abstract—DOLAP Proceedings of DOLAP '98 1999.
Trujillo et al, An Object Oriented Approach to Multidimensional Database Conceptual Modeling (OOMD), Abstract—DOLAP Proceedings of DOLAP '98, pp. 16-21.
Bose and Sugumaran., Application of Intelligent Agent Technology for Managerial Data Analysis and Mining, Abstract• Data Base, The Data Base for Advances in Information Systems, vol. 30, No. 1, Winter 1999.
Bose and Sugumaran., Application of Intelligent Agent Technology for Managerial Data Analysis and Mining, Abstract• Data Base, The Data Base for Advances in Information Systems, vol. 30, No. 1, Winter 1999 pp. 77-94.
Damiani and Bottarelli, A Terminological Approach to Business Domain Modeling, Abstract—EEC Proceedings of the International Conference on Database and Expert Systems 1990.
Damiani and Bottarelli, A Terminological Approach to Business Domain Modeling, Abstract—EEC Proceedings of the International Conference on Database and Expert Systems 1990 pp. 340-345.
DeWitt et al., Client-Server Paradise, Abstract, Proceedings of the 20th VLDB Conference 1994.
DeWitt et al., Client-Server Paradise, Abstract, Proceedings of the 20th VLDB Conference 1994 pp. 558-569.
McFadden., Data Warehouse for EIS: Some Issues and Impacts, Abstract—IEEE 1996 pp. 120-129.
McFadden., Data Warehouse for EIS: Some Issues and Impacts, Abstract—IEEE 1996 Proceedings of the 29th Hawaii Conference on Systems Sciences.
Cheung et al., DROLAP—A Dense-Region Based Approach to On-Line Analytical Processing, Abstract•DEXA '99.
Cheung et al., DROLAP—A Dense-Region Based Approach to On-Line Analytical Processing, Abstract•DEXA '99, LNCS 1677 pp. 761-770 1999.
Kotidis, Y. and N. Roussopoulos "DynaMat: A Dynamic View of Management System for Data Warehouses", Proceedings of ACM SIGMOD International Conference on Management of Data, Jun. 1-3, 1999.

Sun and Grosky., Dynamic Maintenance of Multidimensional Range Data Partitioning for Parallel Data Processing, Abstract—DOLAP '98.
Sun and Grosky., Dynamic Maintenance of Multidimensional Range Data Partitioning for Parallel Data Processing, Abstract—DOLAP '98 pp. 72-79.
Peneva and Angelova., End-User Interface to Improve Microcomputer DBMS Efficiency, Abstract Proceedings of the International Conference on Database and Expert System Applications 1991.
Rundensteiner and Sic., Evaluating Aggregates in Possibilistic Relational Databases, Abstract, Jan. 1991.
Hsiao et al., The Federated Databases and System: A New Generation of Advanced Database System, Abstract Proceeding of DEXA '90.
Hsiao et al., The Federated Databases and System: A New Generation of Advanced Database System, Abstract Proceeding of DEXA '90 1990 pp. 186-190.
Eder., General Transitive Closures and Aggregate Functions, Abstract, 1991.
Eder., General Transitive Closures and Aggregate Functions, Abstract Proceedings of DEXA '91., 1991.
Eder., General Transitive Closures and Aggregate Functions, Abstract Proceedings of DEXA '91., 1991 pp. 54-59.
Goil and Choudhary, High Performance Data Mining Using Data Cubes on Parallel Computers, Abstract—IEEE 1998.
Goil and Choudhary, High Performance Data Mining Using Data Cubes on Parallel Computers, Abstract—IEEE 1998 pp. 548-555.
Goil and Choudhary, High Performance Multidimensional Analysis of Large Datasets, Abstract—DOLAP '98.
Goil and Choudhary, High Performance Multidimensional Analysis of Large Datasets, Abstract—DOLAP '98 1998 pp. 34-39.
Muto and Kitsuregawa, Improving Main Memory Utilization for Array-Based Datacube Computation, Abstract—DOLAP '98.
Muto and Kitsuregawa, Improving Main Utilization for Array-Based Datacube Computation, Abstract—DOLAP '98 1998 pp. 28-33.
Nestorov and Tsur, Integrating Data Mining with Relational DBMS: A Tightly-Coupled Approach, Abstract—NGITS, 1999.
Nestorov and Tsur, Integrating Data Mining with Relational DBMS: A Tightly-Coupled Approach, Abstract—NGITS 99, L.Nes 1649 pp. 295-311 1999.
Fernandez-Baizan et al., Integrating KDD Algorithms and RDBMS Code, Abstract Proceedings of RSCTC '98.
Fernandez-Baizan et al., Integrating KDD Algorithms and RDBMS Code, Abstract Proceedings of RSCTC '98 pp. 210-213 1998.
Andlinger et al., Making C++ Object Persistent by Using a Standard Relational Database System Proceedings of DEXA '91.
Andlinger et al., Making C++ Object Persistent by Using a Standard Relational Database System Proceedings of DEXA '91 1991 pp. 374-379.
Rafanelli and Ricci, Mefisto: A Functional Model for Statistical Entities, IEEE, 1993.
Rafanelli and Ricci, Mefisto: A Functional Model for Statistical Entities, IEEE Jul. 16, 1992 pp. 670-681.
Gunzel et al., Modeling of Census Data in a Multidimensional Environment, Springer, Sep. 1998.
Gunzel et al., Modeling of Census Data in a Multidimensional Environmental. Sorinzer Procccdinus of ADBIS '98 Sep. 7-10, 1998.
Gunzel et al., Modeling of Census Data in a Multidimensional Environmental. Sorinzer Procccdinus of ADBIS '98 Sep. 7-10, 1998 pp. 363-368.
SAP Multi-Dimensional Modeling with BW, ASAP for BW Accelerator—A background to the techniques used to create SAP BW InfoCubes Document Version 2.0 2000.
Gingras and Lakshmanan, nD-SQL1: A Multi-Dimensional language for Interoperability and OLAP, Abstract, 1998.
Gingras and Lakshmanan, nD-SQL: A Multi-Dimensional Language for Interoperability and OLAP, Abstract Proceedings of the 24th VLDB Conference 1998.
Shatdal, Order Based Analysis Functions in NCR Teradata Parallel RDBMS, Abstract Proceeding of EDBT 2000.
Shatdal, Order Based Analysis Functions in NCR Teradata Parallel RDBMS, Abstract Proceeding of EDBT 2000 pp. 219-223.
Albrecht et al., An Architecture for Distributed OLAP, Abstract, 1998.
Albrecht et al., An Architecture for Distributed OLAP, Abstract Proceedings of PDPTA '98.
Albrecht et al., An Architecture for Distributed OLAP, Abstract Proceedings of PDPTA '98 Jul. 13-16 pp. 1482-1488.
Charczuk, Physical Structure Design for Relational Databases, Abstract Proceedings of ADBIS '98.
Charczuk, Physical Structure Design for Relational Databases, Abstract Proceedings of ADBIS '98 1998 pp. 357-362.
Charczuk, Physical Structure Design for Relational Databases, Abstract, 1998.
Lenz and Shoshani, Summarizability in OLAP and Statistical Data Bases, Abstract—IEEE 1997 pp. 22-27.
Lenz and Shoshani, "Summarizability in OLAP and Statistical Data Bases", Proceddings of the 9th International Conference on Scientifico and Statistical Database Management, Aug. 11-13, 1997, pp. 132-143.
Lehner, et al. "Normal Forms for Miltidimensional Databases", Proceedings of the 10th International Conference on Scientific and Statistical Database Management, Jul. 1-3, 1998, pp. 63-72.
Hwang, Summary Data Representations in Application Developments, Abstract, Sep. 1993.
Hwang, Summary Data Representations in Application Developments, Abstract DEXA 93 pp. 643-654.
Hwang, Summary Data Representations in Application Developments, Abstract Proceedings of DEXA '93 Sep. 1993.
Dinter et al., The OLAP Market: State of the Art and Research Issues, Abstract—DOLAP '98.
Dinter et al., The OLAP Market: State of the Art and Research Issues, Abstract—DOLAP '98 pp. 22-27.
Wieczerzycki, Transaction Management in Databases Supporting Collaborative Applications, Abstract Proceedings of ADBIS '98 1998.
Wieczerzycki, Transaction Management in Databases Supporting Collaborative Applications, Abstract Proceedings of ADBIS '98 pp. 107-118.
Bellahsene, View Adaption in Data Warehousing Systems, Abstract, 1998.
Bellahsene, View Adaption in Data Warehousing Systems, Abstract Proceedings of DEXA '98 Aug. 1998.
Bellahsene, View Adaption in Data Warehousing Systems, Abstract Proceedings of DEXA '98 pp. 300-309.
Batini et ai, A Comparative Analysis of Methodologies for Database Schema Integration,ACM Computing Surveys, vol. 18, No. 2, Dec. 1996.
Batini et al, A Comparative Analysis of Methodologies for Data Schema Integration,ACM Computing Surveys, vol. 18, No. 2 Dec. 1986.
Batini et al, A Comparative Analysis of Methodologies for Data Schema Integration,ACM Computing Surveys, vol. 18, No. 2 1987 pp. 323-364.
Gyssens and Lakshmanan., A Foundation for Multi-Dimensional Databases, 1997.
Gyssens and Lakshmanan., A Foundation for Multi-Dimensional Databases Proceedings of the 23'd VLDB Conference 1997.
Gyssens and Lakshmanan., A Foundation for Multi-Dimensional Databases Proceedings of the 23'd VLDB Conference 1997 pp. 106-115.
Gupta et al., Aggregate-Query Processing in Data Warehousing Environments, 1995.
Gupta et al., Aggregate-Query Processing in Data Warehousing Environments Proceedings of the 21 st VLDB Conference 1995.
Devlin and Murphy., An Architecture for a Business and Information System, IBM Systems Journal, vol. 27, No. I 1998.
Devlin and Murphy., An Architecture for a Business and Information System, IBM Systems Journal, vol. 27, No. 1 1988 pp. 60-80.
Codd., A Relational Model of Data for Large Shared Data Banks,Communications of the ACM, vol. 13, No. 6, Jun. 1970.
Codd., A Relational Model of Data for Large Shared Data Banks,Communications of the ACM, vol. 13, No. 6, Jun. 1990 pp. 377-387.
Vassiliadis and Sellis., A Survey of Logical Models for OLAP Database, SIGMOD Record, vol. 28, No. 4, Dec. 1999.

Vassiliadis and Sellis., A Survey of Logical Models for OLAP Database, SIGMOD Record, vol. 28, No. 4, Dec. 1999 pp. 64-69.
Attunity's website page re Home page with Headlines 2005.
Chaudhuri and Narasayya., AutoAdmin "What-if" Index Analysis Utility, '98.
Chaudhuri and Narasayya. AutoAdmin What-if' Index Analysis Utility Proceedings of SIGMOD '98.
Chaudhuri and Narasayya. AutoAdmin What-if' Index Analysis Utility Proceedings of SIGMOD '98 pp. 367-378.
Lu and Tan., Buffer and Load Balancing in Locally Distributed Database Systems, 1990.
Lu and Tan., Buffer and Load Balancing in Locally Distributed Database Systems, 1990 pp. 545-552.
Shanmugasundaram., Compressed Data Cubes for OLAP Aggregate Query Approximation on Continuous Dimensions Proceedings ofthe KDD '99 Conference.
Shanmugasundararn., Compressed Data Cubes for OLAP Aggregate Query Approximation on Continuous Dimensions KDD 99 1999 pp. 223-232.
Barghoorn., N-dimensional Data Analysis with Sparse Cubes, Crosstab, OLAP, and APL APL98 Jul. 1998 pp. 110-113.
Barghoorn., N-dimensional Data Analysis with Sparse Cubes, Crosstab, OLAP, and APL Proceedings of the APL '98 Conference.
Gray et aL, Data Cube: A Relational Aggregation Operator Generalizing Group-By, Cross-Tab, and Sub-Totals, 1996.
Gray et aL, Data Cube: A Relational Aggregation Operator Generalizing Group-By, Cross-Tab, and Sub-Totals, 1996 pp. 152-159.
Chaudhuri and Dayal., Data Warehousing and OLAP for Decision Support Proceedings of SIGMOD '97.
Chaudhuri and Dayal., Data Warehousing and OLAP for Decision Support Proceedings of SIGMOD '97 1997 pp. 507-508.
Trujillo et al., Detecting Patters and OLAP Operations in the GOLD Model, DOLAP, '99.
Trujillo et al., Detecting Patters and OLAP Operations in the GOLD Model, DOLAP, '99 1999 pp. 48.53.
Yan & Larson., Eager Aggregation and lazy Aggregation, Proceedings of the 21st VLDB Conference Zurich, Swizerland, 1995.
Johnson and Chatziantoniou., Extending Complex Ad-Hoc OLAP, 1999.
Johnson and Chatziantoniou., Extending Complex Ad-Hoc OLAP Proceedings ofCIKM '99.
Johnson and Chatziantoniou., Extending Complex Ad-Hoc OLAP pp. 170-179 CIKM 99 Nov. 1999.
Pedersen et al., Extending OLAP Querying to Object Databases, VLDB 2000 Submission.
Pedersen et al., Extending Practical Pre-Aggregation in On-Line Analytical Processing, 1999.
Pedersen et al., Extending Practical Pre-Aggregation in On-Line Analytical Processing Proceedings of the 25th VLDB Conference 1999.
Codd, Extending the Database Relational Model to Capture More Meaning, ACM Transactions on Database Systems, vol. 4, No. 4, 1979.
Codd, Extending the Database Relational Model to Capture More Meaning, ACM Transactions on Database Systems, vol. 4, No. 4, 1979 pp. 397-434.
Sheth and Larson, Federated Database Systems for Managing Distributed, Heterogeneous, and Autonomous Databases, ACM Computing Surveys, vol. 22, No. 3, Sep. 1990.
Sheth and Larson, Federated Database Systems for Managing Distributed, Heterogeneous, and Autonomous Databases, ACM Computing Surveys, vol. 22, No. 3. pp. 183-236 Sep. 1990.
Szykier, Fractal Compression of Data Structures, Electro International 1994 Hynes Convention Center, pp. 609-616.
Szykier, Fractal Compression of Data Structures, Electro International 1994 Hynes Convention Center, May 1994.
Graefe et al., Hash joins and hash teams in Microsoft SQL Server, 1998, pp. 86-97.
Graefe et al., Hash joins and hash teams in Microsoft SQL Server Proceedings of the 24th VLDB Conference 1998, pp. 86-97.
Chandra and Harel, Horn Clauses and the Fixpoint Query Hierarchy 1982.
A White Paper by Speedware Corporation, Hybrid OLAP—The Best of Both Worlds 1997.
Markl et al., Improving OLAP Performance by Multidimensional Hierarchical Clustering, 1999.
Mark! et al., Improving OLAP Performance by Multidimensional Hierarchical Clustering Proceedings of IDEAS '99 1999.
Chaudhuri and Shim, Including Group-By in Query Optimization, 1994.
Chaudhuri and Shim, Including Group-By in Query Optimization Proceedings of the 20th VLDB Conference, 1994.
Mumick et al., Maintenance of Data Cubes and Summary Tables in a Warehouse, 1997.
Mumick, I. S., D. Quass and B. S. Mumick "Maintenance of Data Cubes and Summary Tables in a Warehouse", ACM SIGMOD Record, vol. 26, No. 2, Jun. 1997, pp. 100-111.
Murnick et al., Maintenance of Data Cubes and Summary Tables in a Warehouse Proceedings of SIGMOD '97 1997.
Vigeant, J. DM Review's website page re Media / MR Ensures Consistency for IBM Consultancy Jan. 1998.
McCarthy, Metadata Management for large Statistical Databases, 1982, pp. 234-243.
McCarthy, Metadata Management for Large Statistical Databases Proceedings of the 8th VLDB Conference 1982. pp. 234-243.
Ferguson, Microeconomic Algorithms for Load Balancing in Distributed Computer Systems, 1988.
Ferguson, Microeconomic Algorithms for Load Balancing in Distributed Computer Systems, 1988 pp. 491-499.
Chen and McNamee, On the Data Model and Access Method of Summary Data Management, IEEE Transactions on Knowledge and Data Engineering, vol. 1, No. 4, 1989.
Sellis and Ghosh, Concise Papers on the Multiple-Query Optimization Problem, IEEE Transactions on Knowledge and Data Engineering, vol. 2, No. 2 1990.
DBMS's website page re Oracle 7 Release 7.3 by Martin Rennhackkamp Nov. 1996 pp. 262-266.
DeWitt and Gray, Parallel Database Systems: The Future of High Performance Database Systems, Communications of the ACM, vol. 35, No. 6, Jun. 1992.
DeWitt and Gray, Parallel Database Systems: The Future of High Performance Database Systems, Communications of the ACM, vol. 35, No. 6, Jun. 1992 pp. 85-98.
Ho et al., Partial-Sum Queries in OLAP Data Cubes Using Covering Codes, 1997.
Ho et al., Partial-Sum Queries in OLAP Data Cubes Using Covering Codes Proceedings of PODS '97 1997.
Ho et al., Partial-Sum Queries in OLAP Data Cubes Using Covering Codes Proceedings of PODS '97 1997 pp. 228-237.
Pourabbas and Rafanelli, PGL: An Extended Pictorial Query Language for querying Geographical Databases using Positional and OLAP Operators, Nov. 1999.
Pourabbas and Rafanelli, PQL: An Extended Pictorial Query Language for querying Geographical Databases using Positional and OLAP Operators Proceedings of ACM GIS '99 Nov. 1999.
Pourabbas and Rafanelli, PQL: An Extended Pictorial Query Language for querying Geographical Databases using Positional and OLAP Operators Proceedings of ACM GIS '99 Nov. 1999 pp. 165-166.
Markl et al., Processing Operations with Restrictions in RDBMS without External Sorting: The Tetris Algorithm, 1999.
Markl et al., Processing Operations with Restrictions in RDBMS without External Sorting: The Tetris Algorithm Proceedings of ICDE '99 1999.
Bansal, Real World Requirements for Decision Support—Implications for RDBMS, 1995.
Bansal, Real World Requirements for Decision Support—Implications for RDBMS Proceedings of SIGMOD '95 1995 p. 448.
Tabor Communications' website page re SAP Customers Eastman Kodak and Halliburton Among 750 Customers Worldwide to Implement the SAP Business Information Warehouse Solution, 1999.
Graefe et al., Sort vs. Hash Revisited, IEEE Transactions on Knowledge and Data Engineering, vol. 6, No. 6., Dec. 1994.
Graefe et al., Sort vs. Hash Revisited, IEEE Transactions on Knowledge and Data Engineering, vol. 6, No. 6., Dec. 1994 pp. 934-944.

Red Brick Systems, Inc. Star Schema Processing for Complex Queries, 1997.
Shoshani and Wong., Statistical and Scientific Database Issues, IEEE Transactions on Software Engineering, vol. SE-11, No. 10., Oct. 1985.
Shoshani and Wong., Statistical and Scientific Database Issues, IEEE Transactions on Software Engineering, vol. SE-11, No. 10., Oct. 1985 pp. 1040-1047.
Ghosh, Statistical Relational Databases: Normal Forms, IEEE Transactions on Knowledge and Data Engineering, vol. 3, No. 1., 1991.
Ghosh, Statistical Relational Databases: Normal Forms, IEEE Transactions on Knowledge and Data Engineering, vol. 3, No. 1., 1991 pp. 55-64.
Stamen, Structuring Database for Analysis, IEEE Spectrum Oct. 1993 pp. 55-58.
The OLAP Report website page re Summary Review: Media (Speedware) Mar. 29, 1999.
Sybase Inc.'s website page re Certification Report No. 136 of Sybase Adaptive Server IQ Version 12.02 with Seagate Software Crystal Reports and Crystal Info Version 7.0v Jun. 1999.
Gyssens et al., Tables As a Paradigm for Querying and Restructuring, 1996.
Gyssens et al., Tables As a Paradigm for Querying and Restructuring Proceedings of PODS '96 1996., 1996.
Gyssens et al., Tables As a Paradigm for Querying and Restructuring Proceedings of PODS '96 1996., 1996 pp. 93-103.
Srivastava et al., TBSAM: An Access Method for Efficient Processing of Statistical Queries, IEEE Transactions of Knowledge and Data Engineering, vol. 1. No. 4, 1989.
Srivastava et al., TBSAM: An Access Method for Efficient Processing of Statistical Queries, IEEE Transactions of Knowledge and Data Engineering, vol. 1. No. 4 pp. 419-423 Dec. 1989.
LeFevre, J., LookSmart Find Articles' website page re There's a Whole Lot of HOLAP Goin' On-hybrid online analytical processing systems combine relational OLAP and multidimensional OLAP—Technology Information, 1998.
LeFevre, J., LookSmart Find Articles' website page re There's a Whole Lot of HOLAP Goin' On-hybrid online analytical processing systems combine relational OLAP and multidimensional OLAP—Technology Information, Feb. 18, 1998.
LeFevre, J.,There's a Whole Lot of HOLAP Goin' On-hybrid online analytical processing systems combine relational OLAP and multidimensional OLAP—Technology Information Feb. 18, 1998.
Bayer, UB-Trees and UB-Cache A new Processing Paradigm for Database Systems, Mar. 15, 1997.
Hurtado et al., Updating OLAP Dimensions, 1999, pp. 60-66.
Hurtado et al., Updating OLAP Dimensions Proceedings of DOLAP'99, 1999, pp. 60-66.
White Paper Abstract—Connecting Seagate Software products to the SAP Business Information Warehouse (BW), Enterprise Information Management, Feb. 5, 1999.
Healthcare Informatics.Online website page re Data Mining Goes Multidimensional by Mark Hettler, Mar. 1997.
Healthcare Informatics.Online website page re Data Mining Goes Multidimensional by Mark Hettler, Mar. 1997.
Staudt et al., Incremental Maintenance of Externally Materialized Views, Abstract, 1996.
Staudt et al., Incremental Maintenance of Externally Materialized Views, Abstract Proceedings of the 22nd VLDB Conference 1996 pp. 75-86.
Aberdeen Group "Pilot Internet Publisher: A Foundation for Web-Enabled OLAP" Feb. 1997.
Srivastava et al., Answering Queries with Aggregation Using Views, Abstract, 1996.
Srivastava et al., Answering Queries with Aggregation Using Views, Abstract, Proceedings of the 22nd VLDB Conference 1996.
Srivastava et al., Answering Queries with Aggregation Using Views, Abstract, Proceedings of the 22nd VLDB Conference 1996 pp. 318-329.
Martin, J., DM Review's website re Cybercorp: Trends in Distributed Data Warehousing Jan. 1999.
Theodoratos et al, Data Warehouse Configuration, Abstract, 1997.
Theodoratos et al, Data Warehouse Configuration, Abstract Proceedings of the 23rd VLDB Conference 1997.
Malvestuto, F., The Derivation Problem for Summary Data, Abstract, 1988.
Malvestuto, F., The Derivation Problem for Summary Data, Abstract, ACM 1988 pp. 82-89.
Rahm, Erhard. Dynamic Load Balancing in Parallel Database System, Abstract, Aug. 1996.
Rahm, Erhard. Dynamic Load Balancing in Parallel Database System, Abstract Proceedings EURO-PAR 96 Conf. LNCS Aug. 1996.
Hsiao, David. Federated Databases and Systems: Part 1—A Tutorial on Their Data Sharing, Abstract, VLDB Journal, vol. 1, pp. 127-179, 1992.
Hsiao, David. Federated Databases and Systems: Part II—A Tutorial on Their Resource Consolidation, Abstract, VLDB Journal vol. 2, pp. 285-310, 1992.
Crystal Decisions. Holos Version 6. Holos Compound OLAP Architecture, 2002.
Sarawagi, Sunita. Indexing OIAP Data, Abstract, 1997.
Sarawagi, Sunita. Indexing OIAP Data, Abstract, Bulletin of the IEEE Computer Society Technical Committee on Data Engineering 1997.
Sarawagi, Sunita. Indexing OIAP Data, Abstract, Bulletin of the IEEE Computer Society Technical Committee on Data Engineering 1997 pp. 36-43.
Data Sheet—Informix MetaCube 4.2, Delivering the Most Flexible Business-Critical Decision Support Environments Jul. 1999.
Technical White Paper -Inside Alphablox Analytics: An In-Depth Technical View of Alphablox Analytics, 2004.
Ramsak et al., Integrating the UB-Tree into a Database System Kernel, Abstract Proceedings of the 26th VLDB Conference 2000.
Ramsak et al., Integrating the UB-Tree into a Database System Kernel, Abstract Proceedings of the 26th VLDB Conference 2000 pp. 263-272.
Roussopoulos, Nick. Materialized Views and Data Warehouses, Abstract, 1997.
Roussopoulos, Nick. Materialized Views and Data Warehouses, Abstract Proceedings of the 4th KRDB Workshop Aug. 30, 1997.
Bernstein et al., Meta-Data Support for Data Transformations Using Microsoft Repository, Abstract, 1999.
Bernstein et al., Meta-Data Support for Data Transformations Using Microsoft Repository, Abstract Bulletin of the IEEE Computer Society Committee on Date Engineering 1999.
Bernstein et al., Meta-Data Support for Data Transformations Using Microsoft Repository, Abstract Bulletin of the IEEE Computer Society Committee on Date Engineering 1999 pp. 9-14.
Microsoft SQL Server—Microsoft SQL Server 7.0 Decision Support Services: lowering the Cost of Business Intelligence, 1998.
Microsoft SQL Server—Microsoft SQL Server 7.0 Decision Support Services: lowering the Cost of Business Intelligence 098-80705 1998.
Gaede et al., Multidimensional Access Methods, ACM Computing Surveys, vol. 30, No. 2, Jun. 1996.
Gaede et al., Multidimensional Access Methods, ACM Computing Surveys, vol. 30, No. 2, Jun. 1996 pp. 170-231.
O'Neil et al., Multi-Table Joins Through Bitmapped Join Indices, SIGMOD Record, vol. 24, No. 3, Sep. 1995.
O'Neil et al., Multi-Table Joins Through Bitmapped Join Indices, Sigmod Record, vol. 24, No. 3, Sep. 1995 pp. 8-11.
Pendse, N., OLAP Omnipresent, Byte Magazine, Feb. 1998.
Zhao et al., on the Performance of an Array-Based ADT for OLAP Workloads, Abstract, Aug. 29, 1996.
E-consultancy's website re Oracle Express 6.2 Delivers Unparalleled Integration, Ease of Use and Platform Support, May 1998.
Yan et al., Performing Group-By before Join, Abstract.. Proceedings of the 10th IEEE Conference on Data Engineering 1994 pp. 89-100.
Wu, Ming-Chuan, Ouery Optimization for Selections using Bitmaps, Abstract, 1994, pp. 89-100.
Kamp et al., A Spatial Data Cube Concept to Support Data Analysis in Environmental Epidemiology, Abstract 1997.
Kamp et al., A Spatial Data Cube Concept to Support Data Analysis in Environmental Epidemiology, Abstract 1997 pp. 100-103.
SQL in Analysis Services, 2004.

Reinwald et al., SQL Open Heterogeneous Data Access, Abstract, 1998, pp. 506-507.
Reinwald et al., SQL Open Heterogeneous Data Access, Abstract Proceedings of SIGMOD 98 1998 pp. 506-507.
Moran, B., et al., SQL Server Savvy's website re How to Leverage the Capabilities of OLAP Services, Jul. 1999.
Radding, Alan. Support Decision Makers with a Data Warehouse, Datamation, Mar. 15, 1995.
Radding, Alan. Support Decision Makers with a Data Warehouse, Datamation, Mar. 15, 1995 pp. 53-56.
Chapman K. Article from itWorldCanada—BI/SUITE Plays Catch up to Competitors Feb. 26, 1999.
MacMillan, M. Article from itWorldCanada—Business Objects 5.0 Dresses Itself up with a Cleaner User Interface Sep. 10, 1999.
Plos Kine, B. Article—Hummingbird Dives Into Business Intelligence (Hummingbird BI Suite) (Product Announcement) Aug. 12, 1998.
Printout from Sybase Website Sybase Adaptive Server IQ 12.0.3 with Actuate Reporting System Version 3.2.1, Certification Date: Jul. 1999, Report.
Printout from Sybase Website Sybase Adaptive Server IQ 12.0.3 with Actuate Reporting System Version 3.2.1, Certification Date: Jul. 1999, Report 150.
Printout from Sybase Website "Sybase Adaptive Server IQ 12.03.1 with BusinessObjects Version 5.0, Certification Date: Jul. 1999, Report 148".
Printout from Sybase Website "Sybase Adaptive Server IQ Version 12.0, Sybase DirectConnect for MVS/DB2 11.7 and Sybase Adaptive Server Enterprise 11.9.1 with InfoMaker 7.0, Certification Date: Mar. 1999, Report 137".
Printout from Sybase Website "Sybase Adaptive Server IQ Version 12.0.2 with Hummingbird BI Suite Version 5.0, Certification Date: Mar. 1999, Report 133".
Printout from Sybase Website "Sybase Adaptive Server IQ Version 12.0.2 with Seagate Software Crystal Report and Crystal Info Version 7.0, Certification Date: Mar. 1999, Report 136".
Printout from Sybase Website "Sybase Adaptive Server IQ Version 12.4 with Microsoft Access 2000 Version 9.0, Certification Date: Oct. 1999, Report 155".
Kimball, R., et al., "Why Decision Support Fails and How to Fix it," Datamation, Jun. 1, 1994.
Kimball, R., et al., "Why Decision Support Fails and How to Fix it," Datamation, Jun. 1, 1994 pp. 40-43.
Article—"Why Decision Support Fails and How to Fix it," Datamation, Jun. 1, 1994.
"The Multimodel, Multilingual Approach to Interoperability of Multidatabase Systems," David K. Hsiao and Magdi N. Kamel, Departments of Computer and Administrative Sciences, Naval Postgraduate School 1991.
"The Multimodel, Multilingual Approach to Interoperability of Multidatabase Systems," David K. Hsiao and Magdi N. Kamel, Departments of Computer and Administrative Sciences, Naval Postgraduate School 1991 pp. 208-211.
"MDD Database Reaches the Next Dimension" Richard Finkelstein, Database Programming and Design, Apr. 1995, vol. 8.
"Materialized View and Index Selection Tool for Microsoft SOL Server 2000" Sanjay Agrawal, Surajit Chaudhuri and Vivek Narasayya Proceedings of SIGMOD May 21-24, 2001 p. 608.
"Managing Multidimensional Data: Harnessing the Power" Jay-Louise Weldon, Database Programming & Design, Aug. 1995, vol. 8.
"M(DM): An Open Framework for Interoperation of Multimodel Multidatabase Systems" Thierry Barsalou and Dipayan Gangopadhyay 1992.
"Help for Hierarchies" Ralph Kimball, Data Warehouse Architect, Sep. 1998.
"Beyond Decision Support" Edgar Codd, Sharon Codd and Clynch T. Salley, Computerworld, Jul. 26, 1993, p. 87.
"A Physical Storage model for Efficient Statistical Ouery Processing" Wee K. Ng and Chinya V. Ravishankar, Dept. of Electrical Engineering and Comptuer Science, University of Michigan IEEE 1994 pp. 97-106.
"A Physical Storage model for Efficient Statistical Ouery Processing" Wee K. Ng and Chinya V. Ravishankar, Dept. of Electrical Engineering and Comptuer Science, University of Michigan 1994.
"SQL Is Our Language, Fix It Now" Datamation, Jun. 1, 1994.
"SQL Is Our Language, Fix It Now" Datamation, Jun. 1, 1994 pp. 43-45.
Kimball, R. "SQL Is Our Language, Fix It Now" Datamation, Jun. 1, 1994.
NetCube "Discussion of NetCube in the Context of IBM's DB2 OLAP Server" Jun. 7, 1997.
NetCube Health Care Client—Actual NetCube Model Design; Telecommunications—Business Model Design; Direct Marketing Client—Business Model Design Nov. 1, 2005.
Erik Thomsen, Dimensional Systems, Remarks from NetCube Product Review on Jan. 14, 1997.
Albrecht, J. et al.: "Aggregate-based Query Processing in a Parallel Data Warehouse Server", Proceedings of the Tenth International Workshop on Database and Expert Systems Applications, Sep. 1-3, 1999, pp. 40-44.
Albrecht, et al.: "Management of Multidimensional Aggregates for Efficient Online Analytical Processing", Database Engineering and Applications, 1999, Ideas '99. International Symposium Proceedings Montreal, Que., Canada Aug. 2-4, 1999, Los Alamitos, CA, USA, IEEE Comput. Soc, US, Aug. 2, 1999, pp. 156-164.
Albrecht, et al.: "Management of Multidimensional Aggregates for Efficient Online Analytical Processing", Database Engineering and Applications, 1999, Ideas '99. International Symposium Proceedings Montreal, Que., Canada.
Agarwal, S. et al.: "On the Computation of Multidimensional Aggregates", Proceedings of the 22nd VLDB Conference, Sep. 30, 1996, pp. 506-521.
Agarwal, S. et al.: "On the Computation of Multidimensional Aggregates", 22nd Int'l Cof. On Very Large Databases, 1996, pp. 1-16.
Agrawal et al.: "Modeling Multidimensional Databases", IBM Almaden Research Center, 1995, Presented at the 13th International Conference on Data Engineering, Apr. 1997, pp. 1-23.
Agrawal et al.: "Modeling Multidimensional Databases", IBM Almaden Research Center, 1995, Presented at the 13th International Conference on Data Engineering, pp. 1-23, available as Research Report 1995.
Anonymous: "Introduction to MDDBs", SAS Institute Inc., SAS/MDDB Server Administrators Guide Version 8, 1999, pp. 3-10.
The Art of Indexing by not indicated, Dynamic Information Systems Corporation, 1999, p. 3-30.
The Art of Indexing,: A White Paper by DISC, Oct. 1999, pp. 3-30, Dynamic Information Systems Corporation.
Carickhoff, Rich: "Internet Systems' website re A New Face for OLAP", Jan. 1997.
Carickhoff, Rich: "Internet Systems' website re A New Face for OLAP", Jan. 1997. DBMS Magazine.
Chaudhuri, et al.: "An Overview of Data Warehousing and OLAP Technology", Sigmod Record, Sigmod, New York, NY, US, vol. 26, No. 1, Mar. 1997, pp. 65-74.
Chaudhuri, S. et al., "An Overview of Data Warehousing and OLAP Technology", SIGMOD Record, New York, NY Mar. 1997, vol. 26, No. 1.
Cheung, et al.: "Towards the Building of a Dense-Region-Based OLAP System", Data and Knowledge Engineering, vol. 36, No. 1, 2001, http://www.elsevier.nl/gej-ng/10/16/74/62/24/24/abstract.html, pp. 1-27.
Colliat, George: "OLAP: Relational, and Multidimensional Database Systems", SIGMOD Record, vol. 25, No. 3, Sep. 1996, pp. 64-69.
Date, C. J., et al.: An Introduction to Database Systems, No. 7th, 2000, p. p. 250, 266, 289-326.
Date, C. J., et al.: An Introduction to Database Systems, No. 7th, 2000, p. p. 250, 266, 289-326. Addison-Wesley, Seventh Edition.
Date, et al., "An Introduction to Database Systems, vol. II", Reading: Addison-Wesley, pp. 62-64, 1983. QA76.9.D3D367. ISBN 0-201-14474-3.
Date, et al., "An Introduction to Database Systems, vol. II", Reading: Addison-Wesley, pp. 62-64, 1983.
Date, C.J., "An Introduction to Database Systems," 2000, pp. 250, 266, 289-326, Addison-Wesley, Wesley, Seventh Edition.

Duhl, et al., "A Performance of Object and Relational Databases Using the Sun Benchmark", Proceedings of the OOPSLA Conference, pp. 153-163, Sep. 25-30, 1988.

Duhl, et al., "A Performance Comparison of Object and Relational Databases Using the Sun Benchmark", Proceedings of the Conference on Object Oriented Programming Systems Languages and Applications,Sep. 25-30, 1988, pp. 153-163.

Elkins, S. B.: "Open OLAP", DBMS Apr. 1998, http://www.dbmsmag.com/9804d14.html, pp. 1-7.

Foley, J. TechWeb's website page re Microsoft Servers Up New SQL Server Beta Jan. 12, 1998.

Gupta, H.V., et al., "Index Selection for OLAP", Proceedings of the 13th Int'l Conference on Data Engineering, Apr. 7-11, 1997, pp. 208-219.

Harinarayan et al.: "Implementing Data Cubes Efficiently", Proceedings of the 1996 ACM SIGMOD International Conference on Mangement of Data, Jun. 4-6, pp. 205-216.

Harinarayan et al.: "Implementing Data Cubes Efficiently", Proceedings of the 1996 SIGMOD 1996, p. 1-25.

Hellerstein et al.: Online Aggregation, Presented at the ACM SIGMOD International Conference on Management of Data, May 11-15, 1997, http://www.acm.org/pubs/citations/proceedings/mod/253260/p171-hellerstein/, pp. 1-12.

Hellerstein, J.M., "Optimization Techniques for Queries with Expensive Methods", ACM Transactions on Database Systems (TODS), vol. 23, No. 2, pp. 113-157, 1998.

Ho, C.-T. et al.: Range Queries in OLAP Data Cubes, Presented at the ACM SIGMOD International Conference on Management of Data, May 11-15, 1997, http://www.acm.org/pubs/citations/proceedings/mod/253260/p73-ho/, pp. 1-16.

Introduction to Structured Query Language, http:/w3one.net/~jhoffmann/sqltut.htm, 2000, p. 1-33.

Introduction to Structured Query Language, http:/w3one.net/~jhoffmann/sqltut.htm, 2000, p. 1-33. http:/w3.one.net/~about.jhoffman/sqltut.htm.

Kimball, R., "Aggregate Navigation With (Almost) No MetaData", http://www.dbmsmag.com/9608d54.html, 1996, p. 1-8.

Kimball, R.: "The Aggregate Navigator; How to Optimize Your Data Warehouse Using Aggregates Without Driving Your End Users Crazy", DBMS (www.dbmsmag.com)—Nov. 1995.

Korn, F. et al.: "Efficiently Supporting Ad Hoc Queries in Large Datasets of Time Sequences", Presented at ACM SIGMOD International Conference on Management of Data, May 11-15, 1997, http://www.acm.org/pubs/citations/proceedings/mod/253260.p289-korn/, pp. 1-22.

Li, et al.: A Data Model for Supporting On-Line Analytical Processing, Presented at the International Conference on Information and Knowledge Management, 1996, pp. 81-88.

Li, C., et al.: "Optimizing Statistical Queries by Exploiting Orthogonality and Interval Properties of Grouping Relations", Presented at the 8th International Conference on Scientific & Statistical Database Management, Jun. 1996, pp. 1-10.

McKie, S.: "Essbase 4.0", DBMS, Jul. 1996, Web-based Product Review for Arbor Software Corporation, http://www.dbmsmag.com/9607d13.html, pp. 1-4.

Pedersen, T. B., "Aspects of Data Modeling and Query Processing for Complex Multidimensional Data", Chapter 4, entitled Extending Practical Pre-Aggregation in On-Line Analytical Processing, of the Ph.D. Disseration, Danish Academy of Technical Sciences 2000, pp. 1-103.

Pedersen, T.B., Aspects of Data Modeling and Query Processing for Complex Multidimensional Data, 2000, pp. 1-180, Danish Academy of Technical Sciences.

Pedersen, T. B., Aspects of Data Modeling and Query Processing for Com., Dept. Computer Sci., Aalborg Univ., Denmark, 2000, p. 1, 77-103.

Pedersen, et al., Extending OLAP Querying to Object Databases, VLDB 2000 Submission.

Petersen, T. B., et al.: "Multidimensional Database Technology", IEEE, vol. 34, No. 12, Dec. 2001, pp. 40-46.

Pendse, Nigel: "The Origins of Today's OLAP Products", htt;://www.olapreport.com/origins.htm., Feb. 6, 2003, pp. 1-7.

"Performance Management—Product Information," ENT, Jul. 17, 1999, 2 pages.

Pourabbas, et al.: "Characterization of Hierarchies and Some Operators in OLAP Environment", Presented at the ACM 2nd International Workshop on Data Warehousing and OLAP, Nov. 2-6, 1999, pp. 1-17.

Pourabbas, et al.: "Characterization of Hierarchies and Some Operators in OLAP Environment", Presented at the ACM 2nd International Workshop on Data Warehousing and OLAP, 1999, p. 54-49.

Pourabbas et al.: "Hierarchies and Relative Operators in the OLAP Environment", SIGMOD Record, vol. 29, No. 1, Mar. 2000, http://dblp.unitrier.de/db/journals/sigmod/sigmod29.html, pp. 1-8.

Roche, T.: "Intermediate Client-server techniques", 1999.

Salem et al.: "How to Roll a Join: Asynchronous Incremental View Maintenance", Presented by ACM SIGMOD on Management of Data and Symposium on Principles of Database Systems, May 15-18, 2000, http://www.acm.org/pubs/citations/proceedings/mod/342009/p129-salem/#abstract, pp. 1-13.

SAS/MCCB®: Web-based product brochure entitled "See Data from All Angles with Multidimensional Database Software" by SAS/MCCB® Server, www.sas.com/products/mddb/index.html, 2001, 1 page.

Schumacher, Robin: Attunity Connect SQL—PowerPoint presentation undated 38 pages. BrioQuery Enterprise 4.0; Brio Technologys desktop OLAP tool, Lexis.com DBMX Magazine vol. 9 No. 10 Sep. 1996.

Shoshani, OLAP and Statistical Databases: Similarities and Differences, Abstract—PODS Proceedings of PODS '97 1997.

Shoshani, OLAP and Statistical Databases: Similarities and Differences, Abstract—PODS 97 pp. 185-196.

Vassiliadis, P.: "A Survey of Logical Models for OLAP Databases", Sigmod Record, vol. 28, No. 4, Dec. 1999.

Widman et al.: Efficient Execution of Operations in a DBMS for Multidimensional Arrays, presented at the ACM SIGMOD 1998, http://dblp.unitrier.de/db/conf/ssdbm/WidmannB98.html, pp. 1-11.

Zhao, Y et al. "Array-Based Evaluation of Multi-Dimensional Queries in Object-Relational Database Systems," Data Engineering, 1998 Proceedings, 14th International Conference in Orlando, Fl, Feb. 23-27, 1998.

U. S. District Court Order, for the Northern District of California in the matter of *Hyperion Solutions Corp.* vs. *HyperRoll, Inc.*, et al. (Case No. CV 05-05054-VRW), 35 pages, dated Aug. 28, 2006.

U.S. Office Action re U.S. Appl. No. 10/153,164 dated Nov. 25, 2003.
U.S. Office Action re U.S. Appl. No. 10/854,034 dated Nov. 6, 2006.
U.S. Office Action re U.S. Appl. No. 09/796,098 dated Oct. 24, 2003.
U. S. Office Action re U.S. Appl. No. 12/657,143 dated Sep. 15, 2010.
U. S. Office Action re U.S. Appl. No. 12/455,665 dated Jul. 30, 2010.
U. S. Office Action re U.S. Appl. No. 12/653,373 dated Aug. 30, 2010.
U. S. Office Action re U.S. Appl. No. 12/590,504 dated Aug. 30, 2010.
U. S. Office Action re U.S. Appl. No. 12/589,383 dated Oct. 26, 2010.

Groh et al., Managing Multidimensional Data marts with Visual Warehouse and DB2 OLAP Server, IBM Dec. 1998. See e.g., p. 19-193, 313-.336.

Introducing Pilot Designer, Pilot Software, Inc. 1996. See e.g., pp. 81-134.

Arbor Essbase 5: Fundamentals,Arbor Software—Driving Business Performance. See e.g., pp. 1-1-4-14, 6-1-9-23, 12-1-13-22, 19-1-33-16.

Hyperion Essbase OLAP Server Fundamentals (Training Manual).

Hahn et al., Getting Started with DB2 OLAP Server for OS/390, IBM—International Technical Support Organization, Mar. 2000. See e.g., pp. 1-18, 53-192.

IBM DB2 OLAP Server and Starter Kit—OLAP Setup and User's Guide Version 7. See e.g., pp. 73-146.

Graefe, Query Evaluation Techniques for Large Databases, Acm Computing Surveys, vol. 25, No. 2.

Zaharioudakis et al., Answering Complex SQL Queries Using Automatic Summary Tables, Abstract.

Tam, Yin J., Datacube: Its Implementation and Application in OLAP Mining, Thesis. Simon Fraser University Sep. 1998.

Bonnet et al., My Mother Thinks I'm a DBA! Cross-Platform, Multi-Vendor, Distributed Relational Data Replication with IBM DB2 Data Propagator and IBM DataJoiner Made Easy!, IBM. See e.g., pp. 1-138.
Oracle. Oracle Express Server Database Administration Guide. Release 6.0. See e.g., p. 1-102, 123-2242.
Oracle. Oracle Express Analyzer. Release 2.1 Getting Started. See e.g., pp. 19-50.
Oracle Express Release 6.2, Express Language Programming Guide. See e.g., pp. 19-186, 345-482.
Oracle Express Relational Access Manager, User's Guide Release 6.3. See e.g., pp. 1-2-3-8, 5-2-B-6.
SQL Server 7.0 Workshop Codename Sphinx, Feb. 25-27, 1998. See e.g., pp. 1-116.
TPC Benchmark D (Decision Support) Standard Specification, Revision 2.1. See e.g., pp. 9-114, 146-151.
IEEE "Bulletin of the Technical Committee on Data Engineering" vol. 20, No. 1 Special Issue on Supporting OLAP Mar. 1997. See e.g., pp. 1-48.
Application Programmer's Manual; MetaCube ROLAP Option for Informix Dynamic Server, Version 4.0, Jan. 1998. See e.g., pp. 2-1-14-4.
Sams Teach Yourself Microsoft SQL Server 7.0 in 21 Days, Richard Waymire and Rick Sawtell; First Printing Dec. 1998, SAMS Publishing, 1999. See e.g., pp. 1-742.
Materialized Views Techniques, Implementations, and Applications, Ashish Gupta and Inderpal Singh Mumick, Massachusetts Institute of Technology, 1999. . See e.g., pp. 339-420.
The Developer'S Handbook to DB2 for Common Servers, Roger E. Sanders, 1997. . See e.g., pp. 1-17, 83-158, 561-718.
Professional Data Warehousing With SQL Server 7.0 and OLAP Services, Sakhr Youness; Published by Wrox Press Ltd., 2000. . See e.g., pp. 1-131, 327-394, 475-574.
Client/Server Computing With Sybase SQl Server, Joe Salemi, Zift-Davis Press, 1994. . See e.g., pp. 1-90, 143-190.
Sybase System XI Performance Tuning Strategies, Ronald A. Phillips, Bonnie K. O'Neil, and Marshall Brain, Prentice-Hall, 1996. . See e.g., pp. 1-156.
Sybase Replication Server Primer by Charles B. Clifford, McGraW-Hili, 1995. . See e.g., pp. 1-172.
Developing Client/Server Systems Using Sybase SQL Server System 11, Sanjiv Purba, John Wiley & Sons, 1996. . See e.g., pp. 1-81, 297-378, 417-508.
Special Edition Using Sybase System XI, Peter Hazlehurst, Que Corporation, 1996. See e.g., pp. 1-331, 491-704.
Sybase SQL Server on the World Wide Web, Ed Ashley and Beth Epperson, International Thomson Computer Press, 1996. . See e.g., pp. 1-21, 235-269.
Data Warehousing With Informix: Best Practices, Angela Sanchez, Informix Press, Prentice Hall, 1998. . See e.g., pp. 1-312.11-20.
Informix Guide to Designing Databases and Data Warehouses, Informix Press, Prentice Hall, 2000. See e.g., pp. 1-3-.
Proceedings of the International Conference on Parallel and Distributed Processing Techniques and Applications, vol. I, H.R. Arabnia, CSREA Press, 1998. See e.g., pp. 415-468, 1127-1190.
Proceedings of the International Conference on Parallel and Distributed Processing Techniques and Applications, vol. II, H.R. Arabnia, CSREA Press, 1998. See e.g., pp. 1127-1190.
Proceedings of the International Conference on Parallel and Distributed Processing Techniques and Applications, vol. III, H.R. See e.g., pp. 415-468, 1127-1190.
Proceedings of the International Conference on Parallel and Distributed Processing Techniques and Applications, vol. IV, H.R. Arabnia, Csrea Press, 1998. See e.g., pp. 415-468, 1127-1190.
Upgrading and Migrating to Sybase SQL Server 11, Mitchell Gurspan, International Thomson Computer Press, 1996. . See e.g., pp. 189-218, 255-272.
The Computer Glossary, The Complete Illustrated Dictionary, Eighth Edition, Alan Freedman, The Computer Language Company, Inc., 1998.
Optimizing Informix Applications, Robert D. Schneider, Informix Press, Prentice Hall, 1995. See e.g., pp. 13-80.
A Practical Guide to Microsoft OLAP Server, John Shumate, Addison-Wesley, 2000. See e.g., pp. 3-84, 125-204, 219-236, 263-282, 309-395.
Using Microsoft SQL Server 7.0, Brad McGehee, Rob Kraft and Matthew Shepker, Oue Corporation, 1999. See e.g., pp. 11-66, 507-720.
Running Microsoft Excel, Second Edition, Douglas Cobb, Judy Mynhier, Craig Stinson and Chris Kinata, Microsoft Press, 1991. See e.g., pp. 431-445.
Microsoft Windows Software Development Kit, Guide to Programming, Version 3.1, Microsoft Corp, 1992. See e.g., pp. 333-366, 511-536.
Essbase Data Server Technical Reference Manual, Version 2.2, Arbor Software, 1992. 1-68, 259-272.
The Informix Handbook, Ron Flannery, Informix Press, Prentice-Hall, 2000. See e.g., pp. 1-425, 1101-1340.
Lotusworks Guide, Release 1.1, Spinnnaker Software, 1991. See e.g., pp. 3-1-3-44, 71-7-52, 16-1-16-42.
Software Engineering With ADA, Grady Booch, Benjamin Cummings Publishing Company, 1983. See e.g., pp. 38-45, 119-128.
Software Engineering With ADA, Second Edition, Grady Booch, Benajmin Cummings Publishing Company, 1987. See e.g., pp. 142-156.
Sybase Architecture and Administration, John Kirkwood, Ellis Horwood, 1993. See e.g., pp. 75-122.
Sybase Performance Tuning, Shaibal Roy and Marc B. Sugiyama, Prentice Hall, 1996. See e.g., pp. 49-68, 137-168, 301-366, 441-488, 531-612.
Sybase Database Administrator's Handbook, Brian Hitchcock, Prentice Hall, 1996. See e.g., pp. 1-72, 143-510.
Essbase Technical Reference Manual,Version 3.0, Arbor Software, 1994. See e.g., pp. 1-62.
Essbase Application Designer Guide, Version 3.0, Arbor Software, 1994. See e.g., pp. 1-254, 449-502.
An Introduction to Operating Systems, Harvey M. Deitel, Addison-Wesley, 1984. See e.g., pp. 153-246, 321-352.
Microsoft Windows Graphical Environment User'S Guide, Version 3.0, Microsoft Corp., 1990. See e.g., pp. 433-491.
Running Microsoft Excel, Douglas Cobb and Judy Mynhier, Microsoft Press, 1988. See e.g., pp. 431-488.
Advances in Database Technologies, Yahiko Kambayashi, Dik Lun Lee, Ee-Peng Lim, Mukesh Kumar Mohania and Yoshifumi Masunaga, Springer Press, 1998. See e.g., pp. 1-180, 382-590.
The Essbase Ready Tools Guide, Arbor Software. See e.g., pp. 1-572.
A Guide to Sybase and SQL Server, D. McGoveran and C.J. Date, Addison-Wesley, 1992. See e.g., pp. 3-16, 23-34, 37-49, 55-222, 303-318, 341-432, 473-490.
Data Warehouse From Architecture to Implementation, Barry Devlin, Addison-Wesley, 1997.
Building, Using and Managing the Data Warehouse, Ramon Barquin and Herb Edelstein, Prentice Hall, 1997.
Oracle8 Server Unleashed, Joe Greene, SAMS Publishing, 1998. See e.g., pp. 1-72, 169-414, 715-862.
Teach Yourself Oracle8 in 21 Days, Edward Whalen and Steve Adrien DeLuca, Sams Publishing, 1998. See e.g., pp. 1-530.
Oracle8 Design Using UML Object Modeling, Dr. Paul Dorsey and Joseph R. Hudicka, Oracle Press, McGraw-Hili, 1999. See e.g., pp. 1-472.
Oracle8 Design Tips, Dave Ensor and Ian Stevenson, O'Reilly & Associates, 1997. See e.g., pp. 1-136.
Oracle8 on Windows NT, Lilian Hobbs, Butterworth-Heinemann, 1998. See e.g., pp. 1-168, 251-272.
Oracle8 Architecture, Steve Bobrowski, Oracle Press, McGraw-Hill 1998. See e.g., pp. 1-374.
Oracle8 DBA Handbook, Kevin Loney, Oracle Press McGraw-Hill, 1998. See e.g., pp. 3- 474.
Oracle Tuning, Michael J. Corey, Michael Abbey, Daniel J. Dechichio and Ian Abramson, Oracle Press, McGraw-Hill, 1998. See e.g., pp. 3-282.
Microsoft Excel User's Guide 2, Microsoft Corp., 1992. See e.g., pp. 1-152.
Microsoft Excel Function Reference, Microsoft Corp., 1992. See e.g., pp. 1-580.

ORACLE8 How to, Edward Honour, Paul Dalberth, Ari Kaplan and Atul Mehta, Waite Group Press, 1998. See e.g., pp. 1-3.
Seagate Crystal Reports 7 for Dummies, Douglas J. Wolf, IDG Books, 1999. See e.g., pp. 1-398.
Data Warehousing, Strategies, Technologies and Techniques, Rob Mattison, McGraw Hill,1996. See e.g., pp. 1-352, 425-478.
Data Warehousing, Concepts, Technologies Implementations and Management, Harry Singh, Prentice Hall, 1998. See e.g., pp. 1-356.
Building a Better Data Warehouse, Don Meyer and Casey Cannon, Prentice Hall, 1998. See e.g., pp. 1-239.
Decision Support in the Data Warehouse, Paul Gray and Hugh Watson, Prentice Hall, 1998. See e.g., pp. 1-382.
Parallel Systems in the Data Warehouse, Stephen Morse and David Isaac, Prentice Hall, 1998. See e.g., pp. 97-384.
Data Warehousing for Dummies, Alan Simon, IDG Books Worldwide, 1997. See e.g., pp. 1-362.
Data Warehousing and Data Mining, Implementing Strategic Knowledge Management, Elliot King, PhotoDisc, Inc., 1998. See e.g., pp. 1-188.
Managing the Data Warehouse, Practical Techniques for Monitoring Operations, Administering Data and Tools, Managing Change and Growth, W.H. Inmon, J.D. Welch and Katherine Glassey, Wiley Computer Publishing, John Wiley & Sons, 1997. See e.g., pp. 1-394.
Planning and Designing the Data Warehouse, Ramon Barquin, Alan Paller, Herb Edelstein, Ellen Levin, Doug Neal, Carol Burleson, David Tabler, Pieter Mimno, Bob Rumsby, Glen Livingston, Neil Raden, Duane Hufford and Mark Poole, Prentice Hall, 1997. See e.g., pp. 1-322.
Data Warehouse Practical Advice From the Experts, Joyce Bischoff and Ted Alexander, Prentice Hall, 1997. See e.g., pp. 4-119, 174-401.
Data Mining, Data Warehousing & Client/Server Databases, Proceedings of the 8th International Database Workshop, Joseph Fong, Springer, 1997. See e.g., pp. 1-348.
Data Warehousing, Data Mining and OLAP, Alex Berson and Stephen Smith, McGraw-Hill, 1997. See e.g., pp. 1-46, 67-220, 247-265, 333-440.
On-Line Analytical Processing Systems for Business, Robert Thierauf, Quorum Books, 1997. See e.g., pp. 1-342.
Data Warehousing in Action, Sen Kelly, John Wiley & Sons, 1997. See e.g., pp. 1-329.
The Essential Guide to Data Warehousing, Lou Agosta, Prentice Hall, 2000. See e.g., pp. 1-100, 117-132, 151-238, 313-454.
The Enterprise Data Warehouse, Planning, Building and Implementation, vol. 1, Eric Sperley, Hewlett-Packard, 1999. See e.g., pp. 1-349.
Understanding Database Management Systems, Second Edition, Rob Mattison, McGraw-Hill, 1998. See e.g., pp. 1-90, 119-336, 397-524, 539-644.
The Data Warehouse Challenge, Taming Data Chaos, Michael Brackett, John Wiley & Sons, Inc., 1996. See e.g., pp. 1-142, 185-468.
Strategic Data Warehousing Principles Using SAS Software, Peter Welbrock, SAS Institute, 1998. See e.g., pp. 1-251.
Building the Operational Data Store, W.H. Inmon, Claudia Imhoff and Greg Battas, John Wiley & Sons, Inc., 1996. See e.g., pp. 1-291.
Essbase Web Gateway Workshop, Arbor Software, 1996. See e.g., pp. 1-186.
Wired for OLAP Designer & Administrator Version 3.0, Student Guide, Vision Enterprises, 1998. See e.g., pp. 1-126.
Crystal Info 6.0 Administrator Workshop, FastPlanet Technologies, 1998. See e.g., pp. 1-162.
Essbase Fundamentals, Workbook, Arbor Software, 1997. See e.g., pp. 1-180.
Hyperion's Spider-Man Web Application—Administrator, Hyperion Sofware Operations, Inc., 1998. See e.g., pp. 1-390.
Hyperion's Spider-Man Web Application—Technical Training For Is Professionals, Hyperion Software Operations, Inc., 1998. See e.g., pp. 1-198.
Arbor Essbase 5, Partitioning Training, Arbor Software, 1997. See e.g., pp. 1-225.
Step by Step Microsoft SQL Server 2000 Analysis Services, Reed Jacobsen, Microsoft Press, 2000. See e.g., pp. 1-394.
Oracle8 Data Warehousing, A Practical Guide to Successful Data Warehouse Analysis, Build and Roll Out, Michael Corey, Michael Abbey, Ian Abramson and Ben Taub, Oracle Press, Osborne/McGraw-Hill, 1998. See e.g., pp. 1-42, 99- 346, 429-664.
Temporal Databases, Theory, Design and Implementation, Tansel et al. Benjamin Cummings Publishing, 1993. See e.g., pp. 1-270, 294-593.
The Data Warehouse Toolkit, Ralph Kimball, John Wiley & Sons, 1996. See e.g., pp. 1-106, 143-152, 161-380.
Data Warehousing, Using the Wal-Mart Model, Paul Westerman, Academic Press, 2001. See e.g., pp. 1-304.
Using the New DB2 IBM's Object-Relational Database System, Don Chamberlin, Morgan Kaufmann Publishers, 1996. See e.g., pp. 1-224, 393-664.
Arbor Essbase Start Here, Version 1.0.1, IBM. See e.g., pp. 1-43.
Arbor Essbase Installation Notes, Version 1.0.1, IBM, Arbor Software, 1998. See e.g., pp. 1-318.
Reflex in Business, 17 Practical Examples for Business Analysis Using Relfex, The Analytic Database, Teddi Converse, Wade Ellis, Sr., Wade Ellis, Jr., and Ed Lodi, McGraw- Hill,1985. See e.g., pp. 1-270.
Combinatorial Optimization, Algorithms and Complexity, Christos Papadimitriou, and Kenneth Steiglitz, Prentice-Hall, 1982. See e.g., pp. 1-25.
ORACLE8i Data Warehousing, Lilian Hobbs and Susan Hillson, Digital Press, 2000. See e.g., pp. 1-392.
Using SAP R/3, ASAP World Consultancy, Oue Corporation, 1996. See e.g., pp. 1-148, 173-188.
Seagate Info, Report Design Guide, Version 7, Seagate Software. See e.g., pp. 1- 79, 158-197, 462-595.
Seagate Crystal Reports User's Guide, Version 6.0, Seagate Software, 1997. See e.g., pp. 192-215, 472-491, 516-643.
Business Objects User's Guide, Beta 1, Version 5.0 Windows, Business Objects, 1998. See e.g., pp. 9-134.
Brioquery 5.0 Handbook, for Microsoft Windows, Apple Mcintosh and Motif Systems, Brio Technology, 1997. See e.g., p. 1-2-9-11.
Brioquery Designer and Brioquery Explorer, Version 6.1, Reference Guide, Brio Technology, 2000. See e.g., pp. 1-344.
Brio Technology User's Guide, Version 6.0, Brio Technology, 1999. See e.g., pp. 1-188.
Crystal Reports 8 for Dummies, Douglas Wolf, IDG Books Worldwide, 2000. See e.g., pp. 1-353.
Getting Started With Data Warehouse and Business Intelligence, Maria Sueli Almeida, Missao Ishikawa, Joerg Reinschmidt and Torsten Roeber, IBM 1999. See e.g., pp. 1-260.
Using Tivoli Decision Support Guides, Vasfi Gucer, Janet Surasathain, Thomas Gehrke and Frank-Michael Nees, IBM, 1999. See e.g., pp. 1-10, 45-132, 371-414.
Data Modeling Techniques for Data Warehousing, Chuck Ballard, Dirk Herreman, Don Schau, Rhonda Bell, Eunsaeng Kim and Ann Valencic, IBM, 1998. See e.g., pp. 1-215.
Seagate Crystal Reports 6 Introductory Report Design Training Guide, Seagate Software, 1997. See e.g., pp. 1-244.
Essbase API Reference, Arbor Software, 1996. See e.g., pp. 1-364.
Essbase Technical Reference 4.0, Arbor Software. See e.g., pp. 1-362.
The Data Webhouse Toolkit: Building the Web-Enabled Data Warehouse, Ralph Kimball and Richard Merz, Wiley Computer Publishing, John Wiley and Sons, 2000. See e.g., pp. 1-40, 129-354.
Oracle 8 Backup & Recovery Handbook: Expert Methods From the Leading Authorities, Rama Velpuri and Anand Adkoli, Oracle Press, Osborne McGraw-Hill, 1998. See e.g., pp. 1-226, 371-614.
Informix Dynamic Server With Universal Data Option : Best Practices, Angela Sanchez, Prentice Hall, 1999. See e.g., pp. 1-94, 119-388.
Ouattro Pro Version 2.0 User'S Guide, Borland International, Inc., 1987. See e.g., pp. 49-80.
Programming Language Concepts, Carlo Ghezzi and Mehdi Jazayeri, John Wiley & Sons, 1982. See e.g., pp. 1-341.
Fullwrite Professional Learning Guide, Ashton Tate. See e.g., pp. 1-299.

The Sybase SQL Server Survival Guide, Jim Panttaja, Mary Panttaja and Judy Bowman, Wiley Computer Publishing, John Wiley & Sons, 1996. See e.g., pp. 1-374.
Microsoft Data Warehousing: Building Distributed Decision Support Systems, Robert S. Craig, Joseph A. Vivona and David Bercovitch, Wiley Computer Publishing, John Wiley & Sons, 1999. See e.g., pp. 1-379.
ORACLE8 Data Warehousing: A Hands-On Guide to Designing, Building, and Managing Oracle Data Warehouses, Gary Dodge and Tim Gorman, Wiley Computer Publishing, John Wiley & Sons, 1998. See e.g., pp. 1-638.
ORACLE 8 Administration and Management, Michael Ault, Wiley Computer Publishing, John Wiley & Sons, 1998. See e.g., pp. 1-110, 135-798.
Building a Data Warehouse for Decision Support, Vidette Poe, Prentice Hall, 1996. See e.g., pp. 1-219.
Object-Oriented Data Warehouse Design: Building a Star Schema, William G Giovinazzo, Prentice Hall, 2000. See e.g., pp. 1-361.
Informix Universal Data Option, Paul Allen and Joe Bambera, McGraw-Hill, 1999. See e.g., pp. 1-230, 313-468, 555-838.
Client/Server Database Design With Sybase: A High-Performance and Finetuning Guide, George W. Anderson, McGraw-Hill, 1997. See e.g., pp. 1-146, 309-452, 477-570.
Borland Ouattro Pro for Windows, Version 5.0, Borland International, 1993. See e.g., pp. 1-10, 353-498.
Microsoft SQL Server 7.0 Databse Implementation Training Kit, Microsoft Press, 1999. See e.g., pp. 1-157, 231-328, 381-412.
Microsoft SQL Server 7.0 Data Warehousing Training Kit, Microsoft Press, 2000. See e.g., pp. 1-752.
Optimizing SQL Server 7: Planning and Building a High-Performance Database, Second Edition, Robert D. Schneider and Jeffrey R. Garbus, Prentice Hall, 1999. See e.g., pp. 1-202, 333-525.
Sybase Developer'S Guide, Daniel J. Worden, SAMS Publishing, 1994. See e.g., pp. 1-393.
Microsoft SQL Sever OLAP Developer's Guide, William C. Amo, IDG Books Worldwide, 2000. See e.g., pp. 1-380.
Data Warehousing, Building the Corporate Knowledgebase, Tom Hammergren, International Thomson Computer Press, 1996. See e.g., pp. 1-106, 205-456.
Informix Unleashed, The Comprehensive Solutions Package, John McNally, Glenn Miller, Jim Prajesh and Jose Fortuny, SAMS Publishing, 1997. See e.g., pp. 1-718.
Hyperion Essbase 5: Training Fundamentals, Hyperion Solutions Corp. See e.g., pp. 1-390.
Hyperion Essbase 5: Training Partitioning, Hyperion Solutions Corp. See e.g., pp. 1-292, 441-662.
ORACLE8 Bible, Carol McCullough-Dieter, IDG Books Worldwide, Inc.~ 1998. See e.g., pp. 1-292, 441-1090.
Personal Oracle 8: A Voyage Into ORACLE8'S Newest Frontier, Richard Fieldhouse, International Thomson Publishing, 1998. See e.g., pp. 31-204, 279-342, 401-554.
Sybase Client/Server Explorer, James Bean, Coriolis Group books, 1996. See e.g., pp. 67-136, 159-392.
ORACLE8 Database Administration on Windows NT, Lynnwood Brown, Prentice Hall, 1999. See e.g., pp. 1-298.
Data Warehouse Management Handbook, Richard Kachur, Prentice Hall, 2000. See e.g., pp. 1-346.
ORACLE8 PL/SQL Programming: The Essential Guide for Every Oracle Programmer, Scott Urman, Oracle Press, Osborne McGraw-Hill, 1997. See e.g., pp. 1-202, 463-502, 549-960.
ORACLE8 &Unix Performance Tuning, Ahmed Alomari, Prentice Hall, 1999. See e.g., pp. 1-345.
ORACLE8 &Windows NT Black Book, Mike Curtis and Jacqueline King, Coriolis Group, 1998. See e.g., pp. 1-30, 273-798.
Database Performance Tuning Handbook, Jeff Dunham, McGraw-Hill, 1998. See e.g., pp. 137-314, 363-462, 537-558, 585-762.
Datawarehousing: Architecture and Implementation, Mark Humphries, Michael W. Hawkins and Michelle C. Dy, Harris Kern's Enterprise Computing Institute, Prentice Hall, 1999. See e.g., pp. 1-372.
Official Sybase Data Warehousing on the Internet: Accessing the Corporate Knowledge Base, Tom Hammergren, International Thomson. See e.g., pp. 1-208, 363-592.
SQL Server Developer's Guide to Olap With Analysis Services, Mike Gunderloy and Tim Sneath, Sybex Inc., 2001. See e.g., pp. 1-468.
Arbor Essbase 5: Release Training, Arbor Software, 1997. See e.g., pp. 1-316.
Hyperion End User Training: Essbase Spreadsheet Ad-In for Excel, Hyperion Solutions, 1998. See e.g., pp. 1-278.
Data Mining a Hands-On Approach for Business Professionals, Robert Groth, Prentice Hall, 1998. See e.g., pp. 1-295.
Microsoft SQL Server 7 for Dummies, Anthony Mann, Hungry Minds, 1998. See e.g., pp. 1-388.
Microsoft OLAP Unleashed, Second Edition, Tim Peterson and Jim Pinkelman, Sams Publishing, 2000. See e.g., pp. 1-890.
Data Warehousing With Microsoft Sol Server 7.0 Technical Reference, Jake Sturm, Microsoft Press, 2000. See e.g., pp. 1-240, 264-430.
Official Sybase Internals: Designing and Troubleshooting for High Performance, John Kirkwood, International Thomson Publishing, 1998. See e.g., pp. 1-54, 111-186, 329-406.
SQL Server 7 Data Warehousing, Michael Corey, Michael Abbey, Ian Abramson, Larry Barnes, Benajmin Taub and Rajan Venkitachalam. See e.g., pp. 1-32, 77-448.
Official Sybase SQL Anywhere: A Developer's Guide, Ian Richmond, Steve Clayton and Derek Ball, International Thomson Publishing, 1997. See e.g., pp. 1-108, 191- 374.
Business Intelligence: The IBM Solution, Datawarehousing and OLAP, Mark Whitehorn and Mary Whitehorn, Springer, 1999. See e.g., pp. 1-304.
Sybase SQL Server: Performance and Tuning Guide, Karen Paulsell, Sybase Inc., 1996. See e.g., pp. 13-56, 163-334.
Mastering Sybase SQL Server 11, Charles B. Clifford, McGraw-Hill, 1997. See e.g., pp. 1-242, 329-532.
ORACLE8 for Dummies, Carol McCullough, IDG Books, 1997. See e.g., pp. 1-388.
Sybase SQL Server 11 Unleashed, Ray Rankins, Jeffrey R. Garbus, David Solomon and Bennet W. McEwan, Sams Publishing, 1996., See e.g., pp. 1-226.
ORACLE8 Advanced Tuning & Administration, Eyal Aronoff, Kevin Loney and Noorali Sonawalla, Oracle Press, McGraw-Hill, 1998. See e.g., pp. 1-540.
Sybase DBA Companion, Brian Hitchcock, Prentice Hall, 1997. See e.g., pp. 1-80, 201- 326.
Microsoft OLAP Solutions, Erik Thomsen, George Spofford and Dick Chase, Wiley Computer Publishing, John Wiley & Sons, 1999. See e.g., pp. 1-356.
Teach Yourself ORACLE8 Database Development in 21 Days, David Lockman, Sams Publishing, 1997. See e.g., pp. 1-404.
The Data Warehouse Method, Neilson Thomas Debevoise, Prentice Hall, 1999. See e.g., pp. 1-208, 261-426.
ORACLE8 Black Book, Michael R. Ault, Coriolis Group Books, 1998. See e.g., pp. 1-66, 143-572.
Sybase SQL Server 11 DBA Survival Guide, Second Edition, Jeffrey Garbus, David Solomon, Brian Tretter and Ray Rankins, SAMS Publishing, 1996. See e.g., pp. 1-12, 91-362.
Sybase SQL Server 11: An Administrator's Guide, John Kirkwood, International Thomson Computer Press, 1996. See e.g., pp. 149-196, 231-540.
Data Warehousing, Sean Kelly, John Wiley & Sons, 1996. See e.g., pp. 1-213.
Unlocking OLAP With Microsoft SQL Server and Excel 2000, Wayne S. Freeze, IDG Books, 2000. See e.g., pp. 1-462.
Developing Sybase Applications, Daniel J. Worden, Sams Publishing, 1995. See e.g., pp. 1-113, 216-440.
Physical Database Design for Sybase SQL Server, Rob Gillette, Dean Muench and Jean Tabaka, Prentice-Hall, 1995. See e.g., pp. 1-242.
Discrete Mathematical Structures With Applications to Computer Science, J.P. Tremblay and R. Mahohar, McGraw -Hill, 1975. See e.g., pp. 1-103.
Developing Client/Server Systems Using Sybase SQL Server System 10, Sanjiv Purba, John Wiley & Sons, 1994. See e.g., pp. 1-399.
Sybase DBA Survival Guide, Jeff Garbus, David Solomon and Brian Tretter, Sams Publishing, 1995. See e.g., pp. 1-130, 177-246, 411-490.

ORACLE8 The Complete Reference, George Koch and Kevin Loney, Oracle Press, McGraw-Hill,1997. See e.g., pp. 1-540.
CA Office Action dated Jan. 13, 2010.
EPO Examination Report and Notice of Oral Hearing re EP 1 266 308 dated Apr., 23, 2009.
EPO Examination Report re EP 1 266 308 dated Nov. 21, 2006.
EPO Examination Report re EP 1 266 308 dated Oct. 20, 2004.
EPO Supplemental Search Report re EP 1 266 308 dated Jul. 16, 2004.
EPO Decision to Refuse a European Patent re EP 1 266 308 dated Feb. 10, 2010.
PCT International Search Report re PCT/IB2000/01100, dated Jan. 2, 2001.
PCT International Search Report re PCT/US2001/06316 dated May 14, 2001.
PCT International Examination Report re PCT/US2001/06316 dated Dec. 28, 2001.
ORACLE8 A Beginner's Guide, Michael Abbey and Micheal J. Corey, Oracle Press, McGraw-Hill, 1997.
ORACLE8 Object-Oriented Design, David Anstey, Coriolis, 1998.
ORACLE8 Tuning, Don Burleson, Coriolis, 1998.
Sybase and Client/Server Computing, Second Edition, Alex Berson and George Anderseon, McGraw-Hill, 1997. See e.g., pp. 171-478, 741-842.
Sybase and Client/Server Computing, Alex Berson and George Anderson, McGraw-Hill, 1995.
CA Office Action dated Jan. 24, 2011.
Stonebraker, M., et al.: "The Postgres Next-Generation Database Management System", Communications of the ACM, Oct. 1991, vol. 34, No. 10, pp. 78-72. Exhibit A5 to Appeal Brief.
Rafanelli, M.: "Multidimensional Databases: Problems and Solutions", Idea Group Inc., 2003 3 pgs. (cover, forward). Exhibit A4 to Appeal Brief.
Thomsen, E.: "OLAP Solutions—Building Multidinemsional Information Systems", 1997 in 5 pages Exhibit A3 to Appeal Brief.
Colliat, G.: OLAP, Relational, and Multidimensional Database Systems, SIGMOD Record, vol. 25, No. 3, Sep. 1996. Exhibit A2 to Appeal Brief.
Vassiliadis, P.: Modeling Multidimensional Databases, Cubes and Cube Operations, National Technical University of Athens. Exhibit A1 to Appeal Brief.
Japanese Office Action re JP 2001-565050, dated Feb. 15, 2011.
U.S. Appl. No. 12/455,664 dated Jun. 21, 2010.
U.S. Appl. No. 12/653,373 dated Feb. 22, 2011.
U.S. Appl. No. 12/590,504 dated Feb. 2, 2011.
comp.databases' website re Access DBMS? Not RDBMS? Jun. 1994.
Rana, et al., A Distributed Framework for Parallel Data Mining Using HP Java, BT technol J vol. 17 No. 3 Jul. 1999. pp. 146-154.
Windows IT Pro's website re A New Kid on the OLAP Block by Karen Watterson, May 1, 1998.
Schumacher, Robin. BrioOuery Enterprise 4.0; Brio Technology's desktop OLAP tool, lexis.com; DBMS Magazine, vol. 9, No. 10, Sep. 1996.
Michael, J., et al. DM Review's website re Charles Schwab Plans for Continued Prosperity with Seagate Holos Oct. 1998.
Craig, Robert: "Checking Out OLAP Architectures: Technology Information", a Boucher Communications, Inc. publication, Section No. 12, No. 12; 1997; p. 40, ISSN: 1085-2395.
Spitzer, Tom. Component architectures; component-based software development; technology information, Lexis, DBMS Magazine, vol. 10, No. 10, Sep. 1997.
Winter, R., Intelligent Enterprise's website re Databases: Back in the OLAP Game, vol. 1, No. 4, Dec. 15, 1998.
Bearson et al., "Data Warehousing, Data Mining, and OLAP.", pp. 104-107, 1997.
Kurz, Andreas, A Min Tjoa, Data Warehousing within Intranet: Prototype of a Web based Executive Information System, Abstract, 1997. pp. 627-632.
Elkins, S.B.. Islands of OLAP, DBMS Magazine, Apr. 1998.
Mckie, S., dbmsmag's website re What's New in 4.0, DBMS Magazine, Jul. 1996.
Reimers, How to Sort Through the OLAP Maze, Lexis, Software Magazine, vol. 17, No. 5, May 1997.
Bontempo et al., The IBM Data Warehouse Architecture, Communications of the ACM (vol . 41 No. 9), Sep. 1998.
Bontempo et al., The IBM Data Warehouse Architecture, Communications of the ACM (vol. 41 No. 9), Sep. 1998. pp. 38-48.
Davis, Judith. IBM's DB2 Spatial Extender: Managing Geo-Spatial Information Within the DBMS, IBM corporation, May 1998.
Information Builders Intros "Fusion" MODS Warehouse, Post•Newsweek Business Information Inc. Lexis, May 16, 1996.
ClearConnect Installation and Reference Guide, Manual. 2 Introducing ClearConnect and DRDA ClearConnect Release 1.3 pp. 2-1 and 2-4. "Last Revised: Jul. 31, 1997".
Groh et al., Managing Multidimensional Data marts with Visual Warehouse and DB2 OLAP Server, IBM Dec. 1998.
Mattison, R.: A White Paper—Maximizing Database Performance with the Omnidex Query Accelerator 1998.
Chen et al., OLAP-Based Scalable Profiling of Customer Behavior, Abstract, 1999.
Chen et al., OLAP-Based Scalable Profiling of Customer Behavior, Abstract, DaWak '99 LNCS 1676 pp. 55-64 1999.
Pendse, N., The OLAP Report's website OLAP Architectures, 2005.
Pendse, N., The OLAP Report's website OLAP Architectures, Feb. 11, 2005.
Greenberg, Ilan. OLAP or ROLAP, InfoWorld, Jun. 10, 1996.
Pendse, N. The OLAP Report's website re Database Explosion, 1998.
Pendse, N. The OLAP Report's website re Database Explosion, Oct. 18, 1998.
Comp.databases' website re OLAP Storage Algorithms, 1997.
Comp.databases' website re OLAP Storage Algorithms, Comp. databases.olap newsgroup thread Apr. 1, 1997.
Biggs, Maggie. Pilot lands Impressive OLAP Suite, Product Reviews, Infoworld, vol. 20, No. 36, Sep. 7, 1998.
Codd et al., Providing OLAP to User-Analysts: An IT Mandate. Hyperion Solutions Corporation 1993.
Harrington, et al.: "Relational Database Design Clearly Explained", 1998, pp. v-xiii, 1-62, Morgan Kaufman.
blgate.c1's website re Seagate Holos Roadmap 1997.
Yoshizawa et al., Sal Based Association Rule Mining Using Commercial RDBMS (IBM DB2 UDB EEE) Abstract, 2000.
Yoshizawa et al., SQL Based Association Rule Mining Using Commericial RDBMS (IBM DB2 UDB EEE) Da Wak 2000 LNCS 1874 pp. 301-306 2000.
Spinner, Karen. Unlocking the Data Warehouse with OLAP, Wall Street & Technology, vol. 15, No. 1, Jan. 1, 1997, pg. PD18.
Taylor, The Warehouse Meets the Web, The Data Administration Newsletter (Mar. 21, 2005).
Nadeau et al., Achieving Scalability in OLAP Materialized View Selection (Extended Version), (2002).
Nadeau et al., Achieving Scalaboloty in OLAP Materialized View Selection (Extended Version, (2002) Proceedings of DOLAP '02 Nov. 8, 2002.
Whitney, R. Windows IT Pro Website Page re: SOL Server Analysis Services 8.0, May 2000.
Radsen, Boost Warehouse Performance Technology Tutorial Part II (2002).
Rowe et al., Data Abstration, Views and Updates in Rigel (1979).
Rowe, et al., "Data Abstraction, Views and Updates in Rigel", Proceedings of the 1979 ACM SIGMOD International Conference on Management of Data, pp. 71-81, 1979.
Graefe, DataCube: An Integrated Data and Compute Server Based on a Hypercube-Connected Dataflow Database Machine, Oregon Graduate Center (Jul. 1988).
Berson, et al, Data Warehousing, Data Mining, and OLAP, McGraw-Hill Companies, 1997, pp. 104-107.
Berson and Smith, Data Warehousing, Data Mining, and OLAP, McGraw-Hill Companies, 1997, pp. 98-100.
Watterson, K. Windows IT Pro Website p. re: DB2 OLAP Server 1.0, Sep. 1998.
Kalman, D. et al., DBMS Online's website re Sybase Inco's Dennis McEvoy—System 11 Strategy, Oct. 1995.

Mohan, DWMS: Data Warehousing Management System, Software Ag of Far East, Inc., Proceedings of the 22nd Vldb Conference, 1996, pp. 588-.
sbt's website re Data Management—A Bedtime Story for Database Managers 1990.
Data Sheet—Designed and Optimized for Business-Critical Data Warehousing, Informix Red Brick Warehouse 1999.
website re Introduction to OLE DB for OLAP, 2005.
Microsoft website re Introduction to OLE DB for OLAP 2005.
Lau., Microsoft SQL Server 7.0 Performance Tuning Guide, SQL7 performance tuning.doc, Oct. 1998.
Lyco's website re prices on Microsoft SQL Server 7.0 for PC Sep. 11, 2005.
Gimarc and Spellman., Modeling Microsoft SQL Server 7.0, Abstract—SES Proceedings of CMG '98, Dec. 6-11. 1998.
Andrews, D. byte's website re Jeff Stamen, senior vice president of Oracle's OLAP division, discusses the convergence of multidimensional and relational OLAP databases, Aug. 1996.
Margaritis et al., Netcube: A Scalable Tool for Fast Data Mining and Compression, Abstract—Carnegie Mellon University, Proceedings of the 27th VLDB Conference 2001.
Pfeiff, B., Windowsitpro's website re OLAP: Resistance is Futile!, Apr. 1999.
database olap's website re OLAP with Regression Analysis, Built for Analysts? Jun. 1990.
Brain, J. comp.databases.olap's newsgroup thread databases.olapss website re OLAP with Regression Analysis, Built for Analysts? Jun. 17, 1996.
Elkins., Open OLAP, DBMS, Apr. 1998.
Elkins., Open OLAP, DBMS, Apr. 1998, http://www.dbmsmag.com/9804d14.html, pp. 1-7.
Endress., Oracle 9i OLAP Release 2: A Relational-Multidimensional Database for Business Intelligence, Oracle Apr. 2001.
Oracle Express Relational Access Manager, A Source-Transparent Decision Support Solution 1998.
Oracle Express Server, Enhanced Corporate Performance 1998.
White Paper—Delivering OLAP to the Enterprise. Oracle Jan. 1997.
databases.olap's website re Oracle for reporting?, Nov. 2002.
comp.databases.olap newsgroup thread databases.olap's website re Oracle for reporting? Nov. 7, 2002.
PartitionAggregationss7.txt May 11, 2005.
Lexis—Red Brick, Accrue to embed Red Brick Warehouse RDBMS in online user response analysis system, M2 Presswire Dec. 11, 1996.
Colby, et al.: "Red Brick Vista™: Aggregate Computation and Management", Data Engineering, 1998. Proceedings, 14th International Conference on Orlando, FL, USA Feb. 23-27, 1998, Los Alamitos, CA USA, IEEE Comput. Soc, US, Feb. 23, 1998, pp. 174-177.
DBMS online's website re Red Brick Warehouse 5.1, Relational data warehousing and data mining are reaching new heights, Jun. 1998.
Rennhackkamp, J, DBMS online's website re Red Brick Warehouse 5.1, Relational data warehousing and data mining are reaching new heights Jun. 1998.
White Paper—Extending the Scale, Reach, and Range of Your Data Warehouse, Next-Generation Data Warehousing, Sybase Interactive Warehouse 1997.
DBMSmag's website re A Black Eye Heals as Sybase System 11 Recovers from Performance and Quality Problems in System 10, Nov. 1996.
DBMSmag's website re A Black Eye Heals as Sybase System 11 Recovers from Performance and Quality Problems in System 10, DMBS Magazine Nov. 1996.
Rennhackkamp, M. DBMSmag's website re A Black Eye Heals as Sybase 11Recovers from Performance and Quality Problems in System Nov. 10, 1996.
DBMS online's website re An Interactive Warehousing Architecture Can Extend the Scale of Your Information, Aug. 1997.
DBMS online's website re An Interactive Warehousing Architecture Can Extend the Scale of Your Information, DMBS Magazine, Aug. 1997.
Rennhackkamp, M. DBMS online's website re An Interactive Warehousing Architecture Can Extend the Scale of Your Information Aug. 1997.

Lexis—The Informix Enterprise Strategy, Information Access Company, DBMS Magazine, vol. 9, No. 7, p. 42, Jun. 1996.
McKie, S.—The Informix Enterprise Strategy, Information Access Company, DBMS Magazine vol. 9 No. 7 p. 42 Jun. 1996.
McKie, S.—The Informix Enterprise Strategy, Information Access Company, A Thomson Corporation, DBMS Magazine vol. 9 No. 7 p. 42 Jun. 1996.
Campbell, The New locking, logging, and Recover Architecture of Microsoft SQL Server 7.0, Microsoft Corporation, Proceeding of the 25th VLDB Conference, 1999.
Campbell, The New locking, Logging, and Recover Architecture of Microsoft SQL Server 7.0, Microsoft Corporation, Proceeding of the 25th VLDB Conference, 1999 p. 249.
Rigney, T., DBMS online's website re The Sybase Enterprise, May 1996.
Raden, Worlds in Collision, Merging Business and IT Architecture Perspectives to Evaluate Query and Analysis Tools Successfully, DBMS Magazine, Aug. 1997.
Nadeau & Teorey, Achieving Scalability in OLAP Materialized View Selection, DOLAP 02 Nov. 8, 2002.
Buzydlowski et al., A Framework for Object-Oriented On-Line Analytic Processing, Abstract-DOLAP Proceedings of DOLAP '98, 1998.
Buzydlowski et al., A Framework for Object-Oriented On-Line Analytic Processing, Abstract-DOLAP Proceedings of DOLAP '98, Nov. 7, 1998, pp. 10-15.
Buzydlowski et al., A Framework for Object-Oriented On-Line Analytic Processing, Abstract-DOLAP, 1998.
Liu and Ursu, A Framework for Global Optimization of Aggregate Queries, Abstract—CIKM, 1997.
Liu and Ursu, A Framework for Global Optimization of Aggregate Queries, Abstract—CIKM Proceedings of CIKM '97, 1997, 1997.
Liu and Ursu, A Framework for Global Optimization of Aggregate Queries, Abstract—CIKM Proceedings of CIKM '97, pp. 262-269.
Mangisengi., A Multidimensional Modeling Approach for OLAP within the Framework of the Relational Model Based on Quotient Relations, Abstract—DOLAP, 1998.
Mangisengi., A Multidimensional Modeling Approach for OLAP within the Framework of the Relational Model Based on Quotient Relations, Abstract—DOLAP Proceedings of DOLAP '98, 1998.
Mangisengi., A Multidimensional Modeling Approach for OLAP within the Framework of the Relational Model Based on Quotient Relations, Abstract—DOLAP Proceedings of DOLAP '98, pp. 40-46.
Trujillo et al., An Object Oriented Approach to Multidimensional Database Conceptual Modeling (OOMD), Abstract—DOLAP, 1999.
Trujillo et al, An Object Oriented Approach to Multidimensional Database Conceptual Modeling (OOMD), Abstract—Dolap Proceedings of DOLAP '98 1999.
Trujillo et al, An Object Oriented Approach to Multidimensional Database Conceptual Modeling (OOMD), Abstract—DOLAP Proceedings of DOLAP '98, pp. 16-21.
Bose and Sugumaran., Application of Intelligent Agent Technology for Managerial Data Analysis and Mining, Abstract. Data Base, The Data Base for Advances in Information Systems, vol. 30, No. 1, Winter 1999.
Bose and Sugumaran., Application of Intelligent Agent Technology for Managerial Data Analysis and Mining, Abstract Data Base, The Data Base for Advances in Information Systems, vol. 30, No. 1, Winter 1999 pp. 77-94.
Damiani and Bottarelli, A Terminological Approach to Business Domain Modeling, Abstract-EEC Proceedings of the International Conference on Database and Expert Systems 1990.
Damiani and Bottarelli, A Terminological Approach to Business Domain Modeling, Abstract-EEC Proceedings of the International Conference on Database and Expert Systems 1990 pp. 340-345.
DeWitt et al., Client-Server Paradise, Abstract, Proceedings of the 20th VLDB Conference 1994.
DeWitt et al., Client-Server Paradise, Abstract, Proceedings of the 20th VLDB Conference 1994 pp. 558-569.
McFadden., Data Warehouse for EIS: Some Issues and Impacts, Abstract-IEEE 1996 pp. 120-129.

McFadden., Data Warehouse for EIS: Some Issues and Impacts, Abstract-IEEE 1996 Proceedings of the 29th Hawaii Conference on Systems Sciences.

Cheung et al., DROLAP—A Dense-Region Based Approach to On-Line Analytical Processing, Abstract.DEXA '99.

Cheung et al., DROLAP—A Dense-Region Based Approach to On-Line Analytical Processing, Abstract.DEXA '99, LNCS 1677 pp. 761-770 1999.

Kotidis, Y. and N. Roussopoulos "DynaMat: A Dynamic View of Management System for Data Warehouses", Proceedings of ACM SIGMOD International Conference on Management of Data, Jun. 1-3, 1999.

Sun and Grosky., Dynamic Maintenance of Multidimensional Range Data Partitioning for Parallel Data Processing, Abstract—DOLAP '98.

Sun and Grosky., Dynamic Maintenance of Multidimensional Range Data Partitioning for Parallel Data Processing, Abstract—DOLAP '98 pp. 72-79.

Peneva and Angelova., End-User Interface to Improve Microcomputer DBMS Efficiency, Abstract Proceedings of the International Conference on Database and Expert System Applications 1991.

Rundensteiner and Sic., Evaluating Aggregates in Possibilistic Relational Databases, Abstract, Jan. 1991.

Hsiao et al., The Federated Databases and System: A New Generation of Advanced Database System, Abstract Proceeding of DEXA '90.

Hsiao et al., The Federated Databases and System: A New Generation of Advanced Database System, Abstract Proceeding of DEXA '90 1990 pp. 186-190.

Eder., General Transitive Closures and Aggregate Functions, Abstract, 1991.

Eder., General Transitive Closures and Aggregate Functions, Abstract Proceedings of DEXA 91., 1991.

Eder., General Transitive Closures and Aggregate Functions, Abstract Proceedings of DEXA 91., 1991 pp. 54-59.

Goil and Choudhary, High Performance Data Mining Using Data Cubes on Parallel Computers, Abstract—IEEE 1998.

Goil and Choudhary, High Performance Data Mining Using Data Cubes on Parallel Computers, Abstract—IEEE 1998 pp. 548-555.

Goil and Choudhary, High Performance Multidimensional Analysis of Large Datasets, Abstract—DOLAP '98.

Goil and Choudhary, High Performance Multidimensional Analysis of Large Datasets, Abstract—DOLAP '98 1998 pp. 34-39.

Muto and Kitsuregawa, Improving Main Utilization for Array-Based Datacube Computation, Abstract—DOLAP '98.

Muto and Kitsuregawa, Improving Main Utilization for Array-Based Datacube Computation, Abstract—DOLAP '98 1998 pp. 28-33.

Nestorov and Tsur, Integrating Data Mining with Relational DBMS: A Tightly-Coupled Approach, Abstract—NGITS, 1999.

Nestorov and Tsur, Integrating Data Mining with Relational DBMS: A Tightly-Coupled Approach, Abstract-NGITS 99, L.Nes 1649 pp. 295-311 1999.

Fernandez-Baizan et al., Integrating KDD Algorithms and RDBMS Code, Abstract Proceedings of RSCTC '98.

Fernandez-Baizan et al., Integrating KDD Algorithms and RDBMS Code, Abstract Proceedings of RSCTC '98 pp. 210-213 1998.

Andlinger et al., Making C++Object Persistent by Using a Standard Relational Database System Proceedings of DEXA '91.

Andlinger et al., Making C++Object Persistent by Using a Standard Relational Database System Proceedings of DEXA '91 1991 pp. 374-379.

Rafanelli and Ricci, Mefisto: A Functional Model for Statistical Entities, IEEE, 1993.

Rafanelli and Ricci, Mefisto: A Functional Model for Statistical Entities, IEEE Jul. 16, 1992 pp. 670-681.

Gunzel et al., Modeling of Census Data in a Multidimensional Environment, Springer, Sep. 1998.

Gunzel et al., Modeling of Census Data in a Multidimensional Environmental. Sorinzer Procccdinus of ADBIS '98 Sep. 7-10. 1998.

Gunzel et al., Modeling of Census Data in a Multidimensional Environmental. Sorinzer Procccdinus of ADBIS '98 Sep. 7-10. 1998 pp. 363-368.

SAP Multi-Dimensional Modeling with BW, ASAP for BW Accelerator—A background to the techniques used to create SAP BW InfoCubes Document Version 2.0 2000.

Gingras and Lakshmanan, nD-SQL: A Multi-Dimensional language for Interoperability and OLAP, Abstract, 1998.

Gingras and Lakshmanan, nD-SQL: A Multi-Dimensional Language for Interoperability and OLAP, Abstract Proceedings of the 24th VLDB Conference 1998.

Shatdal, Order Based Analysis Functions in NCR Teradata Parallel RDBMS, Abstract Proceeding of EDBT 2000.

Shatdal, Order Based Analysis Functions in NCR Teradata Parallel RDBMS, Abstract Proceeding of Edbt 2000 pp. 219-223.

Albrecht et al., An Architecture for Distributed OLAP, Abstract, 1998.

Albrecht et al., An Architecture for Distributed OLAP, Abstract Proceedings of PDPTA '98.

Albrecht et al., An Architecture for Distributed OLAP, Abstract Proceedings of PDPTA '98 Jul. 13-16 pp. 1482-1488.

Charczuk, Physical Structure Design for Relational Databases, Abstract Proceedings of ADBIS '98.

Charczuk, Physical Structure Design for Relational Databases, Abstract Proceedings of ADBIS '98 1998 pp. 357-362.

Charczuk, Physical Structure Design for Relational Databases, Abstract, 1998.

Lenz and Shoshani, Summarizability in OLAP and Statistical Data Bases, Abstract-IEEE 1997 pp. 22-27.

Lenz and Shoshani, "Summarizability in OLAP and Statistical Data Bases", Procedings of the 9th International Conference on Scientifice and Statistical Database Management, Aug. 11-13, 1997, pp. 132-143.

Lehner, et al. "Normal Forms for Miltidimensional Databases", Proceedings of the 10th International Conference on Scientific and Statistical Database Management, Jul. 1-3, 1998, pp. 63-72.

Hwang, Summary Data Representations in Application Developments, Abstract, Sep. 1993.

Hwang, Summary Data Representations in Application Developments, Abstract DEXA 93 pp. 643-654.

Hwang, Summary Data Representations in Application Developments, Abstract Proceedings of DEXA '93 Sep. 1993.

Dinter et al., The OLAP Market: State of the Art and Research Issues, Abstract—DOLAP '98.

Dinter et al., The OLAP Market: State of the Art and Research Issues, Abstract—DOLAP '98 pp. 22-27.

Wieczerzycki, Transaction Management in Databases Supporting Collaborative Applications, Abstract Proceedings of ADBIS '98 1998.

Wieczerzycki, Transaction Management in Databases Supporting Collaborative Applications, Abstract Proceedings of ADBIS '98 pp. 107-118.

Bellahsene, View Adaption in Data Warehousing Systems, Abstract, 1998.

Bellahsene, View Adaption in Data Warehousing Systems, Abstract Proceedings of DEXA '98 Aug. 1998.

Bellahsene, View Adaption in Data Warehousing Systems, Abstract Proceedings of DEXA '98 pp. 300-309.

Batini et ai, A Comparative Analysis of Methodologies for Database Schema Integration,ACM Computing Surveys, vol. 18, No. 2, Dec. 1996.

Batini et al, A Comparative Analysis of Methodologies for Data Schema Integration,ACM Computing Surveys, vol. 18, No. 2 Dec. 1986.

Batini et al, A Comparative Analysis of Methodologies for Data Schema Integration,ACM Computing Surveys, vol. 18, No. 2 1987 pp. 323-364.

Shatdal and Naughton., Adaptive Parallel Aggregation Algorithms, SIGMOD '95, San Jose, CA USA, © 1995 ACM 0-89791-731-6/95/ 0005.

Gyssens and Lakshmanan., A Foundation for Multi-Dimensional Databases, 1997.

Gyssens and Lakshmanan., A Foundation for Multi-Dimensional Databases Proceedings of the 23'd VLDB Conference 1997.

Gyssens and Lakshmanan., A Foundation for Multi-Dimensional Databases Proceedings of the 23'd VLDB Conference 1997 pp. 106-115.
Gupta et al., Aggregate-Query Processing in Data Warehousing Environments, 1995.
Gupta et al., Aggregate-Query Processing in Data Warehousing Environments Proceedings of the 21st VLDB Conference 1995.
Devlin and Murphy., An Architecture for a Business and Information System, IBM Systems Journal, vol. 27, No. I 1998.
Devlin and Murphy., An Architecture for a Business and Information System, IBM Systems Journal, vol. 27, No. 1 1988 pp. 60-80.
Nadeau and Teorey., A Pareto Model for OLAP View Size Estimation, Information Systems Frontiers 5:2, 137-147, 2003.
Codd., A Relational Model of Data for Large Shared Data Banks,Communications of the ACM, vol. 13, No. 6, Jun. 1970.
Codd., A Relational Model of Data for Large Shared Data Banks,Communications of the ACM, vol. 13, No. 6, Jun. 1990 pp. 377-387.
Vassiliadis and Sellis., A Survey of Logical Models for OLAP Database, SIGMOD Record, vol. 28, No. 4, Dec. 1999.
Vassiliadis and Sellis., A Survey of Logical Models for OLAP Database, SIGMOD Record, vol. 28, No. 4, Dec. 1999 pp. 64-69.
Attunity's website page re Home page with Headlines 2005.
Chaudhuri and Narasayya., AutoAdmin "What-if" Index Analysis Utility, '98.
Chaudhuri and Narasayya. AutoAdmin "What-if" Index Analysis Utility Proceedings of SIGMOD '98,.
Chaudhuri and Narasayya. AutoAdmin "What-if" Index Analysis Utility Proceedings of SIGMOD '98 pp. 367-378.
Lu and Tan., Buffer and Load Balancing in Locally Distributed Database Systems, 1990.
Lu and Tan., Buffer and Load Balancing in Locally Distributed Database Systems, 1990 pp. 545-552.
Shanmugasundararn., Compressed Data Cubes for OLAP Aggregate Query Approximation on Continuous Dimensions Proceedings of the KDD '99 Conference.
Shanmugasundararn., Compressed Data Cubes for OLAP Aggregate Query Approximation on Continuous Dimensions KDD 99 1999 pp. 223-232.
Barghoorn., N-dimensional Data Analysis with Sparse Cubes, Crosstab, OLAP, and APL APL98 Jul. 1998 pp. 110-113.
Barghoorn., N-dimensional Data Analysis with Sparse Cubes, Crosstab, OLAP, and APL Proceedings of the APL '98 Conference.
Hired Brains' website p. re Article called Data, Data Everywhere written by Neil Raden. Excerpted in the Oct. 30, 1995 edition of Information Week.
Gray et al, Data Cube: A Relational Aggregation Operator Generalizing Group-By, Cross-Tab, and Sub-Totals, 1996.
Gray et al, Data Cube: A Relational Aggregation Operator Generalizing Group-By, Cross-Tab, and Sub-Totals, 1996 pp. 152-159.
Chaudhuri and Dayal., Data Warehousing and OLAP for Decision Support Proceedings of SIGMOD '97.
Chaudhuri and Dayal., Data Warehousing and OLAP for Decision Support Proceedings of SIGMOD '97 1997 pp. 507-508.
Stanford Technology Group, In. An Informix Company's website page re Designing the Data Warehouse on Relational Databases , Informix, Designing the Data Warehouse / mcb Apr. 17, 1996.
Trujillo et al., Detecting Patters and OLAP Operations in the GOLD Model, DOLAP, '99.
Trujillo et al., Detecting Patters and OLAP Operations in the GOLD Model, DOLAP, '99 1999 pp. 48.53.
Yan & Larson., Eager Aggregation and lazy Aggregation, Proceedings of the 21st VLDB Conference Zurich, Swizerland, 1995.
Johnson and Chatziantoniou., Extending Complex Ad-Hoc OLAP, 1999.
Johnson and Chatziantoniou., Extending Complex Ad-Hoc OLAP Proceedings ofCIKM '99.
Johnson and Chatziantoniou., Extending Complex Ad-Hoc OLAP pp. 170-179 CIKM 99 Nov. 1999.
Pedersen et al., Extending Practical Pre-Aggregation in On-Line Analytical Processing, 1999.
Pedersen et al., Extending Practical Pre-Aggregation in On-Line Analytical Processing Proceedings of the 25th VLDB Conference 1999.
Codd, Extending the Database Relational Model to Capture More Meaning, ACM Transactions on Database Systems, vol. 4, No. 4, 1979.
Codd, Extending the Database Relational Model to Capture More Meaning, ACM Transactions on Database Systems, vol. 4, No. 4, 1979 pp. 397-434.
Sheth and Larson, Federated Database Systems for Managing Distributed, Heterogeneous, and Autonomous Databases, ACM Computing Surveys, vol. 22, No. 3, Sep. 1990.
Sheth and Larson, Federated Database Systems for Managing Distributed, Heterogeneous, and Autonomous Databases, ACM Computing Surveys, vol. 22, No. 3. pp. 183-236 Sep. 1990.
Szykier, Fractal Compression of Data Structures, Electro International 1994 Hynes Convention Center, pp. 609-616.
Szykier, Fractal Compression of Data Structures, Electro International 1994 Hynes Convention Center, May 1994.
Hahn et al., Getting Started with DB2 OLAP Server for OS/390, IBM—International Technical Support Organization, Mar. 2000.
Graefe et al., Hash joins and hash teams in Microsoft SQL Server, 1998, pp. 86-97.
Graefe et al., Hash joins and hash teams in Microsoft SQL Server Proceedings of the 24th VLDB Conference 1998, pp. 86-97.
Chandra and Harel, Horn Clauses and the Fixpoint Query Hierarchy 1982.
A White Paper by Speedware Corporation, Hybrid OLAP—The Best of Both Worlds 1997.
Markl et al., Improving OLAP Performance by Multidimensional Hierarchical Clustering, 1999.
Mark! et al., Improving OLAP Performance by Multidimensional Hierarchical Clustering Proceedings of IDEAS '99 1999.
Chaudhuri and Shim, Including Group-By in Query Optimization, 1994.
Chaudhuri and Shim, Including Group-By in Query Optimization Proceedings of the 20th VLDB Conference, 1994.
Mumick et al., Maintenance of Data Cubes and Summary Tables in a Warehouse, 1997.
Mumick, I. S., D. Quass and B. S. Mumick "Maintenance of Data Cubes and Summary Tables in a Warehouse", ACM SIGMOD Record, vol. 26, No. 2, Jun. 1997, pp. 100-111.
Murnick et al., Maintenance of Data Cubes and Summary Tables in a Warehouse Proceedings of SIGMOD '97 1997.
Vigeant, J. DM Review's website page re Media / MR Ensures Consistency for IBM Consultancy Jan. 1998.
McCarthy, Metadata Management for large Statistical Databases, 1982, pp. 234-243.
McCarthy, Metadata Management for Large Statistical Databases Proceedings of the 8th VLDB Conference 1982. pp. 234~243.
Ferguson, Microeconomic Algorithms for Load Balancing in Distributed Computer Systems, 1988.
Ferguson, Microeconomic Algorithms for Load Balancing in Distributed Computer Systems, 1988 pp. 491-499.
Chen and McNamee, On the Data Model and Access Method of Summary Data Management, IEEE Transactions on Knowledge and Data Engineering, vol. 1, No. 4, 1989.
Sellis and Ghosh, Concise Papers on the Multiple-Query Optimization Problem, IEEE Transactions on Knowledge and Data Engineering, vol. 2, No. 2 1990.
DBMS's website page re Oracle 7 Release 7.3 by Martin Rennhackkamp Nov. 1996 pp. 262-266.
DeWitt and Gray, Parallel Database Systems: The Future of High Performance Database Systems, Communications of the ACM, vol. 35, No. 6, Jun. 1992.
DeWitt and Gray, Parallel Database Systems: The Future of High Performance Database Systems, Communications of the ACM, vol. 35, No. 6, Jun. 1992 pp. 85-98.
Ho et al., Partial-Sum Queries in OLAP Data Cubes Using Covering Codes, 1997.
Ho et al., Partial-Sum Queries in OLAP Data Cubes Using Covering Codes Proceedings of PODS '97 1997.

Ho et al., Partial-Sum Queries in OLAP Data Cubes Using Covering Codes Proceedings of PODS '97 1997 pp. 228-237.
Pourabbas and Rafanelli, PGL: An Extended Pictorial Query Language for querying Geographical Databases using Positional and OLAP Operators, Nov. 1999.
Pourabbas and Rafanelli, PQL: An Extended Pictorial Query Language for querying Geographical Databases using Positional and Olap Operators Proceedings of ACM GIS '99 Nov. 1999.
Pourabbas and Rafanelli, PQL: An Extended Pictorial Query Language for querying Geographical Databases using Positional and OLAP Operators Proceedings of ACM GIS '99 Nov. 1999 pp. 165-166.
Markl et al., Processing Operations with Restrictions in RDBMS without External Sorting: The Tetris Algorithm, 1999.
Markl et al., Processing Operations with Restrictions in RDBMS without External Sorting: The Tetris Algorithm Proceedings of ICDE '99 1999.
Bansal, Real World Requirements for Decision Support—Implications for RDBMS, 1995.
Bansal, Real World Requirements for Decision Support—Implications for RDBMS Proceedings of SIGMOD '95 1995 p. 448.
Tabor Communications' website page re SAP Customers Eastman Kodak and Halliburton Among 750 Customers Worldwide to Implement the SAP Business Information Warehouse Solution, 1999.
Graefe et al., Sort vs. Hash Revisited, IEEE Transactions on Knowledge and Data Engineering, vol. 6, No. 6., Dec. 1994.
Graefe et al., Sort vs. Hash Revisited, IEEE Transactions on Knowledge and Data Engineering, vol. 6, No. 6., Dec. 1994 pp. 934-944.
Speedware's website page re Media c Features & Benefits, 2005.
Red Brick Systems, Inc. Star Schema Processing for Complex Queries, 1997.
Shoshani and Wong., Statistical and Scientific Database Issues, IEEE Transactions on Software Engineering, vol. SE-11 , No. 10., Oct. 1985.
Shoshani and Wong., Statistical and Scientific Database Issues, IEEE Transactions on Software Engineering, vol. SE-11 , No. 10., Oct. 1985 pp. 1040-1047.
Ghosh, Statistical Relational Databases: Normal Forms, IEEE Transactions on Knowledge and Data Engineering, vol. 3, No. 1, 1991.
Ghosh, Statistical Relational Databases: Normal Forms, IEEE Transactions on Knowledge and Data Engineering, vol. 3, No. 1, 1991 pp. 55-64.
Stamen, Structuring Database for Analysis, IEEE Spectrum Oct. 1993 pp. 55-58.
The OLAP Report website page re Summary Review: Media (Speedware) Mar. 29, 1999.
Sybase Inc.'s website page re Certification Report No. 136 of Sybase Adaptive Server IQ Version 12.02 with Seagate Software Crystal Reports and Crystal Info Version 7.0v Jun. 1999.
Gyssens et al., Tables As a Paradigm for Querying and Restructuring, 1996.
Gyssens et al., Tables As a Paradigm for Querying and Restructuring Proceedings of PODS '96 1996, 1996.
Gyssens et al., Tables As a Paradigm for Querying and Restructuring Proceedings of PODS '96 1996, 1996 pp. 93-103.
Srivastava et al., TBSAM: An Access Method for Efficient Processing of Statistical Queries, IEEE Transactions of Knowledge and Data Engineering, vol. 1. No. 4, 1989.
Srivastava et al., TBSAM: An Access Method for Efficient Processing of Statistical Queries, IEEE Transactions of Knowledge and Data Engineering, vol. 1. No. 4 pp. 419-423 Dec. 1989.
LeFevre, J., LookSmart Find Articles' website page re There's a Whole Lot of HOLAP Goin' On-hybrid online analytical processing systems combine relational OLAP and multidimensional OLAP—Technology Information, 1998.
LeFevre, J., LookSmart Find Articles' website page re There's a Whole Lot of HOLAP Goin' On-hybrid online analytical processing systems combine relational OLAP and multidimensional OLAP—Technology Information, Feb. 18, 1998.
LeFevre, J.,There's a Whole Lot of HOLAP Goin' On-hybrid online analytical processing systems combine relational OLAP and multidimensional OLAP—Technology Information Feb. 18, 1998.
Bayer, UB-Trees and UB-Cache A new Processing Paradigm for Database Systems, Mar. 15, 1997.
Aho and Ullman, Universality of Data Retrieval Languages pp. 110-120. © 1979 ACM 0-12345-678-9.
Hurtado et al., Updating OLAP Dimensions, 1999, pp. 60-66.
Hurtado et al., Updating OLAP Dimensions Proceedings of DOLAP'99, 1999, pp. 60-66.
White Paper Abstract—Connecting Seagate Software products to the SAP Business Information Warehouse (BW), Enterprise Information Management, February 5, 1999.
Healthcare Informatics.Online website page re Data Mining Goes Multidimensional by Mark Hettler, Mar. 1997.
Healthcare Informatics.Online website page re Data Mining Goes Multidimensional by Mark Hettler, Mar. 1997.
Staudt et al., Incremental Maintenance of Externally Materialized Views, Abstract, 1996.
Staudt et al., Incremental Maintenance of Externally Materialized Views, Abstract Proceedings of the 22nd VLDB Conference 1996 pp. 75-86.
White Paper—Pilot Analysis Server, Multi-dimensional OLAP Engine Including Hybrid OLAP, 2003.
Aberdeen Group "Pilot Internet Publisher: A Foundation for Web-Enabled OLAP" Feb. 1997.
Srivastava et al., Answering Queries with Aggregation Using Views, Abstract, 1996.
Srivastava et al., Answering Queries with Aggregation Using Views, Abstract, Proceedings of the 22nd VLDB Conference 1996.
Srivastava et al., Answering Queries with Aggregation Using Views, Abstract, Proceedings of the 22nd VLDB Conference 1996 pp. 318-329.
Patel et al., Building a Scalable Geo-Spatial DBMS: Technology, Implementation, and Evaluation, Abstract SIGMOD '97 Z, USA 1997 ACM 0-89791-911-4/97/0005.
Data Flux Registration's website re Customer Data Integration: Creating One True View of the Customer © 2005.
Martin, J., DM Review's website re Cybercorp: Trends in Distributed Data Warehousing Jan. 1999.
Theodoratos et al, Data Warehouse Configuration, Abstract, 1997.
Theodoratos et al, Data Warehouse Configuration, Abstract Proceedings of the 23rd VLDB Conference 1997.
Malvestuto, F., The Derivation Problem for Summary Data, Abstract, 1988.
Malvestuto, F., The Derivation Problem for Summary Data, Abstract, ACM 1988 pp. 82-89.
Rahm, Erhard. Dynamic Load Balancing in Parallel Database System, Abstract, Aug. 1996.
Rahm, Erhard. Dynamic Load Balancing in Parallel Database System, Abstract Proceedings EURO-PAR 96 Conf. LNCS Aug. 1996.
Hsiao, David. Federated Databases and Systems: Part 1—A Tutorial on Their Data Sharing, Abstract, VLDB Journal, vol. 1, pp. 127-179, 1992.
Hsiao, David. Federated Databases and Systems: Part II—A Tutorial on Their Resource Consolidation, Abstract, VLDB Journal vol. 2, pp. 285-310, 1992.
Crystal Decisions. Holos Version 6. Holos Compound OLAP Architecture, 2002.
O'Neil et al., Improved Query Performance with Variant Indexes, Abstract SIGMOD '97 AZ, USA 1997 ACM 0-89791-911-4/97/0005.
Sarawagi, Sunita. Indexing OIAP Data, Abstract, 1997.
Sarawagi, Sunita. Indexing OIAP Data, Abstract, Bulletin of the IEEE Computer Society Technical Committee on Data Engineering 1997.
Sarawagi, Sunita. Indexing OIAP Data, Abstract, Bulletin of the IEEE Computer Society Technical Committee on Data Engineering 1997 pp. 36-43.
Data Sheet—Informix MetaCube 4.2, Delivering the Most Flexible Business-Critical Decision Support Environments Jul. 1999.
Technical White Paper—Inside Alphablox Analytics: An In-Depth Technical View of Alphablox Analytics, 2004.
Ramsak et al., Integrating the UB-Tree into a Database System Kernel, Abstract Proceedings of the 26th VLDB Conference 2000.

Ramsak et al., Integrating the UB-Tree into a Database System Kernel, Abstract Proceedings of the 26th VLDB Conference 2000 pp. 263-272.
Stonebraker et al., Mariposa: A Wide-Area Distributed Database System, Abstract the VLDB Journal (1996) 5: 48-63, The VLDB Journal, Springer-Verlag 1996.
Roussopoulos, Nick. Materialized Views and Data Warehouses, Abstract, 1997.
Roussopoulos, Nick. Materialized Views and Data Warehouses, Abstract Proceedings of the 4th KRDB Workshop Aug. 30, 1997.
Bernstein et al., Meta-Data Support for Data Transformations Using Microsoft Repository, Abstract, 1999.
Bernstein et al., Meta-Data Support for Data Transformations Using Microsoft Repository, Abstract Bulletin of the IEEE Computer Society Committee on Date Engineering 1999.
Bernstein et al., Meta-Data Support for Data Transformations Using Microsoft Repository, Abstract Bulletin of the IEEE Computer Society Committee on Date Engineering 1999 pp. 9-14.
Microsoft SQL Server—Microsoft SQL Server 7.0 Decision Support Services: lowering the Cost of Business Intelligence, 1998.
Microsoft SQL Server—Microsoft SQL Server 7.0 Decision Support Services: lowering the Cost of Business Intelligence 098-80705 1998.
Gaede et al., Multidimensional Access Methods, ACM Computing Surveys, vol. 30, No. 2, Jun. 1996.
Gaede et al., Multidimensional Access Methods, ACM Computing Surveys, vol. 30, No. 2, Jun. 1996 pp. 170-231.
O'Neil et al., Multi-Table Joins Through Bitmapped Join Indices, SIGMOD Record, vol. 24, No. 3, Sep. 1995.
O'Neil et al., Multi-Table Joins Through Bitmapped Join Indices, SIGMOD Record, vol. 24, No. 3, Sep. 1995 pp. 8-11.
Pendse, N., OLAP Omnipresent, Byte Magazine, Feb. 1998.
Zhao et al., On the Performance of an Array-Based ADT for OLAP Workloads, Abstract, Aug. 29, 1996.
Fiser et al., On-Line Analytical Processing on Large Databases Managed by Computational Grids*, Abstract Proceedings of the 15$^{th}$ Int'l Workshop on Database and Expert Systems Applications (DEXA '04) 1529-4188/04 IEEE.
e-consultancy's website re Oracle Express 6.2 Delivers Unparalleled Integration, Ease of Use and Platform Support, May 1998.
Yan et al., Performing Group-By before Join, Abstract.. Proceedings of the 10th IEEE Conference on Data Engineering 1994 pp. 89-100.
Wu, Ming-Chuan, Ouery Optimization for Selections using Bitmaps, Abstract, 1994, pp. 89-100.
Cheung et al., Requirement-Based Data Cube Schema Design, Abstract CIKM '99 Kansas City, MO, USA, 1999 ACM 1-58113-075-9/99/0010.
DM Review's website re Analytics Portal: Scalability Stress Test: An Anaylsis of the Scalability of the MicroStrategy and Tandem DSS © 2005 DM Review and SourceMedia Inc.
Kamp et al., A Spatial Data Cube Concept to Support Data Analysis in Environmental Epidemiology, Abstract 1997.
Kamp et al., A Spatial Data Cube Concept to Support Data Analysis in Environmental Epidemiology, Abstract 1997 pp. 100-103.
SQL in Analysis Services, 2004.
Reinwald et al., SQL Open Heterogeneous Data Access, Abstract, 1998, pp. 506-507.
Reinwald et al., SQL Open Heterogeneous Data Access, Abstract Proceedings of SIGMOD 98 1998 pp. 506-507.
Microsoft's website re Microsoft TechNet. SQL Server 7.0 Resource Guide, www.microsoft.com/technet/prodtechnol/sql/70/reskit/part9/sqc12.mspx, printed 2005.
Moran, B., et al., SQL Server Savvy's website re How to Leverage the Capabilities of OLAP Services, Jul. 1999.
Radding, Alan. Support Decision Makers with a Data Warehouse, Datamation, Mar. 15, 1995.
Radding, Alan. Support Decision Makers with a Data Warehouse, Datamation, Mar. 15, 1995 pp. 53-56.
Chapman K. Article from itWorldCanada—BI/SUITE Plays Catch up to Competitors Feb. 26, 1999.
MacMillan, M. Article from itWorldCanada—Business Objects 5.0 Dresses Itself up with a Cleaner User Interface Sep. 10, 1999.
Article—Hummingbird Acquires Data Transformation Company Leonard's Logic, DSstar Business, taborcommunications.com/dsstar/99/0323/100659.huml—printed 2005.
Article—Business Objects Delivers Next Version of Comprehensive Business Intelligence Suite, DStar Business, taborcommunications.com/dsstar/99/0706/100872html—printed 2005.
Plos Kine, B. Article—Hummingbird Dives Into Business Intelligence (Hummingbird BI Suite) (Product Announcement) Aug. 12, 1998.
Printout from Sybase Website "Open ServerConnect Data Sheet" , 2005.
Printout from Sybase Website Sybase Adaptive Server IQ 12.0.3 with Actuate Reporting System Version 3.2.1, Certification Date: Jul. 99, Report.
Printout from Sybase Website Sybase Adaptive Server IQ 12.0.3 with Actuate Reporting System Version 3.2.1, Certification Date: Jul. 1999, Report 150.
Printout from Sybase Website "Sybase Adaptive Server IQ 12.03.1 with BusinessObjects Version 5.0, Certification Date: Jul. 1999, Report 148".
Printout from Sybase Website "Sybase Adaptive Server IQ Version 12.0, Sybase DirectConnect for MVS/DB2 11.7 and Sybase Adaptive Server Enterprise 11.9.1 with InfoMaker 7.0, Certification Date: Mar. 1999, Report 137".
Printout from Sybase Website "Sybase Adaptive Server IQ Version 12.0.2 with Hummingbird BI Suite Version 5.0, Certification Date: Mar. 1999, Report 133".
Printout from Sybase Website "Sybase Adaptive Server IQ Version 12.0.2 with Seagate Software Crystal Report and Crystal Info Version 7.0, Certification Date: Mar. 1999, Report 136".
Printout from Sybase Website "Sybase Adaptive Server IQ Version 12.4 with Microsoft Access 2000 Version 9.0, Certification Date: Oct. 1999, Report 155".
Printout from Sybase Website "Sybase DirectConnect for Oracle" , © 1998 Sybase, Inc.
Printout from Sybase Website "Sybase IQ Version 11.0 Product Assessment" , revised May 13, 1997.
Printout from Sybase Website "Understanding Open Server with Customer Success Stories" , revised Dec. 2, 1996.
SQL Server 7.0 Workshop Codename Sphinx, Feb. 25-27, 1998.
Kimball, R., et al., "Why Decision Support Fails and How to Fix it," Datamation, Jun. 1, 1994.
Kimball, R., et al., "Why Decision Support Fails and How to Fix it," Datamation, Jun. 1, 1994 pp. 40-43.
Article—"Why Decision Support Fails and How to Fix it," Datamation, Jun. 1, 1994.
TPD (Transaction Processing Performance Council) Interview with Jack Stevens, Francois Raab and Kim Shanley 2004.
"The Multimodel, Multilingual Approach to Interoperability of Multidatabase Systems," David K. Hsiao and Magdi N. Kamel, Departments of Computer and Administrative Sciences, Naval Postgraduate School 1991.
"The Multimodel, Multilingual Approach to Interoperability of Multidatabase Systems," David K. Hsiao and Magdi N. Kamel, Departments of Computer and Administrative Sciences, Naval Postgraduate School 1991 pp. 208-211.
"MDD Database Reaches the Next Dimension" Richard Finkelstein, Database Programming and Design, Apr. 1995, vol. 8.
"Materialized View and Index Selection Tool for Microsoft SOL Server 2000" Sanjay Agrawal, Surajit Chaudhuri and Vivek Narasayya Proceedings of SIGMOD 2001 May 21-24, 2001 p. 608.
"Managing Multidimensional Data: Harnessing the Power" Jay-Louise Weldon, Database Programming & Design, Aug. 1995, vol. 8.
"M(DM): An Open Framework for Interoperation of Multimodel Multidatabase Systems" Thierry Barsalou and Dipayan Gangopadhyay 1992.
"Help for Hierarchies" Ralph Kimball, Data Warehouse Architect, Sep. 1998.
"Beyond Decision Support" Edgar Codd, Sharon Codd and Clynch T. Salley, Computerworld, Jul. 26, 1993, p. 87.
IEEE "Bulletin of the Technical Committee on Data Engineering" vol. 20, No. 1 Special Issue on Supporting OLAP Mar. 1997.

Application Programmer's Manual; MetaCube ROLAP Option for Informix Dynamic Server, Version 4.0, Jan. 1998.

"A Physical Storage model for Efficient Statistical Ouery Processing" Wee K. Ng and Chinya V. Ravishankar, Dept. of Electrical Engineering and Comptuer Science, University of Michigan IEEE 1994 pp. 97-106.

"A Physical Storage model for Efficient Statistical Ouery Processing" Wee K. Ng and Chinya V. Ravishankar, Dept. of Electrical Engineering and Comptuer Science, University of Michigan 1994.

"SQL Is Our Language, Fix It Now" Datamation, Jun. 1, 1994.

"SQL Is Our Language, Fix It Now" Datamation, Jun. 1, 1994 pp. 43-45.

Kimball, R. "SQL Is Our Language, Fix It Now" Datamation, Jun. 1, 1994.

NetCube "Discussion of NetCube in the Context of IBM's DB2 OLAP Server" Jun. 7,1997.

NetCube Health Care Client—Actual NetCube Model Design; Telecommunications—Business Model Design; Direct Marketing Client—Business Model Design Nov. 1, 2005.

NetCube Product Overview (Just-in-Time, not Just-in-Case Business Intelligence, Unleashing the Knowledge in Your Data) Version 1.7; NetCube , ©1997 NetCube Corporation.

NetCube ROLAPBuilder and CubeOptimizer Overview , ©1997 NetCube Corporation.

NetCube Performance Overview , Unleasing the Knowledge in Your Data, ©1997 NetCube Corporation.

Erik Thomsen, Dimensional Systems, Remarks from NetCube Product Review on Jan. 14, 1997.

Sams Teach Yourself Microsoft SQL Server 7.0 in 21 Days, Richard Waymire and Rick Sawtell; First Printing Dec. 1998, SAMS Publishing, 1999.

Materialized Views Techniques, Implementations, and Applications, Ashish Gupta and Inderpal Singh Mumick, Massachusetts Institute of Technology, 1999.

The Developer'S Handbook to DB2 for Common Servers, Roger E. Sanders, 1997.

Professional Data Warehousing With SQL Server 7.0 and OLAP Services, Sakhr Youness; Published by Wrox Press Ltd., 2000.

Client/Server Computing With Sybase SQI Server, Joe Salemi, Zift-Davis Press, 1994.

Sybase System XI Performance Tuning Strategies, Ronald A. Phillips, Bonnie K. O'Neil, and Marshall Brain, Prentice-Hall, 1996.

Sybase Replication Server Primer by Charles B. Clifford, McGraW-Hili, 1995.

Developing Client/Server Systems Using Sybase SQL Server System 11, Sanjiv Purba, John Wiley & Sons, 1996.

Special Edition Using Sybase System XI, Peter Hazlehurst, Que Corporation, 1996.

Sybase SQL Server on the World Wide Web, Ed Ashley and Beth Epperson, International Thomson Computer Press, 1996.

Data Warehousing With Informix: Best Practices, Angela Sanchez, Informix Press, Prentice Hall, 1998.

Informix Guide to Designing Databases and Data Warehouses, Informix Press, Prentice Hall, 2000.

Proceedings of the International Conference on Parallel and Distributed Processing Techniques and Applications, vol. I, H.R. Arabnia, CSREA Press, 1998.

Proceedings of the International Conference on Parallel and Distributed Processing Techniques and Applications, vol. II, H.R. Arabnia, CSREA Press, 1998.

Proceedings of the International Conference on Parallel and Distributed Processing Techniques and Applications, vol. IV, H.R. Arabnia, CSREA Press, 1998.

Upgrading and Migrating to Sybase SQL Server 11, Mitchell Gurspan, International Thomson Computer Press, 1996.

Optimizing Informix Applications, Robert D. Schneider, Informix Press, Prentice Hall, 1995.

A Practical Guide to Microsoft OLAP Server, John Shumate, Addison-Wesley, 2000.

Using Microsoft SQL Server 7.0, Brad McGehee, Rob Kraft and Matthew Shepker, Oue Corporation, 1999.

Running Microsoft Excel, Second Edition, Douglas Cobb, Judy Mynhier, Craig Stinson and Chris Kinata, Microsoft Press, 1991.

Microsoft Windows Software Development Kit, Guide to Programming, Version 3.1, Microsoft Corp, 1992.

Essbase Data Server Technical Reference Manual, Version 2.2, Arbor Software, 1992.

The Informix Handbook, Ron Flannery, Informix Press, Prentice-Hall, 2000.

Lotusworks Guide, Release 1.1, Spinnnaker Software, 1991.

Software Engineering With Ada, Grady Booch, Benjamin Cummings Publishing Company, 1983.

Software Engineering With Ada, Second Edition, Grady Booch, Benajmin Cummings Publishing Company, 1987.

Sybase Architecture and Administration, John Kirkwood, Ellis Horwood, 1993.

Sybase Performance Tuning, Shaibal Roy and Marc B. Sugiyama, Prentice Hall, 1996.

Sybase Database Administrator's Handbook, Brian Hitchcock, Prentice Hall, 1996.

Essbase Technical Reference Manual, Version 3.0, Arbor Software, 1994.

Essbase Application Designer Guide, Version 3.0, Arbor Software, 1994.

An Introduction to Operating Systems, Harvey M. Deitel, Addison-Wesley, 1984.

Microsoft Windows Graphical Environment User's Guide, Version 3.0, Microsoft Corp., 1990.

Running Microsoft Excel, Douglas Cobb and JUdy Mynhier, Microsoft Press, 1988.

Advanced in Database Technologies, Yahiko Kambayashi, Dik Lun Lee, Ee-Peng Lim, Mukesh Kumar Mohania and Yoshifumi Masunaga, Springer Press, 1998.

A Guide to Sybase and SQL Server, D. McGoveran and C.J. Date, Addison-Wesley, 1992.

Data Warehouse From Architecture to Implementation, Barry Devlin, Addison-Wesley, 1997.

Sybase and Client/Server Computing, Second Edition, Alex Berson and George Anderseon, McGraw-Hill, 1997.

ORACLE8 Server Unleashed, Joe Green, SAMS Publishing, 1998.

Teach Yourself ORACLE8 in 21 Days, Edward Whalen and Steve Adrien DeLuca, SAMS Publishing, 1998.

ORACLE8 Design Using UML Object Modeling, Dr. Paul Dorsey and Joseph R. Hudicka, Oracle Press, McGraw-Hili, 1999.

ORACLE8 Design Tips, Dave Ensor and Ian Stevenson, O'Reilly & Associates, 1997.

ORACLE8 on Windows NT, Lilian Hobbs, Butterworth-Heinemann, 1998.

ORACLE8 Architecture, Steve Bobrowski, Oracle Press, McGraw-Hill 1998.

ORACLE8 DBA Handbook, Kevin Loney, Oracle Press McGraw-Hill, 1998.

Oracle Tuning, Michael J. Corey, Michael Abbey, Daniel J. Dechichio and Ian Abramson, Oracle Press, McGraw-Hill, 1998.

Microsoft Excel User's Guide 2, Microsoft Corp., 1992.

Microsoft Excel Function Reference, Microsoft Corp., 1992.

ORACLE8 How to, Edward Honour, Paul Dalberth, an Kaplan and Atul Mehta, Waite Group Press, 1998.

Seagate Crystal Reports 7 for Dummies, Douglas J. Wolf, IDG Books, 1999.

Data Warehousing, Strategies, Technologies and Techniques, Rob Mattison, McGraw Hill,1996.

Data Warehousing, Concepts, Technologies Implementations and Management, Harry Singh, Prentice Hall, 1998.

Building a Better Data Warehouse, Don Meyer and Casey Cannon, Prentice Hall, 1998.

Decision Support in the Data Warehouse, Paul Gray and Hugh Watson, Prentice Hall, 1998.

Parallel Systems in the Data Warehouse, Stephen Morse and David Isaac, Prentice Hall, 1998.

Data Warehousing for Dummies, Alan Simon, IDG Books Worldwide, 1997.

Data Warehousing and Data Mining, Implementing Strategic Knowledge Management, Elliot King, PhotoDisc, Inc., 1998.

Managing the Data Warehouse, Practical Techniques for Monitoring Operations, Administering Data and Tools, Managing Change and Growth, W.H. Inmon, J .D. Welch and Katherine Glassey, Wiley Computer Publishing, John Wiley & Sons, 1997.
Planning and Designing the Data Warehouse, Ramon Barquin, Alan Paller, Herb Edelstein, Ellen Levin, Doug Neal, Carol Burleson, David Tabler, Pieter Mimno, Bob Rumsby, Glen Livingston, Neil Raden, Duane Hufford and Mark Poole, Prentice Hall, 1997.
Data Warehouse Practical Advice From the Experts, Joyce Bischoff and Ted Alexander, Prentice Hall, 1997.
Data Mining, Data Warehousing & Client/Server Databases, Proceedings of the 8th International Database Workshop, Joseph Fang, Springer, 1997.
Data Warehousing, Data Mining and OLAP, Alex Berson and Stephen Smith, McGraw-Hill, 1997.
On-Line Analytical Processing Systems for Business, Robert Thierauf, Quorum Books, 1997.
Data Warehousing in Action, Sen Kelly, John Wiley & Sons, 1997.
The Essential Guide to Data Warehousing, Lou Agosta, Prentice Hall, 2000.
The Enterprise Data Warehouse, Planning, Building and Implementation, vol. 1, Eric Spreley, Hewlett-Packard, 1999.
Understanding Database Management Systems, Second Edition, Alex Berson, McGraw-Hill, 1996.
Understanding Database Management Systems, Second Edition, Alex Berson, McGraw-Hill, 1998.
The Data Warehouse Challenge, Taming Data Chaos, Michael Brackett, John Wiley & Sons, Inc., 1996.
Strategic Data Warehousing Principles Using SAS Software, Peter Weibrock, Sas Institute, 1998.
Building the Operational Data Store, W.H. Inmon, Claudia Imhoff and Greg Battas, John Wiley & Sons, Inc., 1996.
Essbase Web Gateway Workshop, Arbor Software, 1996.
Wired for OLAP Designer & Administrator Version 3.0, Student Guide, Vision Enterprises, 1998.
Crystal Info 6.0 Administrator Workshop, FastPlanet Technologies, 1998.
Essbase Fundamentals, Workbook, Arbor Software, 1997.
Hyperion'S Spider-Man Web Applicatio.N—Administrator, Hyperion Sofware Operations, Inc., 1998.
Hyperion's Spider-Man Web Application—Technical Training for Is Professionals, Hyperion Software Operations, Inc., 1998.
Hyperion Essbase 5 Training, Partitioning, Hyperion Solutions Corp., 1999.
Arbor Essbase 5, Partitioning Training, Arbor Software, 1997.
Step by Step Microsoft SOL Server 2000 Analysis Services, Reed Jacobsen, Microsoft Press, 2000.
ORACLE8 Data Warehousing, A Practical Guide to Successful Data Warehouse Analysis, Build and Roll Out, Michael Corey, Michael Abbey, Ian Abramson and Ben Taub, Oracle Press, Osborne/ McGraw-Hill, 1998.
Temporal Databases, Theory, Design and Implementation, Tansel Clifford, Gadia Jajodia and Segev Snodgrass, Benjamin Cummings Publishing, 1993.
The Data Warehouse Toolkit, Ralph Kimball, John Wiley & Sons, 1996.
Data Warehousing, Using the Wal-Mart Model, Paul Westerman, Academic Press, 2001.
Using the New DB2 IBM's Object-Relational Database System, Don Chamberlin, Morgan Kaufmann Publishers, 1996.
Arbor Essbase Installation Notes, Version 1.0.1, IBM, Arbor Software, 1998.
Reflex in Business, 17 Practical Examples for Business Analysis Using Relfex, the Analytic Database, Teddi Converse, Wade Ellis, Sr., Wade Ellis, Jr., and Ed Lodi, McGraw- Hill,1985.
Combinatorial Optimization, Algorithms and Complexity, Christos Papadimitriou, and Kenneth Steiglitz, Prentice-Hall, 1982.
ORACLE8i Data Warehousing, Lilian Hobbs and Susan Hillson, Digital Press, 2000.
Using SAP R/3, ASAP World Consultancy, Oue Corporation, 1996.
Seagate Crystal Reports User'S Guide, Version 6.0, Seagate Software, 1997.
Business Objects User's Guide, Beta 1, Version 5.0 Windows, Business Objects, 1998.
Brioquery 5.0 Handbook, for Microsoft Windows, Apple Mcintosh and Motif Systems, Brio Technology, 1997.
Brioquery Designer and Brioquery Explorer, Version 6.1, Reference Guide, Brio Technology, 2000.
Brio Technology User's Guide, Version 6.0, Brio Technology, 1999.
Crystal Reports 8 for Dummies, Douglas Wolf, IDG Books Worldwide, 2000.
Getting Started With Data Warehouse and Business Intelligence, Maria Sueli Almeida, Missao Ishikawa, Joerg Reinschmidt and Torsten Roeber, IBM 1999.
Using Tivoli Decision Support Guides, Vasfi Gucer, Janet Surasathain, Thomas Gehrke and Frank-Michael Nees, IBM, 1999.
Data Modeling Techniques for Data Warehousing, Chuck Ballard, Dirk Herreman, Don Schau, Rhonda Bell, Eunsaeng Kim and Ann Valencic, IBM, 1998.
Seagate Crystal Reports 6 Introductory Report Design Training Guide, Seagate Software, 1997.
Essbase EPI Reference, Arbor Software, 1996.
The Data Webhouse Toolkit: Building the Web-Enabled Data Warehouse, Ralph Kimball and Richard Merz, Wiley Computer Publishing, John Wiley and Sons, 2000.
Oracle 8 Backup & Recovery Handbook: Expert Methods From the Leading Authorities, Rama Velpuri and Anand Adkoli, Oracle Press, Osborne McGraw-Hill, 1998.
Informix Dynamic Server With Universal Data Option : Best Practices, Angela Sanchez, Prentice Hall, 1999.
Ouattro Pro Version 2.0 User's Guide, Borland International, Inc., 1987.
Programming Language Concepts, Carlo Ghezzi and Mehdi Jazayeri, John Wiley & Sons, 1982.
The Sybase SOL Server Survival Guide, Jim Panttaja, Mary Panttaja and Judy Bowman, Wiley Computer Publishing, John Wiley & Sons, 1996.
Microsoft Data Warehousing: Building Distributed Decision Support Systems, Robert S. Craig, Joseph A. Vivona and David Bercovitch, Wiley Computer Publishing, John Wiley & Sons, 1999.
ORACLE8 Data Warehousing: A Hands-On Guide to Designing, Building, and Managing Oracle Data Warehouses, Gary Dodge and Tim Gorman, Wiley Computer Publishing, John Wiley & Sons, 1998.
Oracle 8 Administration and Management, Michael Ault, Wiley Computer Publishing, John Wiley & Sons, 1998.
Building a Data Warehouse for Decision Support, Vidette Poe, Prentice Hall, 1996.
Object-Oriented Data Warehouse Design: Building a Star Schema, William G Giovinazzo, Prentice Hall, 2000.
Informix Universal Data Option, Paul Allen and Joe Bambera, McGraw-Hill, 1999.
Client/Server Database Design With Sybase: A High-Performance and Finetuning Guide, George W. Anderson, McGraw-Hill, 1997.
Borland Ouattro Pro for Windows, Version 5.0, Borland International, 1993.
An Array-Based Algorithm for Simultaneous Multidimensional Aggregates, Yihoug Zhao, Prassad M. Deshpande, Jeffrey F. Naughton, Computer Sciences Department, University of Wisconsin-Madison. Sigmod '97 AZ, USA ACE 0-89791-911-4/97/0005.
Microsoft SQL Server 7.0 Databse Implementation Training Kit, Microsoft Press, 1999.
Microsoft SQL Server 7.0 Data Warehousing Training Kit, Microsoft Press, 2000.
Optimizing SOL Server 7: Planning and Building a High-Performance Database, Second Edition, Robert D. Schneider and Jeffrey R. Garbus, Prentice Hall, 1999.
Sybase Developer's Guide, Daniel J. Worden, SAMS Publishing, 1994.
Microsoft SQL Sever OLAP Developer's Guide, William C. Amo, IDG Books Worldwide, 2000.
Data Warehousing, Building the Corporate Knowledgebase, Tom Hammergren, International Thomson Computer Press, 1996.
Informix Unleashed, the Comprehensive Solutions Package, John McNally, Glenn Miller, Jim Prajesh and Jose Fortuny, Sams Publishing, 1997.
ORACLE8 Bible, Carol McCullough-Dieter, IDG Books Worldwide, Inc.—1998.

Personal Oracle 8: A Voyage Into ORACLE8's Newest Frontier, Richard Fieldhouse, International Thomson Publishing, 1998.
Sybase Client/Server Explorer, James Bean, Coriolis Group books, 1996.
ORACLE8 Database Administration on Windows NT, Lynnwood Brown, Prentice Hall, 1999.
Data Warehouse Management Handbook, Richard Kachur, Prentice Hall, 2000.
ORACLE8 PL/SQL Programming: The Essential Guide for Every Oracle Programmer, Scott Urman, Oracle Press, Osborne McGraw-Hill, 1997.
ORACLE8 &Unix Performance Tuning, Ahmed Alomari, Prentice Hall, 1999.
ORACLE8 &Windows NT Black Book, Mike Curtis and Jacqueline King, Coriolis Group, 1998.
Database Performance Tuning Handbook, Jeff Dunham, McGraw-Hill, 1998.
Datawarehousing: Architecture and Implementation, Mark Humphries, Michael W. Hawkins and Michelle C. Dy, Harris Kern's Enterprise Computing Institute, Prentice Hall, 1999.
SQL Server Developer's Guide to OLAP With Analysis Services, Mike Gunderloy and Tim Sneath, Sybex Inc., 2001.
Arbor Essbase 5: Release Training, Arbor Software, 1997.
Hyperion End User Training: Essbase Spreadsheet Ad-In for Excel, Hyperion Solutions, 1998.
Data Mining a Hands-On Approach for Business Professionals, Robert Groth, Prentice Hall, 1998.
Microsoft SQL Server 7 for Dummies, Anthony Mann, Hungry Minds, 1998.
Microsoft OLAP Unleashed, Second Edition, Tim Peterson and Jim Pinkelman, SAMS Publishing, 2000.
Data Warehousing With Microsoft SOL Server 7.0 Technical Reference, Jake Sturm, Microsoft Press, 2000.
Official Sybase Internals: Designing and Troubleshooting for High Performance, John Kirkwood, International Thomson Publishing, 1998.
Official Sybase SQL Anywhere: A Developer's Guide, Ian Richmond, Steve Clayton and Derek Ball, International Thomson Publishing, 1997.
Business Intelligence: The IBM Solution, Datawarehousing and OLAP, Mark Whitehorna nd Mary Whitehorn, Springer, 1999.
Sybase SQL Server: Performance and Tuning Guide, Karen Paulsell, Sybase Inc., 1996.
Mastering Sybase SQL Server 11, Charles B. Clifford, McGraw-Hill, 1997.
ORACLE8 for Dummies, Carol McCullough, IDG Books, 1997.
Sybase SQL Server 11 Unleashed, Ray Rankins, Jeffrey R. Garbus, David Solomon and Bennet W. McEwan, SAMS Publishing, 1996.
ORACLE8 Advanced Tuning & Administration, Eyal Aronoff, Kevin Loney and Noorali Sonawalla, Oracle Press, McGraw-Hill, 1998.
Sybase DBA Companion, Brian Hitchcock, Prentice Hall, 1997.
Microsoft OLAP Solutions, Erik Thomsen, George Spofford and Dick Chase, Wiley Computer Publishing, John Wiley & Sons, 1999.
Teach Yourself ORACLE8 Database Development in 21 Days, David Lockman, Sams Publishing, 1997.
The Data Warehouse Method, Neilson Thomas Debevoise, Prentice Hall, 1999.
ORACLE8 Black Book, Michael R. Ault, Coriolis Group Books, 1998.
Sybase SQL Server 11 DBA Survival Guide, Second Edition, Jeffrey Garbus, David Solomon, Brian Tretter and Ray Rankins, SAMS Publishing, 1996.
Sybase SQL Server 11: An Administrator's Guide, John Kirkwood, International Thomson Computer Press, 1996.
Data Warehousing, Sean Kelly, John Wiley & Sons, 1996.
Unlocking OLAP With Microsoft SQL Server and Excel 2000, Wayne S. Freeze, IDG Books, 2000.
Developing Sypase Applications, Daniel J. Worden, Sams Publishing, 1995.
Physical Database Design for Sybase SQL Server, Rob Gillette, Dean Muench and Jean Tabaka, Prentice-Hall, 1995.
Discrete Mathematical Structures With Applications to Computer Science, J.P. Tremblay and R. Mahohar, McGraw -Hill, 1975.
Arbor Essbase Database Administrator'S Guide, vol. I, Arbor Software, 1997.
Developing Client/Server Systems Using Sybase SQL Server System 10, Sanjiv Purba, John Wiley & Sons, 1994.
Sybase DBA Survival Guide, Jeff Garbus, David Solomon and Brian Tretter, Sams Publishing, 1995.
ORACLE8 The Complete Reference, George Koch and Kevin Loney, Oracle Press, McGraw- Hill,1997.
Albrecht, J. et al.: "Aggregate-based Query Processing in a Parallel Data Warehouse Server", Proceedings of the Tenth International Workship on Database and Expert Systems Applications, Sep. 1-3, 1999, pp. 40-44.
Albrecht, et al.: "Management of Multidimensional Aggregates for Efficient Online Analytical Processing", Database Engineering and Applications, 1999, Ideas '99. International Symposium Proceedings Montreal, Que., Canada Aug. 2-4, 1999, Los Alamitos, CA, USA, IEEE Comput. Soc, US, Aug. 2, 1999, pp. 156-164.
Albrecht, et al.: "Management of Multidimensional Aggregates for Efficient Online Analytical Processing", Database Engineering and Applications, 1999, Ideas '99. International Symposium Proceedings Montreal, Que., Canada.
Agarwal, S. et al.: "On the Computation of Multidimensional Aggregates", Proceedings of the 22nd VLDB Conference, Sep. 30, 1996, pp. 506-521.
Agarwal, S. et al.: "On the Computation of Multidimensional Aggregates", 22nd Int'l Cof. On Very Large Databases, 1996, pp. 1-16.
Agrawal et al.: "Modeling Multidimensional Databases", IBM Almaden Research Center, 1995, Presented at the 13th International Conference on Data Engineering, Apr. 1997, pp. 1-23.
Agrawal et al.: "Modeling Multidimensional Databases", IBM Almaden Research Center, 1995, Presented at the 13th International Conference on Data Engineering, pp. 1-23, available as Research Report 1995.
Anonymous: "Introduction to MDDBs", SAS Institute Inc., SAS/MDDB Server Administrators Guide Version 8, 1999, pp. 3-10.
The Art of Indexing by not indicated, Dynamic Information Systems Corporation, 1999, p. 3- 30.
The Art of Indexing,: A White Paper by DISC, Oct. 1999, pp. 3-30, Dynamic Information Systems Corporation.
Carickhoff, Rich: "Internet Systems' website re A New Face for OLAP", Jan. 1997.
Carickhoff, Rich: "Internet Systems' website re A New Face for OLAP", Jan. 1997. DBMS Magazine.
Chaudhuri, et al.: "An Overview of Data Warehousing and OLAP Technology", Sigmod Record, Sigmod, New York, NY, US, vol. 26, No. 1, Mar. 1997, pp. 65-74.
Chaudhuri, S. et al., "An Overview of Data Warehousing and OLAP Technology", SIGMOD Record, New York, NY Mar. 1997, vol. 26, No. 1.
Cheung, et al.: "Towards the Building of a Dense-Region-Based OLAP System", Data and Knowledge Engineering, vol. 36, No. 1, 2001, http://www.elsevier.nl/gej-ng/10/16/74/62/24/24/abstract.html, pp. 1-27.
Colliat, George: "OLAP: Relational, and Multidimensional Database Systems", SIGMOD Record, vol. 25, No. 3, Sep. 1996, pp. 64-69.
Date, C. J., et al.: An Introduction to Database Systems, No. 7th, 2000, pp. 250, 266, 289-326.
Date, C. J., et al.: An Introduction to Database Systems, No. 7th, 2000, pp. 250, 266, 289-326. Addison-Wesley, Seventh Edition.
Date, et al., "An Introduction to Database Systems, vol. II", Reading: Addison-Wesley, pp. 62-64, 1983. QA76.9.D3D367. ISBN 0-201-14474-3.
Date, et al., "An Introduction to Database Systems, vol. II", Reading: Addison-Wesley, pp. 62-64, 1983.
Date, C.J., "An Introduction to Database Systems," 2000, pp. 250, 266, 289-326, Addison-Wesley, Seventh Edition.
Duhl, et al., "A Performance of Object and Relational Databases Using the Sun Benchmark", Proceedings of the OOPSLA Conference, pp. 153-163, Sep. 25-30, 1988.
Duhl, et al., "A Performance Comparison of Object and Relational Databases Using the Sun Benchmark", Proceedings of the Conference on Object Oriented Programming Systems Languages and Applications,Sep. 25-30, 1988, pp. 153-163.

Elkins, S. B.: "Open OLAP", DBMS Apr. 1998, http://www.dbmsmag.com/9804d14.html, pp. 1-7.

Foley, J. TechWeb's website page re Microsoft Servers Up New SQL Server Beta Jan. 12, 1998.

Gupta, H.V., et al., "Index Selection for OLAP", Proceedings of the 13th Int'l Conference on Data Engineering, Apr. 7-11, 1997, pp. 208-219.

Harinarayan et al.: "Implementing Data Cubes Efficiently", Proceedings of the 1996 ACM SIGMOD International Conference on Mangement of Data, Jun. 4-6, pp. 205-216.

Harinarayan et al.: "Implementing Data Cubes Efficiently", Proceedings of the 1996 SIGMOD 1996, pp. 1-25.

Hellerstein et al.: Online Aggregation, Presented at the ACM SIGMOD International Conference on Management of Data, May 11-15, 1997, http://www.acm.org/pubs/citations/proceedings/mod/253260/p171-hellerstein/, pp. 1-12.

Hellerstein, J.M., "Optimization Techniques for Queries with Expensive Methods", ACM Transactions on Database Systems (TODS), vol. 23, No. 2, pp. 113-157, 1998.

Ho, C.-T. et al.: Range Queries in OLAP Data Cubes, Presented at the ACM SIGMOD International Conference on Management of Data, May 11-15, 1997, http://www.acm.org/pubs/citations/proceedings/mod/253260/p73-ho/, pp. 1-16.

Introduction to Structured Query Language, http:/w3one.net/~jhoffmann/sqltut.htm, 2000, pp. 1-33.

Introduction to Structured Query Language, http:/w3one.net/~jhoffmann/sqltut.htm, 2000, pp. 1-33. http:/w3.one.net/~about.jhoffman/sqltut.htm.

Kimball, R., "Aggregate Navigation With (Almost) No MetaData", http://www.dbmsmag.com/9608d54.html, 1996, pp. 1-8.

Kimball, R.: "The Aggregate Navigator; How to Optimize Your Data Warehouse Using Aggregates Without Driving Your End Users Crazy", DBMS (www.dbmsmag.com)—Nov. 1995.

Korn, F. et al.: "Efficiently Supporting Ad Hoc Queries in Large Datasets of Time Sequences", Presented at ACM SIGMOD International Conference on Management of Data, May 11-15, 1997, http://www.acm.org/pubs/citations/proceedings/mod/253260.p289-korn/, pp. 1-22.

Li, et al.: A Data Model for Supporting On-Line Analytical Processing, Presented at the International Conference on Information and Knowledge Management, 1996, pp. 81-88.

Li, C., et al.: "Optimizing Statistical Queries by Exploiting Orthogonality and Interval Properties of Grouping Relations", Presented at the 8th International Conference on Scientific & Statistical Database Management, Jun 1996, pp. 1-10.

McKie, S.: "Essbase 4.0", DBMS, Jul. 1996, Web-based Product Review for Arbor Software Corporation, http://www.dbmsmag.com/9607d13.html, pp. 1-4.

Pedersen, T. B., "Aspects of Data Modeling and Query Processing for Complex Multidimensional Data", Chapter 4, entitled Extending Practical Pre-Aggregation in On-Line Analytical Processing, of the Ph.D. Dissertation, Danish Academy of Technical Sciences 2000, pp. 1-103.

Petersen, T. B., et al.: "Multidimensional Database Technology", IEEE, vol. 34, No. 12, Dec. 2001, pp. 40-46.

Pedersen, T. B., Aspects of Data Modeling and Query Processing for Com., Dept. Computer Sci., Aalborg Univ., Denmark, 2000, pp. 1, 77-103.

Pedersen, et al., Extending OLAP Querying to Object Databases, VLDB 2000 Submission.

Petersen, T. B., et al.: "Multidimensional Database Technology", IEEE, vol. 34, No. 12, Dec. 2001, pp. 40-46.

Pendse, Nigel: "The Origins of Today's OLAP Products", htt;://www.olapreport.com/origins.htm., Feb. 6, 2003, pp. 1-7.

"Performance Management—Product Information," ENT, Jul. 17, 1999, 2 pages.

Pourabbas, et al.: "Characterization of Hierarchies and Some Operators in OLAP Environment", Presented at the ACM 2nd International Workshop on Data Warehousing and OLAP, Nov. 2-6, 1999, pp. 1-17.

Pourabbas, et al.: "Characterization of Hierarchies and Some Operators in OLAP Environment", Presented at the ACM 2nd International Workshop on Data Warehousing and OLAP, 1999, pp. 54-49.

Pourabbas et al.: "Hierarchies and Relative Operators in the OLAP Environment", SIGMOD Record, vol. 29, No. 1, Mar. 2000, http://dblp.unitrier.de/db/journals/sigmod/sigmod29.html, pp. 1-8.

Roche, T.: "Intermediate Client-server techniques", 1999.

Salem et al.: "How to Roll a Join: Asynchronous Incremental View Maintenance", Presented by ACM SIGMOD on Management of Data and Symposium on Principles of Database Systems, May 15-18, 2000, http://www.acm.org/pubs/citations/proceedings/mod/342009/p129-salem/#abstract, pp. 1-13.

SAS/MCCB®: Web-based product brochure entitled "See Data from All Angles with Multidimensional Database Software" by SAS/MCCB® Server, www.sas.com/products/mddb/index.html, 2001, 1 page.

Scheuermann, P., J. Shim and R. Vingralek "WATCHMAN: A Data Warehouse Intelligent Cache Manager", Proceedings of the 22nd International Conference on Very Large Databases (VLDB), 1996, pp. 51-62.

Schumacher, Robin: Attunity Connect SQL—PowerPoint presentation undated 38 pages. BrioQuery Enterprise 4.0; Brio Technologys desktop OLAP tool, Lexis.com DBMX Magazine vol. 9 No. 10 Sep. 1996.

Shoshani, OLAP and Statistical Databases: Similarities and Differences, Abstract—PODS Proceedings of PODS '97 1997.

Shoshani, OLAP and Statistical Databases: Similarities and Differences, Abstract—PODS 97 pp. 185-196.

Vassiliadis, P.: "A Survey of Logical Models for OLAP Databases", Sigmod Record, vol. 28, No. 4, Dec. 1999.

Widman et al.: Efficient Execution of Operations in a DBMS for Multidimensional Arrays, presented at the ACM SIGMOD 1998, http://dblp.unitrier.de/db/conf/ssdbm/WidmannB98.html, pp. 1-11.

Zhao, Y et al. "Array-Based Evaluation of Multi-Dimensional Queries in Object-Relational Database Systems, " Data Engineering, 1998 Proceedings, 14th International Conference in Orlando, FL, Feb. 23-27, 1998.

U. S. District Court Order, for the Northern District of California in the matter of *Hyperion Solutions Corp.* vs. *HyperRoll, Inc., et al.*(Case No. Cv 05-05054-Vrw), 35 pages, dated Aug. 28, 2006.

U.S. Office Action re U.S. Appl. No. 10/153,164 dated Nov. 25, 2003.
U.S. Office Action re U.S. Appl. No. 10/854,034 dated Nov. 6, 2006.
U.S. Office Action re U.S. Appl. No. 10/854,034 dated Nov. 6, 2006.
U.S. Office Action re U.S. Appl. No. 09/796,098 dated Oct. 24, 2003.
U. S. Office Action re U.S. Appl. No. 12/657,143 dated Sep. 15, 2010.
U. S. Office Action re U.S. Appl. No. 12/455,665 dated Jul. 30, 2010.
U. S. Office Action re U.S. Appl. No. 12/653,373 dated Aug. 30, 2010.
U. S. Office Action re U.S. Appl. No. 12/590,504 dated Aug. 30, 2010.
U. S. Office Action re U.S. Appl. No. 12/589,383 dated Oct. 26, 2010.

* cited by examiner

Page Allocation Table pointing on physical records of a multidimensional variable (e.g. the two first rows of a variable of FIG. 2B reside in page # 0)

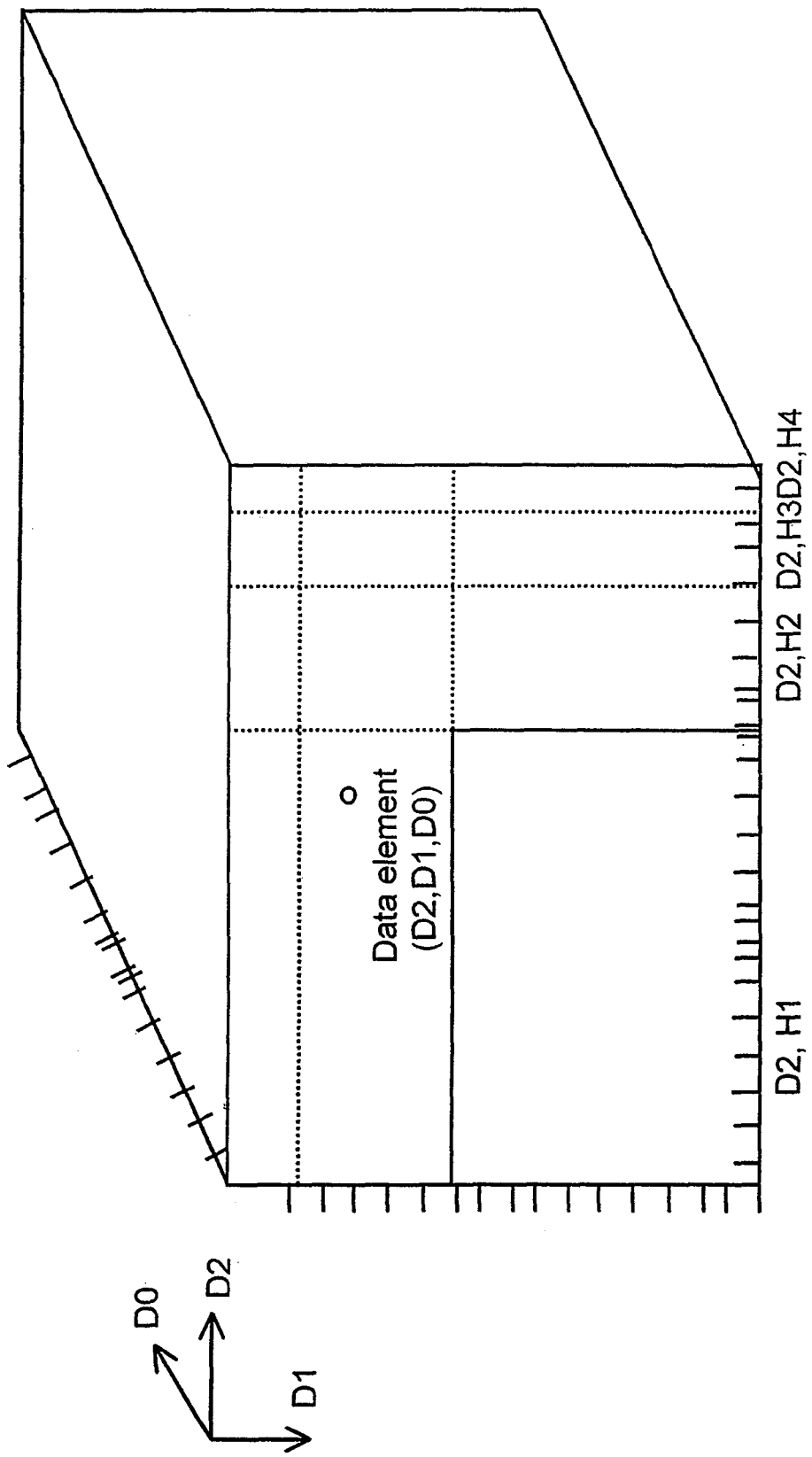

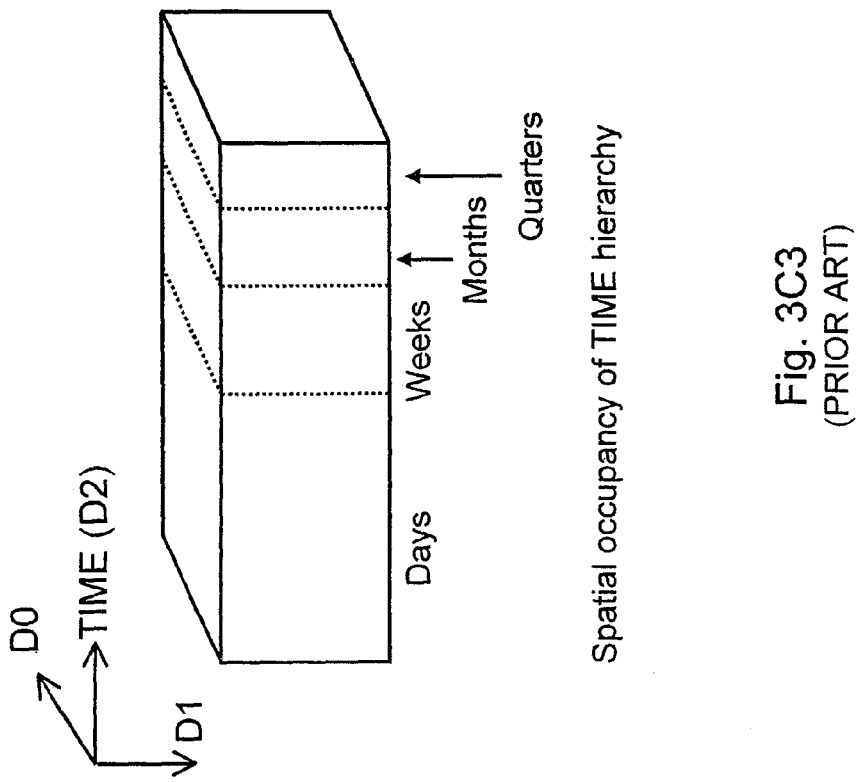
Fig. 3C3
(PRIOR ART)
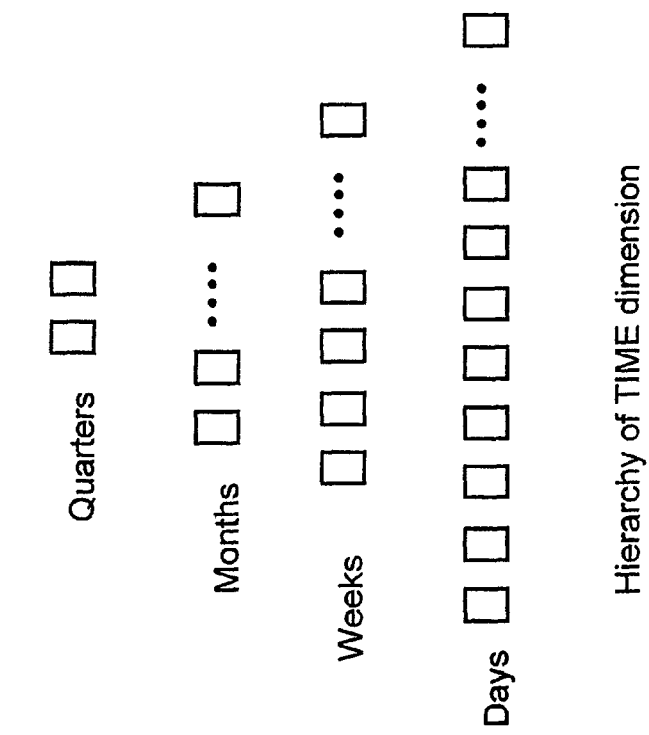
Fig. 3C2
(PRIOR ART)

|  | NBR. OF DIM. | NBR. OF ATOMIC DATA DATA VALUES | LEAF NODE DENSITY % | NUMBER OF VALUES IN CUBE AFTER ROLL-UP | ORACLE EXPRESS V. 6.2 | IMPLEMENTATION OF CURRENT INVENTION |
|---|---|---|---|---|---|---|
| D1 | 6 | 302M | 9 | 427 M | 16 h | 15 m |
| D2 | 4 | 414M | 1.27 | 969 M | 50 m | 5 m |
| D3 | 5 | 14,499M | 0.03 | 63,954 M | 31 h | 1h 23 m |
| D4 | 6 | 623,494M | $8 * 10^{-4}$ | 7,930 G | EXCEEDS 48 h | 2 h 20 m |
| D5 | 6 | 243,000M | $10^{-8}$ | 1,160,000 G | 22 h | 4 m |
| D6 | 4 | 7M | DEFINED AS 100 | 19 M | 15 m | 1 m |

FIG. 8A

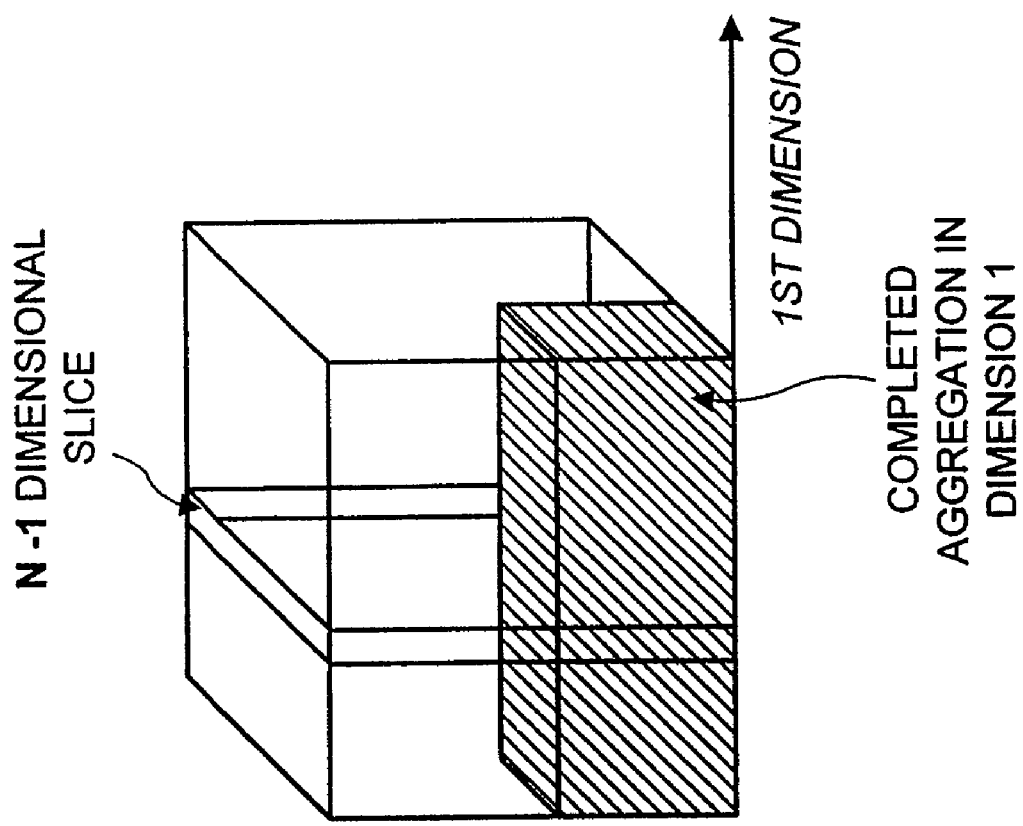

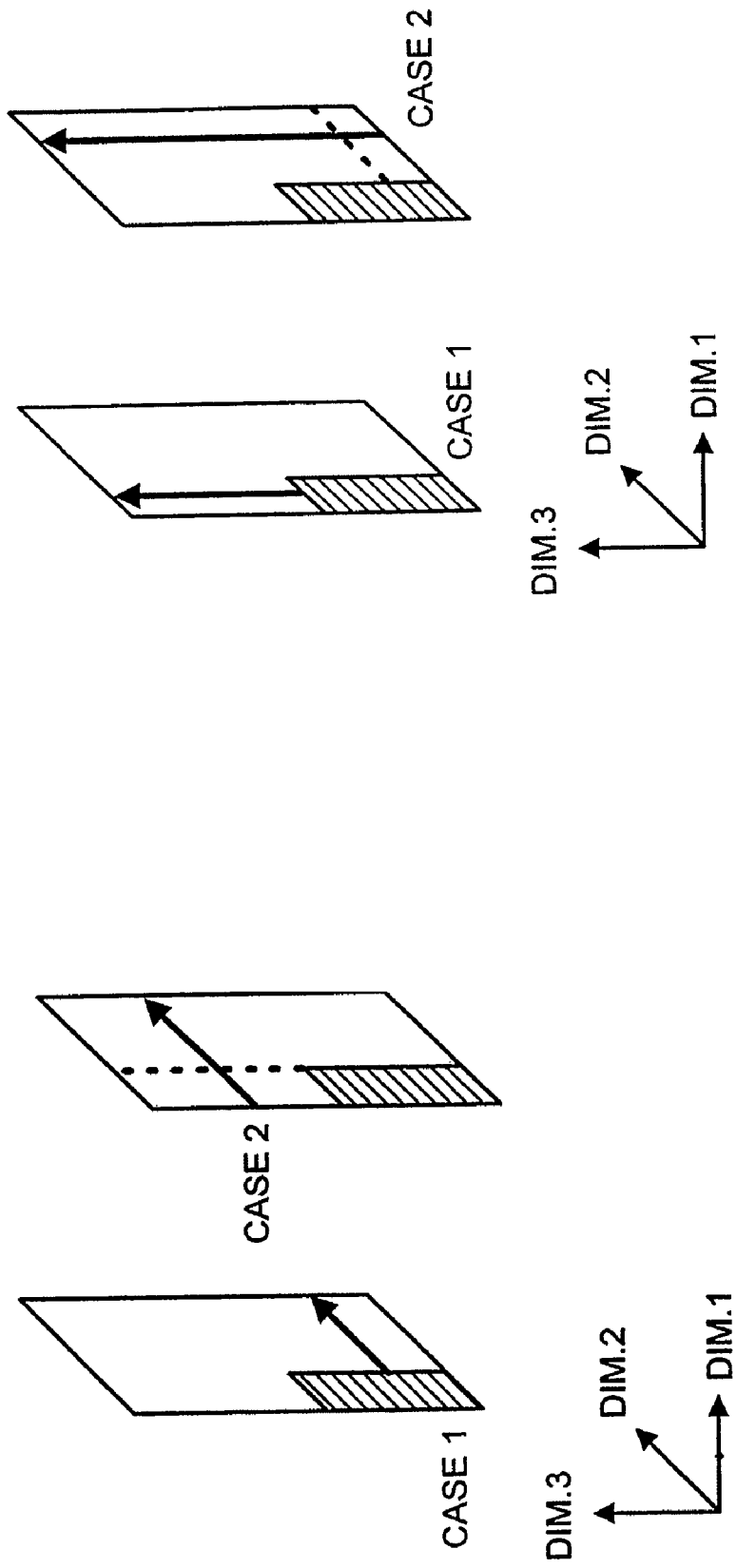

DATA AGGREGATION MODULE SUPPORTING DYNAMIC QUERY RESPONSIVE AGGREGATION DURING THE SERVICING OF DATABASE QUERY REQUESTS PROVIDED BY ONE OR MORE CLIENT MACHINES

RELATED CASES

This is a Continuation of application Ser. No. 11/818,944 filed Aug. 3, 2007 now abandoned; which is a Continuation of application Ser. No. 10/854,034 filed May 25, 2004, now abandoned; which is a Continuation of application Ser. No. 10/153,164 filed May 21, 2002 now abandoned, which is a Continuation of application Ser. No. 09/514,611 filed Feb. 28, 2000, now U.S. Pat. No. 6,434,544; which is a Continuation-in-part of: application Ser. No. 09/368,241 filed Aug. 4, 1999 now U.S. Pat. No. 6,408,292; each said Application being commonly owned by HyperRoll Inc., and incorporated herein by reference in its entirety.

BACKGROUND OF THE INVENTION

1. Field of Invention

The present invention relates to a method of and system for aggregating data elements in a multi-dimensional database (MDDB) supported upon a computing platform and also to provide an improved method of and system for managing data elements within a MDDB during on-line analytical processing (OLAP) operations.

2. Brief Description of the State of the Art

The ability to act quickly and decisively in today's increasingly competitive marketplace is critical to the success of organizations. The volume of information that is available to corporations is rapidly increasing and frequently overwhelming. Those organizations that will effectively and efficiently manage these tremendous volumes of data, and use the information to make business decisions, will realize a significant competitive advantage in the marketplace.

Data warehousing, the creation of an enterprise-wide data store, is the first step towards managing these volumes of data. The Data Warehouse is becoming an integral part of many information delivery systems because it provides a single, central location where a reconciled version of data extracted from a wide variety of operational systems is stored. Over the last few years, improvements in price, performance, scalability, and robustness of open computing systems have made data warehousing a central component of Information Technology CIT strategies. Details on methods of data integration and constructing data warehouses can be found in the white paper entitled "Data Integration: The Warehouse Foundation" by Louis Rolleigh and Joe Thomas.

Building a Data Warehouse has its own special challenges (e.g. using common data model, common business dictionary, etc.) and is a complex endeavor. However, just having a Data Warehouse does not provide organizations with the often-heralded business benefits of data warehousing. To complete the supply chain from transactional systems to decision maker, organizations need to deliver systems that allow knowledge workers to make strategic and tactical decisions based on the information stored in these warehouses. These decision support systems are referred to as On-Line Analytical Processing (OLAP) systems. OLAP systems allow knowledge workers to intuitively, quickly, and flexibly manipulate operational data using familiar business terms, in order to provide analytical insight into a particular problem or line of inquiry. For example, by using an OLAP system, decision makers can "slice and dice" information along a customer (or business) dimension, and view business metrics by product and through time. Reports can be defined from multiple perspectives that provide a high-level or detailed view of the performance of any aspect of the business. Decision makers can navigate throughout their database by drilling down on a report to view elements at finer levels of detail, or by pivoting to view reports from different perspectives. To enable such full-functioned business analysis, OLAP systems need to (1) support sophisticated analysis, (2) scale to large numbers of dimensions, and (3) support analysis against large atomic data sets. These three key requirements are discussed further below.

Decision makers use key performance metrics to evaluate the operations within their domain, and OLAP systems need to be capable of delivering these metrics in a user-customizable format. These metrics may be obtained from the transactional databases precalculated and stored in the database, or generated on demand during the query process. Commonly used metrics include:

(1) Multidimensional Ratios (e.g. Percent to Total):
"Show me the contribution to weekly sales and category profit made by all items sold in the Northwest stores between July 1 and July 14."

(2) Comparisons (e.g. Actual vs. Plan, This Period vs. Last Period):
"Show me the sales to plan percentage variation for this year and compare it to that of the previous year to identify planning discrepancies."

(3) Ranking and Statistical Profiles (e.g. Top N/Bottom N, 70/30, Quartiles):
"Show me sales, profit and average call volume per day for my 20 most profitable salespeople, who are in the top 30% of the worldwide sales."

(4) Custom Consolidations:
"Show me an abbreviated income statement by quarter for the last two quarters for my Western Region operations."

Knowledge workers analyze data from a number of different business perspectives or dimensions. As used hereinafter, a dimension is any element or hierarchical combination of elements in a data model that can be displayed orthogonally with respect to other combinations of elements in the data model. For example, if a report lists sales by week, promotion, store, and department, then the report would be a slice of data taken from a four-dimensional data model.

Target marketing and market segmentation applications involve extracting highly qualified result sets from large volumes of data. For example, a direct marketing organization might want to generate a targeted mailing list based on dozens of characteristics, including purchase frequency, size of the last purchase, past buying trends, customer location, age of customer, and gender of customer. These applications rapidly increase the dimensionality requirements for analysis.

The number of dimensions in OLAP systems range from a few orthogonal dimensions to hundreds of orthogonal dimensions. Orthogonal dimensions in an exemplary OLAP application might include Geography, Time, and Products.

Atomic data refers to the lowest level of data granularity required for effective decision making. In the case of a retail merchandising manager, "atomic data" may refer to information by store, by day, and by item. For a banker, atomic data may be information by account, by transaction, and by branch. Most organizations implementing OLAP systems find themselves needing systems that can scale to tens, hundreds, and even thousands of gigabytes of atomic information.

As OLAP systems become more pervasive and are used by the majority of the enterprise, more data over longer time frames will be included in the data store (i.e. data warehouse), and the size of the database will increase by at least an order of magnitude. Thus, OLAP systems need to be able to scale from present to near-future volumes of data.

In general, OLAP systems need to (1) support the complex analysis requirements of decision-makers, (2) analyze the data from a number of different perspectives (i.e. business dimensions), and (3) support complex analyses against large input (atomic-level) data sets from a Data Warehouse maintained by the organization using a relational database management system (RDBMS).

Vendors of OLAP systems classify OLAP Systems as either Relational OLAP (ROLAP) or Multidimensional OLAP (MOLAP) based on the underlying architecture thereof. Thus, there are two basic architectures for On-Line Analytical Processing systems: The ROLAP Architecture, and the MOLAP architecture.

Overview of the Relational OLAP (ROLAP) System Architecture

The Relational OLAP (ROLAP) system accesses data stored in a Data Warehouse to provide OLAP analyses. The premise of ROLAP is that OLAP capabilities are best provided directly against the relational database, i.e. the Data Warehouse.

The ROLAP architecture was invented to enable direct access of data from Data Warehouses, and therefore support optimization techniques to meet batch window requirements and provide fast response times. Typically, these optimization techniques include application-level table partitioning, pre-aggregate inferencing, denormalization support, and the joining of multiple fact tables.

As shown in FIG. 1A, a typical prior art ROLAP system has a three-tier or layer client/server architecture. The "database layer" utilizes relational databases for data storage, access, and retrieval processes. The "application logic layer" is the ROLAP engine which executes the multidimensional reports from multiple users. The ROLAP engine integrates with a variety of "presentation layers," through which users perform OLAP analyses.

After the data model for the data warehouse is defined, data from on-line transaction-processing (OLTP) systems is loaded into the relational database management system (RDBMS). If required by the data model, database routines are run to pre-aggregate the data within the RDBMS. Indices are then created to optimize query access times. End users submit multidimensional analyses to the ROLAP engine, which then dynamically transforms the requests into SQL execution plans. The SQL execution plans are submitted to the relational database for processing, the relational query results are cross-tabulated, and a multidimensional result data set is returned to the end user. ROLAP is a fully dynamic architecture capable of utilizing precalculated results when they are available, or dynamically generating results from atomic information when necessary.

Overview of MOLAP System Architecture

Multidimensional OLAP (MOLAP) systems utilize a proprietary multidimensional database (MDDB) to provide OLAP analyses. The main premise of this architecture is that data must be stored multidimensionally to be accessed and viewed multidimensionally.

As shown in FIG. 1B, prior art MOLAP systems have an Aggregation, Access and Retrieval module which is responsible for all data storage, access, and retrieval processes, including data aggregation (i.e. preaggregation) in the MDDB. As shown in FIG. 1B, the base data loader is fed with base data, in the most detailed level, from the Data Warehouse, into the Multi-Dimensional Data Base (MDDB). On top of the base data, layers of aggregated data are built-up by the Aggregation program, which is part of the Aggregation, Access and Retrieval module. As indicated in this figure, the application logic module is responsible for the execution of all OLAP requests/queries (e.g. ratios, ranks, forecasts, exception scanning, and slicing and dicing) of data within the MDDB. The presentation module integrates with the application logic module and provides an interface, through which the end users view and request OLAP analyses on their client machines which may be web-enabled through the infrastructure of the Internet. The client/server architecture of a MOLAP system allows multiple users to access the same multidimensional database (MDDB).

Information (i.e. basic data) from a variety of operational systems within an enterprise, comprising the Data Warehouse, is loaded into a prior art multidimensional database (MDDB) through a series of batch routines. The Express™ server by the Oracle Corporation is exemplary of a popular server which can be used to carry out the data loading process in prior art MOLAP systems. As shown in FIG. 2B an exemplary 3-D MDDB is schematically depicted, showing geography, time and products as the "dimensions" of the database. The multidimensional data of the MDDB is organized in an array structure, as shown in FIG. 2C. Physically, the Express™ server stores data in pages (or records) of an information file. Pages contain 512, or 2048, or 4096 bytes of data, depending on the platform and release of the Express™ server. In order to look up the physical record address from the database file recorded on a disk or other mass storage device, the Express™ server generates a data structure referred to as a "Page Allocation Table (PAT)". As shown in FIG. 2D, the PAT tells the Express™ server the physical record number that contains the page of data. Typically, the PAT is organized in pages. The simplest way to access a data element in the MDDB is by calculating the "offset" using the additions and multiplications expressed by a simple formula:

$$\text{Offset} = \text{Months} + \text{Product}*(\#\text{ of\_Months}) + \text{City}*(\#\text{ of\_Months}*\#\text{ of\_Products})$$

During an OLAP session, the response time of a multidimensional query on a prior art MDDB depends on how many cells in the MDDB have to be added "on the fly". As the number of dimensions in the MDDB increases linearly, the number of the cells in the MDDB increases exponentially. However, it is known that the majority of multidimensional queries deal with summarized high level data. Thus, as shown in FIGS. 3A and 3B, once the atomic data (i.e. "basic data") has been loaded into the MDDB, the general approach is to perform a series of calculations in batch in order to aggregate (i.e. pre-aggregate) the data elements along the orthogonal dimensions of the MDDB and fill the array structures thereof. For example, revenue figures for all retail stores in a particular state (i.e. New York) would be added together to fill the state level cells in the MDDB. After the array structure in the database has been filled, integer-based indices are created and hashing algorithms are used to improve query access times. Pre-aggregation of dimension D0 is always performed along the cross-section of the MDDB along the D0 dimension.

As shown in FIG. 3C2, the primarily loaded data in the MDDB is organized at its lowest dimensional hierarchy. As shown in FIGS. 3C1 and 3C3, the results of the pre-aggregations are stored in the neighboring parts of the MDDB.

As shown in FIG. 3C2, along the TIME dimension, weeks are the aggregation results of days, months are the aggregation results of weeks, and quarters are the aggregation results of months. While not shown in the figures, along the GEOGRAPHY dimension, states are the aggregation results of cities, countries are the aggregation results of states, and continents are the aggregation results of countries. By pre-aggregating (i.e. consolidating or compiling) all logical subtotals and totals along all dimensions of the MDDB, it is possible to carry out real-time MOLAP operations using a multidimensional database (MDDB) containing both basic (i.e. atomic) and pre-aggregated data. Once this compilation process has been completed, the MDDB is ready for use. Users request OLAP reports by submitting queries through the OLAP Application interface (e.g. using web-enabled client machines), and the application logic layer responds to the submitted queries by retrieving the stored data from the MDDB for display on the client machine.

Typically, in MDDB systems, the aggregated data is very sparse, tending to explode as the number of dimension grows and dramatically slowing down the retrieval process (as described in the report entitled "Database Explosion: The OLAP Report", incorporated herein by reference). Quick and on line retrieval of queried data is critical in delivering on-line response for OLAP queries. Therefore, the data structure of the MDDB, and methods of its storing, indexing and handling are dictated mainly by the need of fast retrieval of massive and sparse data.

Different solutions for this problem are disclosed in the following US Patents, each of which is incorporated herein by reference in its entirety:

U.S. Pat. No. 5,822,751 "Efficient Multidimensional Data Aggregation Operator Implementation"
U.S. Pat. No. 5,805,885 "Method And System For Aggregation Objects"
U.S. Pat. No. 5,781,896 "Method And System For Efficiently Performing Database Table Aggregation Using An Aggregation Index"
U.S. Pat. No. 5,745,764 "Method And System For Aggregation Objects"

In all the prior art OLAP servers, the process of storing, indexing and handling MDDB utilize complex data structures to largely improve the retrieval speed, as part of the querying process, at the cost of slowing down the storing and aggregation. The query-bounded structure, that must support fast retrieval of queries in a restricting environment of high sparsity and multi-hierarchies, is not the optimal one for fast aggregation.

In addition to the aggregation process, the Aggregation, Access and Retrieval module is responsible for all data storage, retrieval and access processes. The Logic module is responsible for the execution of OLAP queries. The Presentation module intermediates between the user and the logic module and provides an interface through which the end users view and request OLAP analyses. The client/server architecture allows multiple users to simultaneously access the multidimensional database.

In summary, general system requirements of OLAP systems include: (1) supporting sophisticated analysis, (2) scaling to large number of dimensions, and (3) supporting analysis against large atomic data sets.

MOLAP system architecture is capable of providing analytically sophisticated reports and analysis functionality. However, requirements (2) and (3) fundamentally limit MOLAP's capability, because to be effective and to meet end-user requirements, MOLAP databases need a high degree of aggregation.

By contrast, the ROLAP system architecture allows the construction of systems requiring a low degree of aggregation, but such systems are significantly slower than systems based on MOLAP system architecture principles. The resulting long aggregation times of ROLAP systems impose severe limitations on its volumes and dimensional capabilities.

The graphs plotted in FIG. 5 clearly indicate the computational demands that are created when searching an MDDB during an OLAP session, where answers to queries are presented to the MOLAP system, and answers thereto are solicited often under real-time constraints. However, prior art MOLAP systems have limited capabilities to dynamically create data aggregations or to calculate business metrics that have not been precalculated and stored in the MDDB.

The large volumes of data and the high dimensionality of certain market segmentation applications are orders of magnitude beyond the limits of current multidimensional databases.

ROLAP is capable of higher data volumes. However, the ROLAP architecture, despite its high volume and dimensionality superiority, suffers from several significant drawbacks as compared to MOLAP:

Full aggregation of large data volumes are very time consuming, otherwise, partial aggregation severely degrades the query response.
It has a slower query response
It requires developers and end users to know SQL
SQL is less capable of the sophisticated analytical functionality necessary for OLAP
ROLAP provides limited application functionality Thus, improved techniques for data aggregation within MOLAP systems would appear to allow the number of dimensions of and the size of atomic (i.e. basic) data sets in the MDDB to be significantly increased, and thus increase the usage of the MOLAP system architecture.

Also, improved techniques for data aggregation within ROLAP systems would appear to allow for maximized query performance on large data volumes, and reduce the time of partial aggregations that degrades query response, and thus generally benefit ROLAP system architectures.

Thus, there is a great need in the art for an improved way of and means for aggregating data elements within a multidimensional database (MDDB), while avoiding the shortcomings and drawbacks of prior art systems and methodologies.

SUMMARY AND OBJECTS OF PRESENT INVENTION

Accordingly, it is a further object of the present invention to provide an improved method of and system for managing data elements within a multidimensional database (MDDB) using a novel stand-alone (i.e. external) data aggregation server, achieving a significant increase in system performance (e.g. deceased access/search time) using a stand-alone scalable data aggregation server.

Another object of the present invention is to provide such system, wherein the stand-alone aggregation server includes an aggregation engine that is integrated with an MDDB, to provide a cartridge-style plug-in accelerator which can communicate with virtually any conventional OLAP server.

Another object of the present invention is to provide such a stand-alone data aggregration server whose computational tasks are restricted to data aggregation, leaving all other OLAP functions to the MOLAP server and therefore complementing OLAP server's functionality.

Another object of the present invention is to provide such a system, wherein the stand-alone aggregation server carries out an improved method of data aggregation within the MDDB which enables the dimensions of the MDDB to be scaled up to large numbers and large atomic (i.e. base) data sets to be handled within the MDDB.

Another object of the present invention is to provide such a stand-alone aggregration server, wherein the aggregation engine supports high-performance aggregation (i.e. data roll-up) processes to maximize query performance of large data volumes, and to reduce the time of partial aggregations that degrades the query response.

Another object of the present invention is to provide such a stand-alone, external scalable aggregation server, wherein its integrated data aggregation (i.e. roll-up) engine speeds up the aggregation process by orders of magnitude, enabling larger database analysis by lowering the aggregation times.

Another object of the present invention is to provide such a novel stand-alone scalable aggregation server for use in OLAP operations, wherein the scalability of the aggregation server enables (i) the speed of the aggregation process carried out therewithin to be substantially increased by distributing the computationally intensive tasks associated with data aggregation among multiple processors, and (ii) the large data sets contained within the MDDB of the aggregation server to be subdivided among multiple processors thus allowing the size of atomic (i.e. basic) data sets within the MDDB to be substantially increased.

Another object of the present invention is to provide such a novel stand-alone scalable aggregation server, which provides for uniform load balancing among processors for high efficiency and best performance, and linear scalability for extending the limits by adding processors.

Another object of the present invention is to provide a stand-alone, external scalable aggregation server, which is suitable for MOLAP as well as for ROLAP system architectures.

Another object of the present invention is to provide a novel stand-alone scalable aggregation server, wherein an MDDB and aggregation engine are integrated and the aggregation engine carries out a high-performance aggregation algorithm and novel storing and searching methods within the MDDB.

Another object of the present invention is to provide a novel stand-alone scalable aggregation server which can be supported on single-processor (i.e. sequential or serial) computing platforms, as well as on multi-processor (i.e. parallel) computing platforms.

Another object of the present invention is to provide a novel stand-alone scalable aggregation server which can be used as a complementary aggregation plug-in to existing MOLAP and ROLAP databases.

Another object of the present invention is to provide a novel stand-alone scalable aggregation server which carries out an novel rollup (i.e. down-up) and spread down (i.e. top-down) aggregation algorithms.

Another object of the present invention is to provide a novel stand-alone scalable aggregation server which includes an integrated MDDB and aggregation engine which carries out full pre-aggregation and/or "on-the-fly" aggregation processes within the MDDB.

Another object of the present invention is to provide such a novel stand-alone scalable aggregation server which is capable of supporting MDDB having a multi-hierarchy dimensionality.

Another object of the present invention is to provide a novel method of aggregating multidimensional data of atomic data sets originating from a RDBMS Data Warehouse.

Another object of the present invention is to provide a novel method of aggregating multidimensional data of atomic data sets originating from other sources, such as external ASCII files, MOLAP server, or other end user applications.

Another object of the present invention is to provide a novel stand-alone scalable data aggregation server which can communicate with any MOLAP server via standard ODBC, OLE DB or DLL interface, in a completely transparent manner with respect to the (client) user, without any time delays in queries, equivalent to storage in MOLAP server's cache.

Another object of the present invention is to provide a novel "cartridge-style" (stand-alone) scalable data aggregation engine which dramatically expands the boundaries of MOLAP into large-scale applications including Banking, Insurance, Retail and Promotion Analysis.

Another object of the present invention is to provide a novel "cartridge-style" (stand-alone) scalable data aggregation engine which dramatically expands the boundaries of high-volatility type ROLAP applications such as, for example, the precalculation of data to maximize query performance.

Another object of the present invention is to provide a generic plug-in cartridge-type data aggregation component, suitable for all MOLAP systems of different vendors, dramatically reducing their aggregation burdens.

Another object of the present invention is to provide a novel high performance cartridge-type data aggregration server which, having standardized interfaces, can be plugged-into the OLAP system of virtually any user or vendor.

Another object of the present invention is to provide a novel "cartridge-style" (stand-alone) scalable data aggregation engine which has the capacity to convert long batch-type data aggregations into interactive sessions.

These and other object of the present invention will become apparent hereinafter and in the Claims to Invention set forth herein.

BRIEF DESCRIPTION OF THE DRAWINGS

In order to more fully appreciate the objects of the present invention, the following Detailed Description of the Illustrative Embodiments should be read in conjunction with the accompanying Drawings, wherein:

FIG. 3C1 is a schematic representation of an exemplary three-dimensional database used in a conventional MOLAP system of the prior art, showing that each data element contained therein is physically stored at a location in the recording media of the system which is specified by the dimensions (and subdimensions within the dimensional hierarchy) of the data variables which are assigned integer-based coordinates in the MDDB, and also that data elements associated with the basic data loaded into the MDDB are assigned lower integer coordinates in MDDB Space than pre-aggregated data elements contained therewithin;

FIG. 3C2 is a schematic representation illustrating that a conventional hierarchy of the dimension of "time" typically contains the subdimensions "days, weeks, months, quarters, etc." of the prior art;

FIG. 3C3 is a schematic representation showing how data elements having higher subdimensions of time in the MDDB of the prior art are typically assigned increased integer addresses along the time dimension thereof;

FIG. 8A is a data table setting forth information representative of performance benchmarks obtained by the shared-platform type implementation of the stand-alone Aggregation Server of the illustrative embodiment serving the conventional OLAP server (i.e. Oracle EXPRESS Server) shown in FIG. 7B, wherein the common hardware/software platform is realized using a Pentium II 450 Mhz, 1 GB RAM, 18 GB Disk, running the Microsoft NT operating system (OS);

FIG. 9B is a schematic representation of the next stage in the method of segmented aggregation according to the principles of the present invention, showing that any segment along dimension 1, such as the shown slice, can be separately aggregated along the remaining dimensions, 2 and 3, and that in general, for an N dimensional system, the second stage involves aggregation in N-1 dimensions. The principle of segementation can be applied on the first stage as well, however, only a large enough data will justify such a sliced procedure in the first dimension. Actually, it is possible to consider each segment as an N-1 cube, enabling recursive computation.

FIG. 9C1 is a schematic representation of the Query Directed Roll-up (QDR) aggregation method/procedure of the present invention, showing data aggregation starting from existing basic data or previously aggregated data in the first dimension (D1), and such aggregated data being utilized as a basis for QDR aggregation along the second dimension (D2);

FIG. 9C2 is a schematic representation of the Query Directed Roll-up (QDR) aggregation method/procedure of the present invention, showing initial data aggregation starting from existing previously aggregated data in the second third (D3), and continuing along the third dimension (D3), and thereafter continuing aggregation along the second dimension (D2);

DETAILED DESCRIPTION OF THE PREFERRED EMBODIMENTS OF THE PRESENT INVENTION

Figure 1A:
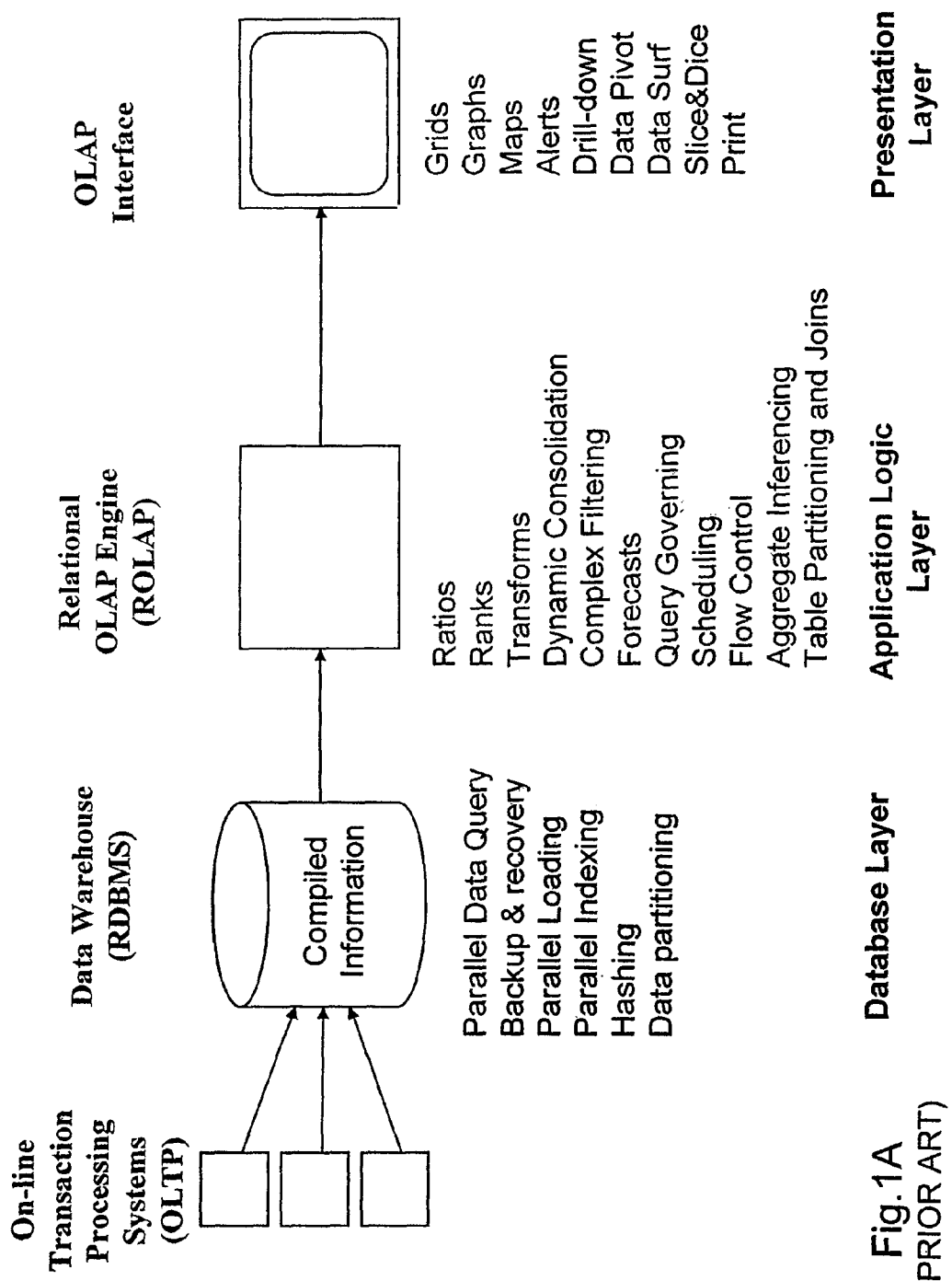
FIG. 1A is a schematic representation of an exemplary prior art relations on-line analytical processing (ROLAP) system comprising a three-tier or layer client/server architecture, wherein the first tier has a database layer utilizing relational databases (RDBMS) for data storage, access, and retrieval processes, the second tier has an application logic layer (i.e. the ROLAP engine) for executing the multidimensional reports from multiple users, and the third tier integrates the ROLAP engine with a variety of presentation layers, through which users perform OLAP analyses.

Referring now to FIGS. 6A through 13, the preferred embodiments of the method and system of the present invention will be now described in great detail hereinbelow, wherein like elements in the Drawings shall be indicated by like reference numerals.

Through this invention disclosure, the term "aggregation" and "preaggregation" shall be understood to mean the process of summation of numbers, as well as other mathematical operations, such as multiplication, subtraction, division etc.

In general, the stand-alone aggregation server and methods of and apparatus for data aggregation of the present invention can be employed in a wide range of applications, including MOLAP systems, ROLAP systems, Internet URL-directory systems, personalized on-line e-commerce shopping systems, Internet-based systems requiring real-time control of packet routing and/or switching, and the like.

For purposes of illustration, initial focus will be accorded to improvements in MOLAP systems, in which knowledge workers are enabled to intuitively, quickly, and flexibly manipulate operational data within a MDDB using familiar business terms in order to provide analytical insight into a business domain of interest.

Figure 6A:
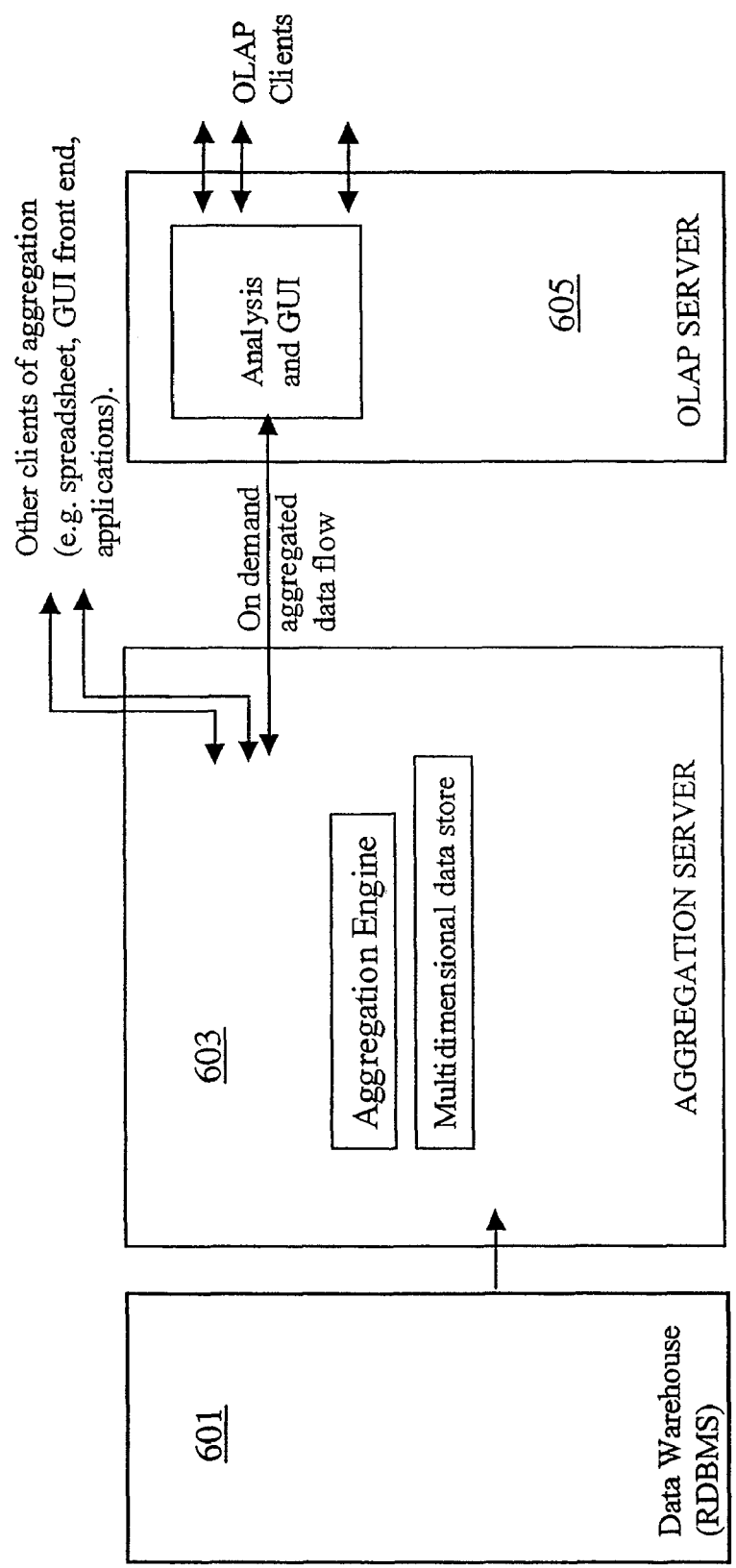
FIG. 6A is a schematic representation of a generalized embodiment of a multidimensional on-line analytical processing (MOLAP) system of the present invention comprising a Data Warehouse realized as a relational database, a stand-alone Aggregration Server of the present invention having an integrated aggregation engine and MDDB, and an OLAP server supporting a plurality of OLAP clients, wherein the stand-alone Aggregation Server performs aggregation functions (e.g. summation of numbers, as well as other mathematical operations, such as multiplication, subtraction, division etc.) and multi-dimensional data storage functions.

FIG. 6A illustrates a generalized embodiment of a multi-dimensional on-line analytical processing (MOLAP) system of the present invention comprising: a Data Warehouse 601 realized as a relational database; a stand-alone cartridge-style Aggregation Server 603 of the present invention having an integrated aggregation engine and a MDDB; and an OLAP server 605 communicating with the Aggregation Server 603, and supporting a plurality of OLAP clients. In accordance with the principles of the present invention, the stand-alone Aggregation Server 603 performs aggregation functions (e.g. summation of numbers, as well as other mathematical operations, such as multiplication, subtraction, division etc.) and multi-dimensional data storage functions. Departing from conventional practices, the principles of the present invention teaches moving the aggregation engine and the MDDB into a separate Aggregation Server 603 having standardized interfaces so that it can be plugged-into the OLAP system of virtually any user or vendor. This feature is illustrated in FIG. 6E wherein the Aggregation Server 603 can be plugged into (e.g., interfaced to) OLAP Servers (two shown as 605' and 605") of different users or vendors. As shown, the Aggregation Server 603 is operably plugged into (e.g., interfaced to) OLAP Server 605' of one user or vendor, yet it is also capable of being operably plugged into OLAP server 605" of another user or vendor, as indicated by the dotted lines. This dramatic move discontinues the restricting dependency of aggregation from the analytical functions of OLAP, and by applying novel and independent algorithms. The stand-alone data aggregation server enables efficient organization and handling of data, fast aggregation processing, and fast access to and retrieval of any data element in the MDDB.

As will be described in greater detail hereinafter, the Aggregation Server 603 of the present invention can serve the data aggregation requirements of other types of systems besides OLAP systems such as, for example, URL directory management Data Marts, RDBMS, or ROLAP.

The Aggregation Server 603 of the present invention excels in performing two distinct functions, namely: the aggregation of data in the MDDB; and the handling of the resulting data base in the MDDB, for "on demand" client use. In the case of serving an OLAP system, the Aggregation Server 603 of the present invention focuses on performing these two functions in a high performance manner (i.e. aggregating and storing base data, originated at the Data Warehouse, in a multidimensional storage (MDDB), and providing the results of this data aggregation process "on demand" to the clients, such as the OLAP server 605, spreadsheet applications, the end user applications. As such, the Aggregation Server 603 of the present invention frees each conventional OLAP server 605, with which it interfaces, from the need of making data aggregations, and therefore allows the conventional OLAP server 605 to concentrate on the primary functions of OLAP servers, namely: data analysis and supporting a graphical interface with the user client.

FIG. 613 shows the primary components of the stand-alone Aggregation Server 603 of the illustrative embodiment, namely: a base data interface 611 (e.g. OLDB, OLE-DB, ODBC, SQL, API, JDBC, etc.) for receiving RDBMS flat files lists and other files from the Data Warehouse (RDBMS), a base data loader 612 for receiving base data from the base data interface 611, configuration manager 613 for managing the operation of the base data interface 611 and base data loader 612, an aggregation engine 621 for receiving base data from the base loader 612, a multi-dimensional database (MDDB) 625; a MDDB handler 623, an input analyzer 627, an aggregation client interface 629 (e.g. OLDB, OLE-DB, ODBC, SQL, API, JDBC, etc.) and a configuration manager 631 for managing the operation of the input analyzer 627 and the aggregation client interface 629.

During operation, the base data originates at data warehouse or other sources, such as external ASCII files, MOLAP server, or others. The Configuration Manager 613, in order to enable proper communication with all possible sources and data structures, configures two blocks, the Base Data Interface 611 and Data Loader 612. Their configuration is matched with different standards such as OLDB, OLE-DB, ODBC, SQL, API, JDBC, etc.

Figure 6B:
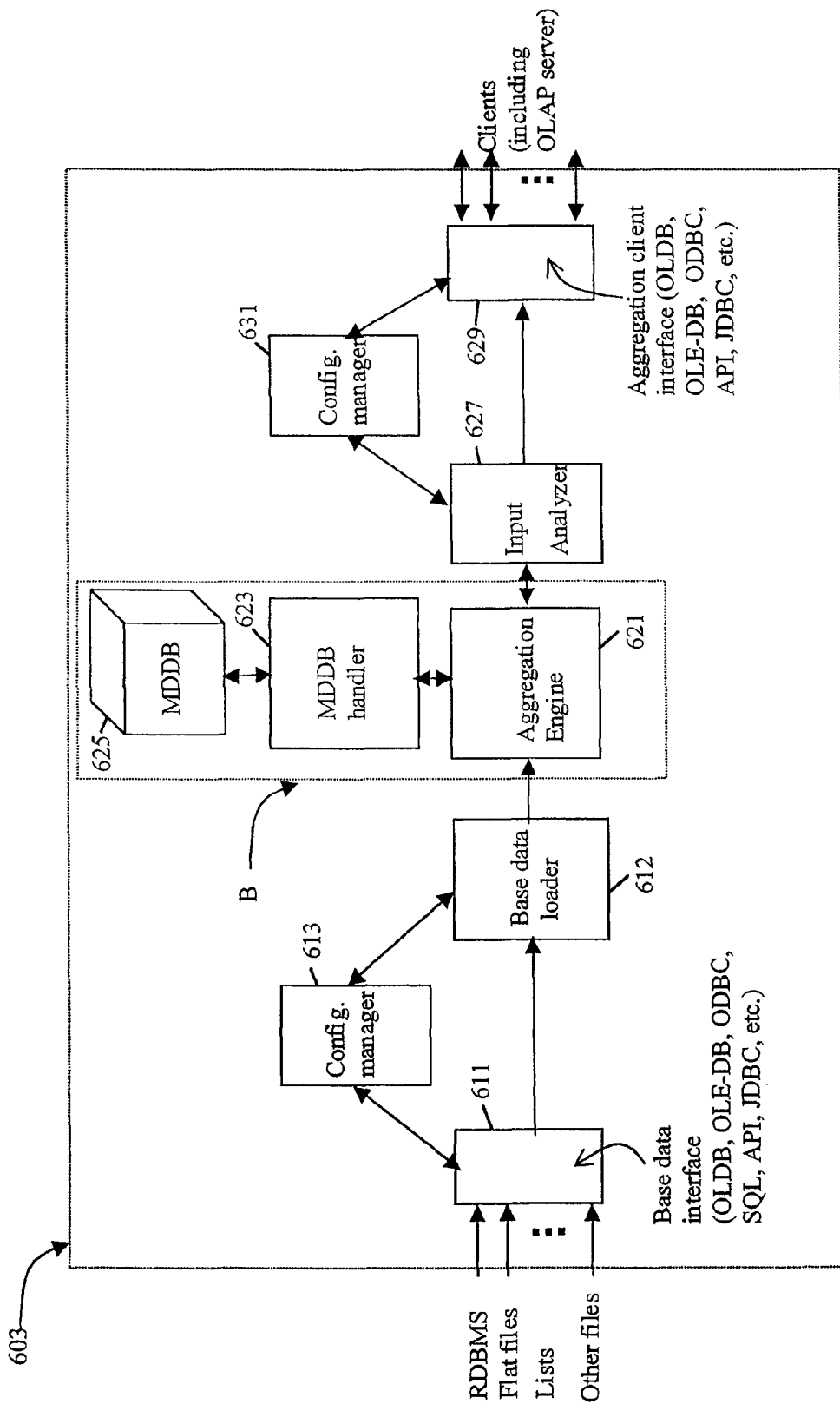
FIG. 6B is a schematic block diagram of the stand-alone Aggregation Server of the illustrative embodiment shown in FIG. 6A, showing its primary components, namely, a base data interface (e.g. OLDB, OLE-DB, ODBC, SQL, API, JDBC, etc.) for receiving RDBMS flat files lists and other files from the Data Warehouse (RDBMS), a base data loader for receiving base data from the base data interface, configuration manager for managing the operation of the base data interface and base data loader, an aggregation engine for receiving base data from the base loader, a multi-dimensional database (MDDB), a MDDB handler for handling the movement of base data and aggregation data between the aggregation engine and the MDDB, an input analyzer, an aggregation client interface (e.g. OLDB, OLE-DB, ODBC, SQL, API, JDBC, etc.) for receiving requests from clients (such as an OLAP Server, spreadsheet application, end-user application) and receiving data files from the input analyzer for transfer to requesting clients, and a configuration manager for managing the operation of the input analyzer and the aggregation client interface.

As shown in FIG. 6B, the core of the data Aggregation Server 603 of the present invention comprises: a data Aggregation Engine 621; a MDDB Handler 623; and a Multidimensional Database (MDDB) 625. The results of data aggregation are efficiently stored in a multidimensional structure within the Multidimensional Database (MDDB) 625, by the MDDB Handler 623.

As shown in FIGS. 6A and 6B, the stand-alone Aggregation Server 603 of the present invention serves the OLAP Server 605 via standard interfaces, such as OLDB, OLE-DB, ODBC, SQL, API, JDBC, etc. Aggregation results required by the OLAP Server 605 are supplied on demand. Typically, the OLAP Server 605 disintegrates the query, via parsing process, into series of requests. Each such request, specifying a n-dimensional coordinate, is presented to the Aggregation Server 603 for the coordinate's value. The Configuration Manager 631 sets the Aggregation Client Interface 629 and Input Analyzer 627 for a proper communication protocol according to the client user (e.g. OLAP Server 605). The Input Analyzer 627 converts the input format to make it suitable for the MDDB Handler 623.

An object of the present invention is to make the transfer of data completely transparent to the OLAP user, in a manner which is equivalent to the storing of data in the cache of the OLAP server 605 and without any query delays. This requires that the stand-alone Aggregation Server 603 have exceptionally fast response characteristics. This object is enabled by providing the unique data structure and aggregation mechanism of the present invention.

Figure 6C:
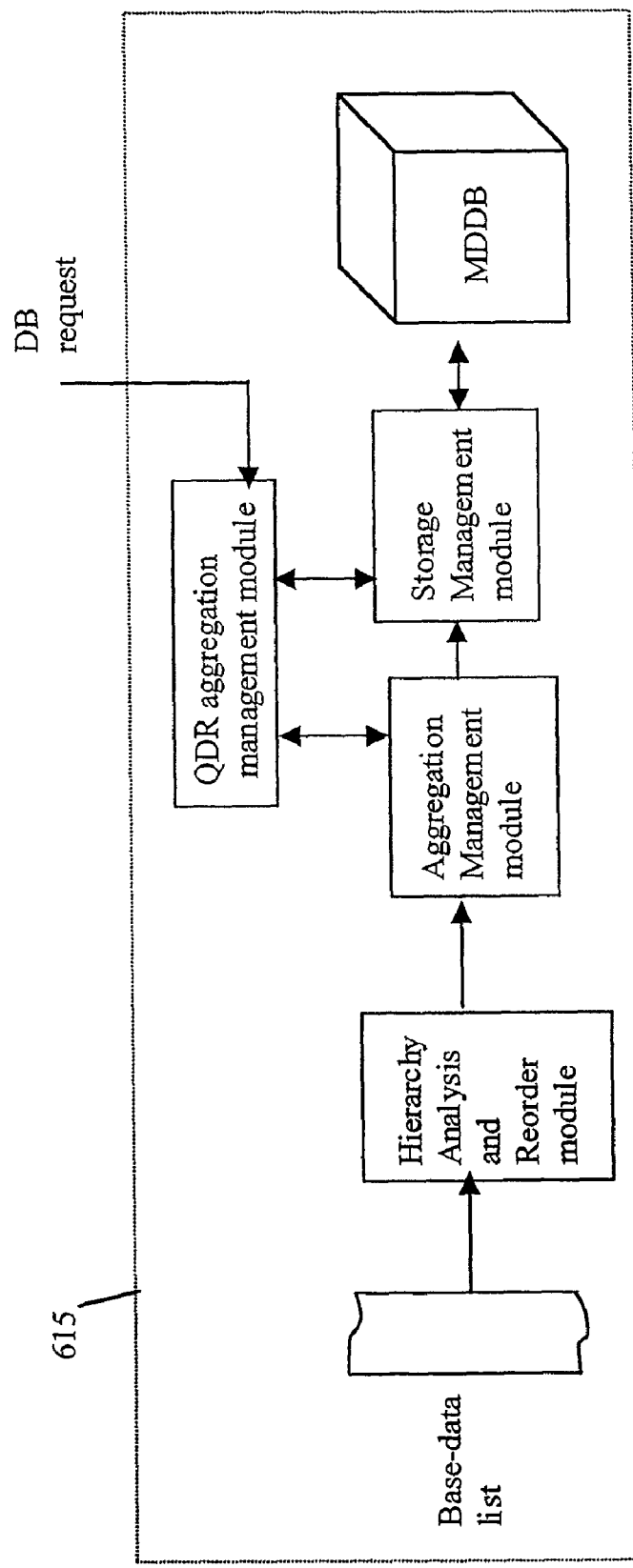
FIG. 6C is a schematic representation of the software modules comprising the aggregation engine and MDDB handler of the stand-alone Aggregation Server of the illustrative embodiment of the present invention, showing a base data list structure being supplied to a hierarchy analysis and reorder module, the output thereof being transferred to an aggregation management module, the output thereof being transferred to a storage module via a storage management module, and a Query Directed Roll-up (QDR) aggregation management module being provided for receiving database (DB) requests from OLAP client machines and managing the operation of the aggregation and storage management modules of the present invention.

FIG. 6C shows the software modules comprising the aggregation engine and MDDB handler components 615 of the stand-alone Aggregation Server 603 of the illustrative embodiment. The base data list, as it arrives from RDBMS or text files, has to be analyzed and reordered to optimize hierarchy handling, according to the unique method of the present invention, as described later with reference to FIGS. 11A and 11B.

Figure 9A:
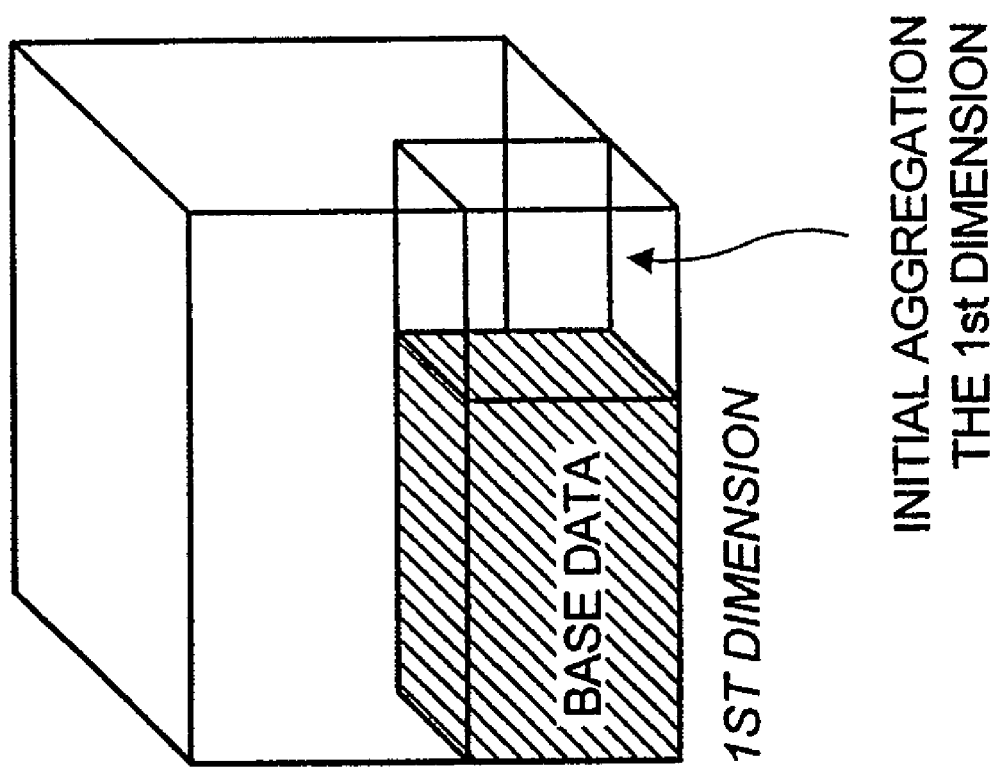
FIG. 9A is a schematic representation of the first stage in the method of segmented aggregation according to the principles of the present invention, showing initial aggregration along the 1st dimension.

The function of the aggregation management module is to administrate the aggregation process according to the method illustrated in FIGS. 9A and 9B.

In accordance with the principles of the present invention, data aggregation within the stand-alone Aggregation Server 603 can be carried out either as a complete pre-aggregation process, where the base data is fully aggregated before commencing querying, or as a query directed roll-up (QDR) process, where querying is allowed at any stage of aggregation using the "on-the-fly" data aggregation process of the present invention. The QDR process will be described hereinafter in greater detail with reference to FIG. 9C. The response to a request (i.e. a basic component of a client query), by calling the Aggregation management module for "on-the-fly" data aggregation, or for accessing pre-aggregated result data via the MDDB Handler module. The query/request serving mechanism of the present invention within the QDR aggregation management module is illustrated in the flow chart of FIG. 6D.

The function of the MDDB Handler (i.e., "management") module is to handle multidimensional data in the MDDB 625 in a very efficient way, according to the novel method of the present invention, which will be described in detail hereinafter with reference to FIGS. 10A and 10B.

Figure 6D:
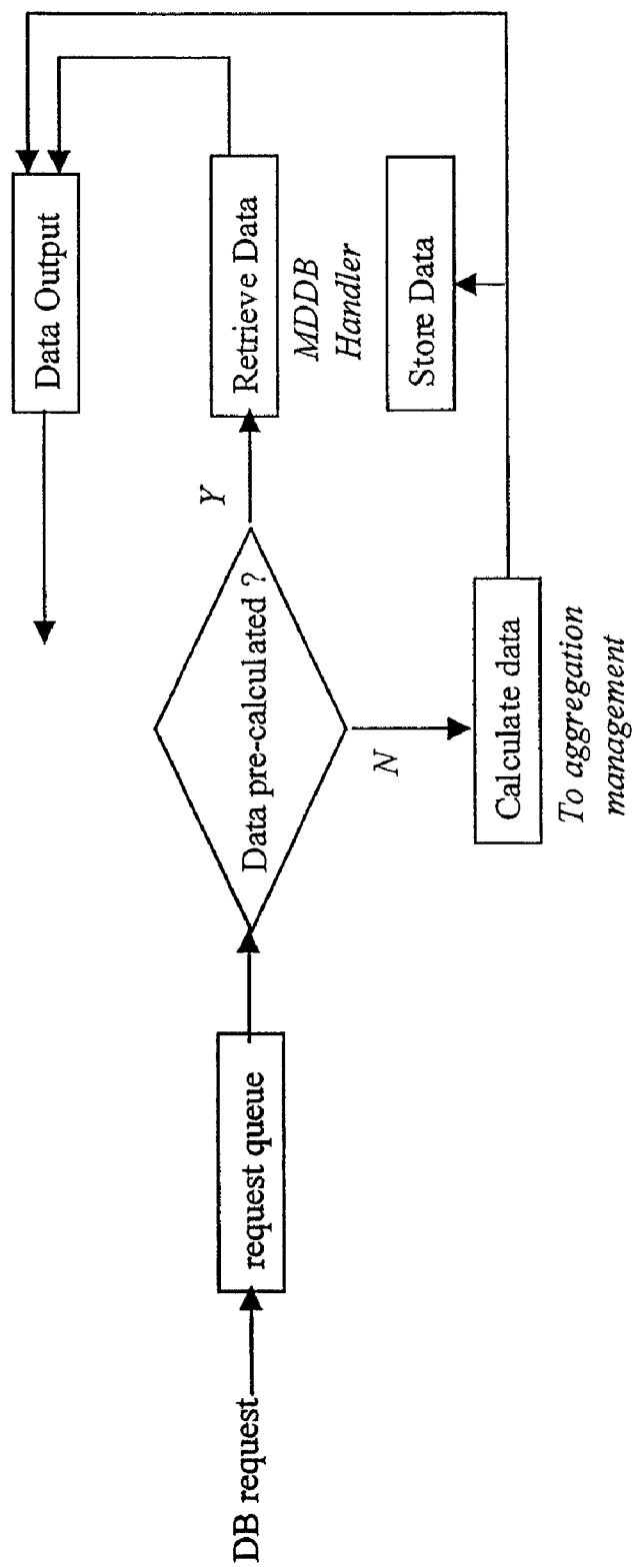
FIG. 6D is a flow chart representation of the primary operations carried out by the (DB) request serving mechanism within the QDR aggregation management module shown in FIG. 6C.
Figure 6E:
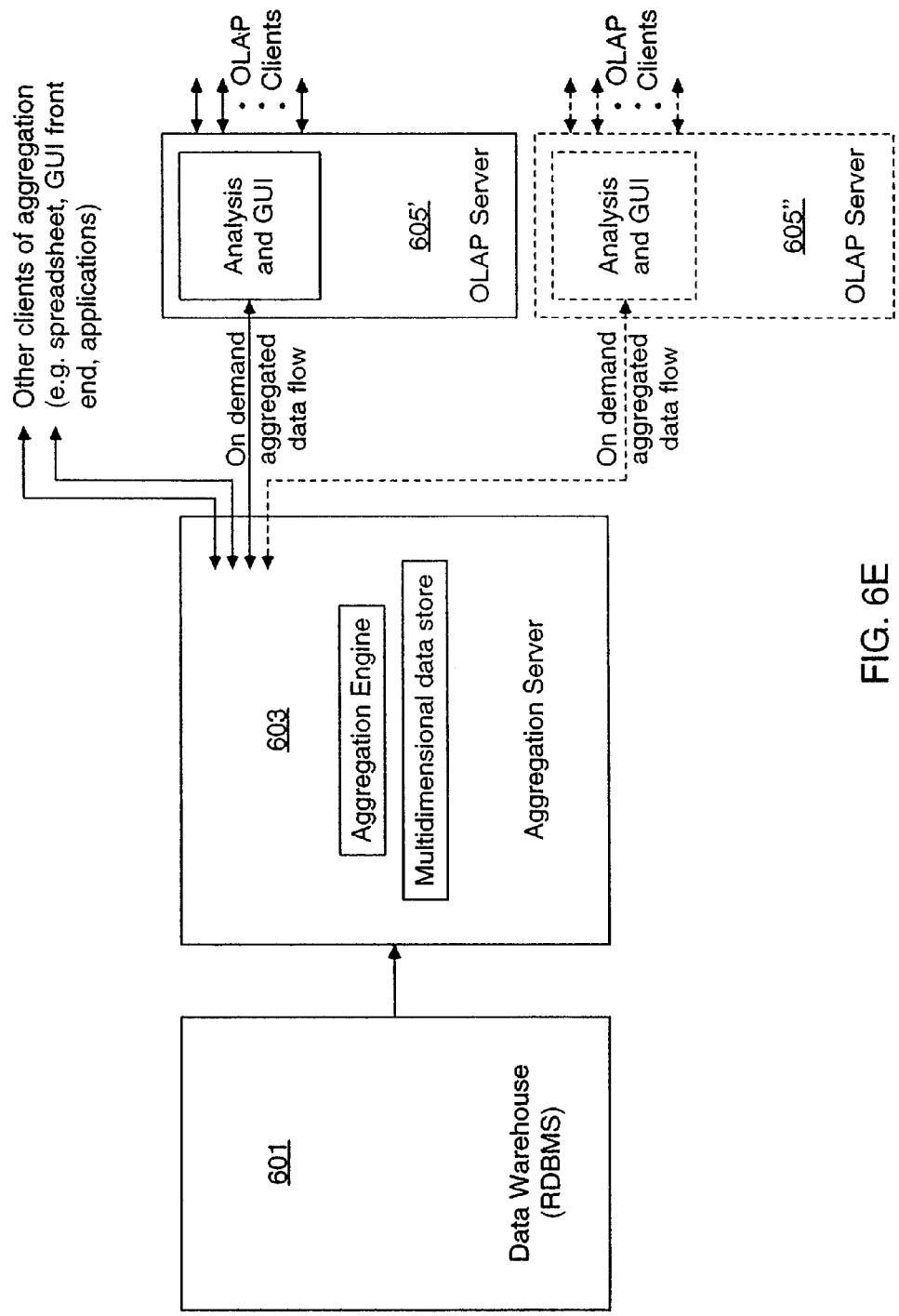
FIG. 6E is a schematic representation of a generalized embodiment of a multidimensional on-line analytical processing (MOLAP) system of the present invention comprising a Data Warehouse realized as a relational database, a stand-alone Aggregration Server of the present invention, having an integrated aggregation engine and MDDB, that is capable of being plugged into (i.e., interfaced to) OLAP servers (two shown) of different users or vendors each supporting a plurality of OLAP clients; the stand-alone Aggregation Server performs aggregation functions (e.g. summation of numbers, as well as other mathematical operations, such as multiplication, subtraction, division etc.) and multi-dimensional data storage functions for such OLAP Server(s)

The request serving mechanism shown in FIG. 6D is controlled by the QDR aggregation management module. Requests are queued and served one by one. If the required data is already pre-calculated, then it is retrieved by the MDDB Handler module and returned to the client (e.g., OLAP Server 605). Otherwise, the required data is calculated "on-the-fly" by the aggregation management module, and the result moved out to the client (e.g., OLAP Server 605), while simultaneously stored by the MDDB Handler module, shown in FIG. 6C.

Figure 7A:
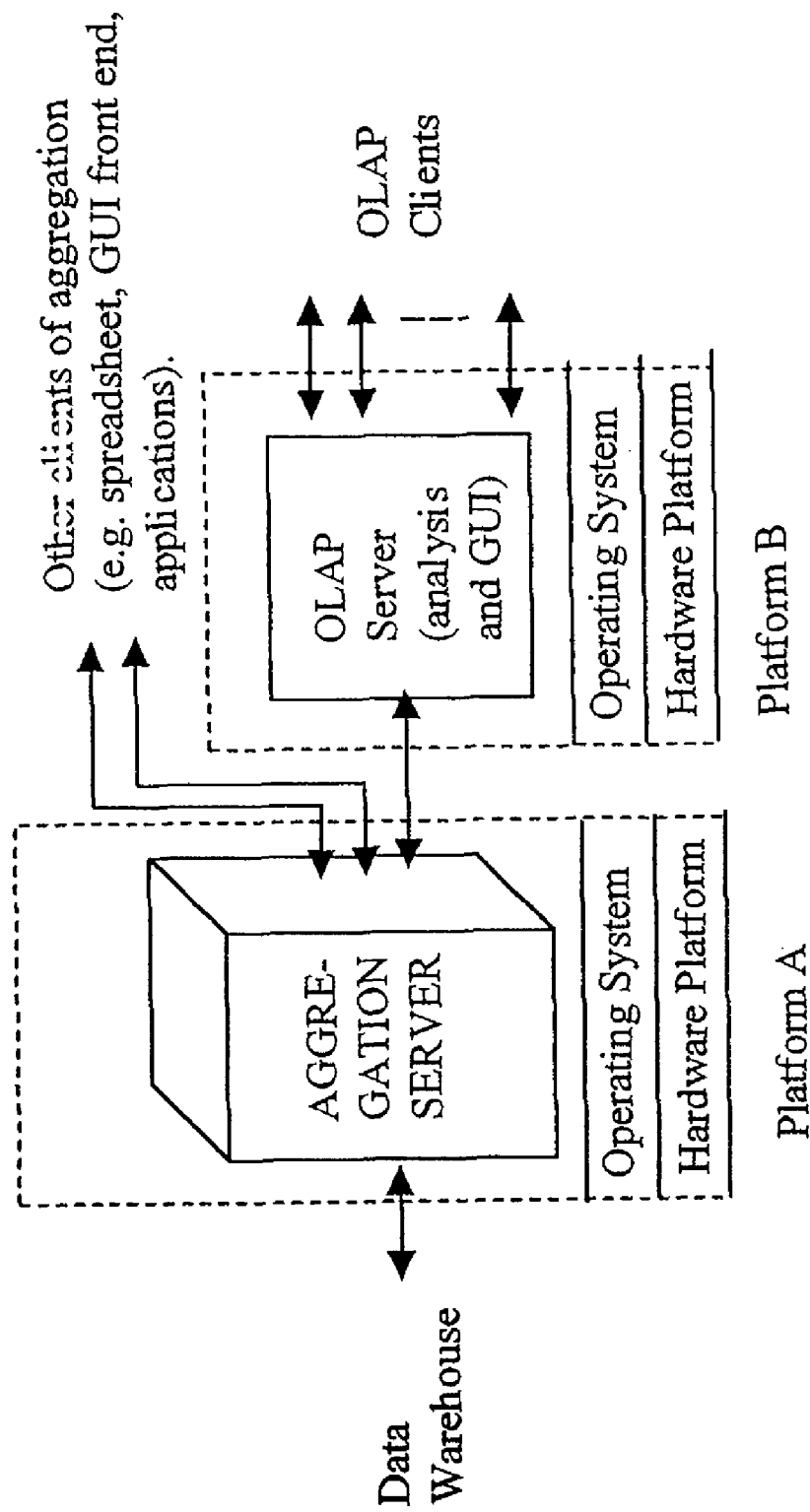
FIG. 7A is a schematic representation of a separate-platform type implementation of the stand-alone Aggregation Server of the illustrative embodiment of FIG. 6B and a conventional OLAP server supporting a plurality of client machines, wherein base data from a Data Warehouse is shown being received by the aggregation server, realized on a first hardware/software platform (i.e. Platform A) and the stand-alone Aggregation Server is shown serving the conventional OLAP server, realized on a second hardware/software platform (i.e. Platform B), as well as serving data aggregation requirements of other clients supporting diverse applications such as spreadsheet, GUI front end, and applications.
Figure 7B:
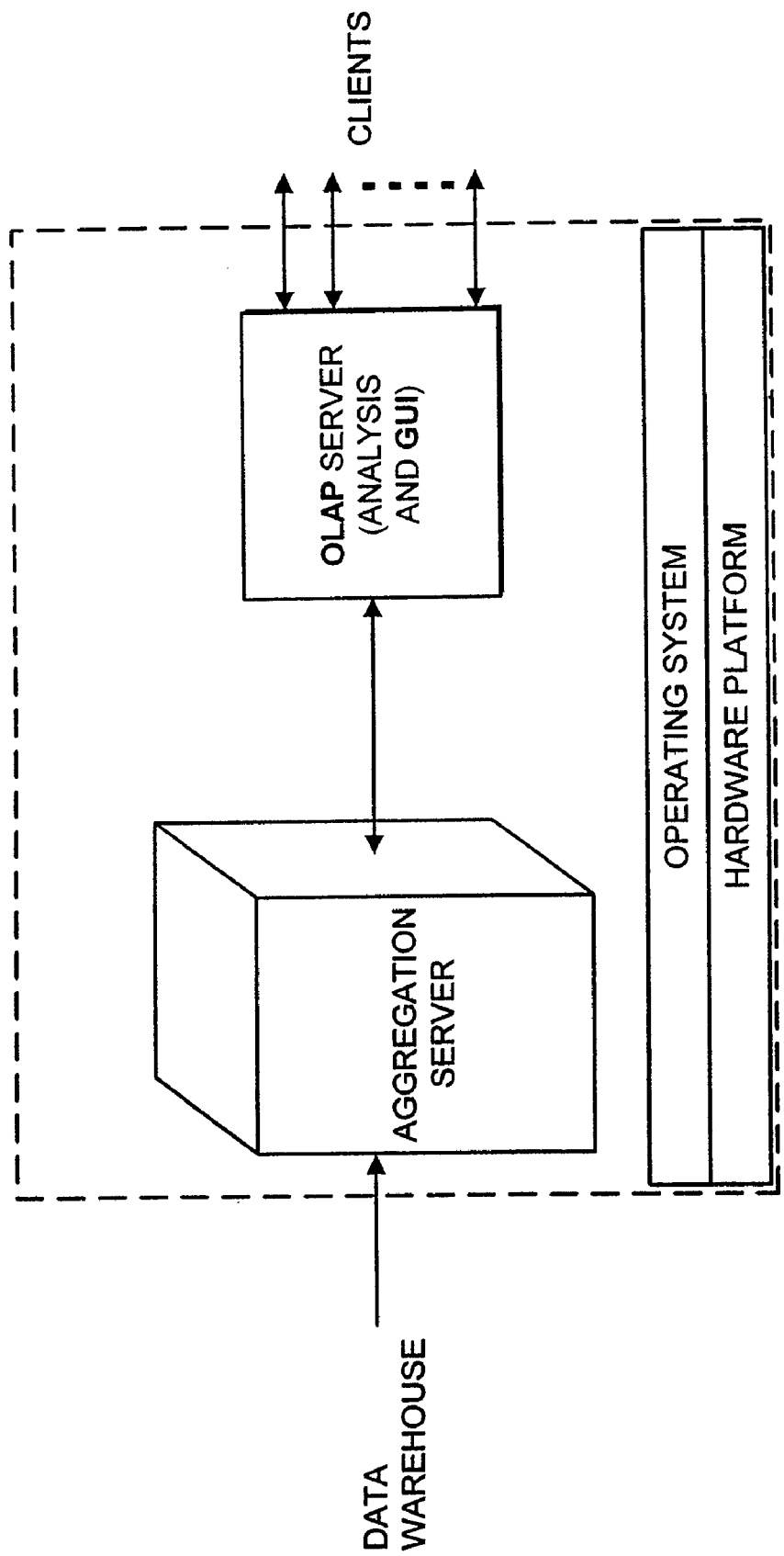
FIG. 7B is a schematic representation of a shared-platform type implementation of the stand-alone Aggregation Server of the illustrative embodiment of FIG. 6B and a conventional OLAP server supporting a plurality of client machines, wherein base data from a Data Warehouse is shown being received by the stand-alone Aggregation Server, realized on a common hardware/software platform and the aggregation server is shown serving the conventional OLAP server, realized on the same common hardware/software platform, as well as serving data aggregation requirements of other clients supporting diverse applications such as spreadsheet, GUI front end, and applications.

FIGS. 7A and 7B outline two different implementations of the stand-alone (cartridge-style) Aggregation Server 603 of the present invention. In both implementations, the Aggregation Server 603 supplies aggregated MDDB results to a client (e.g., OLAP Server 605).

FIG. 7A shows a separate-platform implementation of the MOLAP system of the illustrative embodiment shown in FIG. 6A, wherein the Aggregation Server 603 of the present invention resides on a separate hardware platform and OS system from that used to run the OLAP server 605. In this type of implementation, it is even possible to run the Aggregation Server 603 and the OLAP Server 605 on different-type operating systems (e.g. NT, Unix, MAC OS).

FIG. 7B shows a common-platform implementation of the MOLAP system of the illustrative embodiment shown in FIG. 6B, wherein the Aggregation Server 603 of the present invention shares the same hardware platform and operating system (OS) that used to run the client OLAP Server 605.

FIG. 8A shows a table setting forth the benchmark results of an aggregation engine, implemented on a shared/common hardware platform and OS, in accordance with the principles of the present invention. The common platform and OS is realized using a Pentium II 450 Mhz, 1 GB RAM, 18 GB Disk, running the Microsoft NT operating system. The six (6) data sets shown in the table differ in number of dimensions, number of hierarchies, measure of sparcity and data size. A comparison with ORACLE Express, a major OLAP server, is made. It is evident that the aggregation engine of the present invention outperforms currently leading aggregation technology by more than an order of magnitude.

The segmented data aggregation method of the present invention is described in FIGS. 9A through 9C2. These figures outline a simplified setting of three dimensions only; however, the following analysis applies to any number of dimensions as well.

The data is being divided into autonomic segments to minimize the amount of simultaneously handled data. The initial aggregation is practiced on a single dimension only, while later on the aggregation process involves all other dimensions.

At the first stage of the aggregation method, an aggregation is performed along dimension 1. The first stage can be performed on more than one dimension. As shown in FIG. 9A, the space of the base data is expanded by the aggregation process.

In the next stage shown in FIG. 9B, any segment along dimension 1, such as the shown slice, can be separately aggregated along the remaining dimensions, 2 and 3. In general, for an N dimensional system, the second stage involves aggregation in N-1 dimensions.

The principle of data segmentation can be applied on the first stage as well. However, only a large enough data set will justify such a sliced procedure in the first dimension. Actually, it is possible to consider each segment as an N-1 cube, enabling recursive computation.

It is imperative to get aggregation results of a specific slice before the entire aggregation is completed, or alternatively, to have the roll-up done in a particular sequence. This novel feature of the aggregation method of the present invention is that it allows the querying to begin, even before the regular aggregation process is accomplished, and still having fast response. Moreover, in relational OLAP and other systems requiring only partial aggregations, the QDR process dramatically speeds up the query response.

The QDR process is made feasible by the slice-oriented roll-up method of the present invention. After aggregating the first dimension(s), the multidimensional space is composed of independent multidimensional cubes (slices). These cubes can be processed in any arbitrary sequence.

Consequently the aggregation process of the present invention can be monitored by means of files, shared memory sockets, or queues to statically or dynamically set the roll-up order.

In order to satisfy a single query coming from a client, before the required aggregation result has been prepared, the QDR process of the present invention involves performing a fast on-the-fly aggregation (roll-up) involving only a thin slice of the multidimensional data.

Figure 1B:
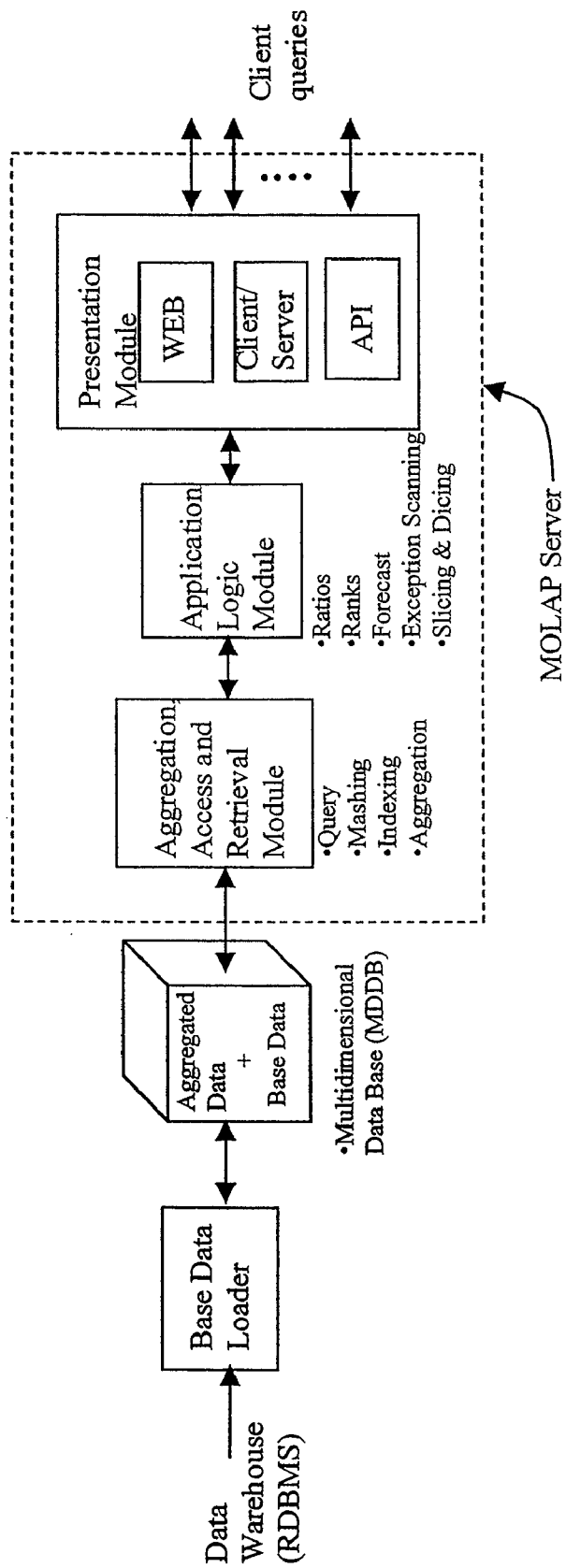
FIG. 1B is a schematic representation of a generalized embodiment of a prior art multidimensional on-line analytical processing (MOLAP) system comprising a base data loader for receiving atomic (i.e. base) data from a Data Warehouse realized by an RDBMS, an OLAP multidimensional database (MDDB), an aggregation, an access and retrieval module, an application logic module and a presentation module associated with a conventional OLAP sever (e.g. Oracle's Express Server) for supporting on-line transactional processing (OLTP) operations on the MDDB, to service database queries and requests from a plurality of OLAP client machines typically accessing the system from an information network (e.g. the Internet)
Figure 2A:
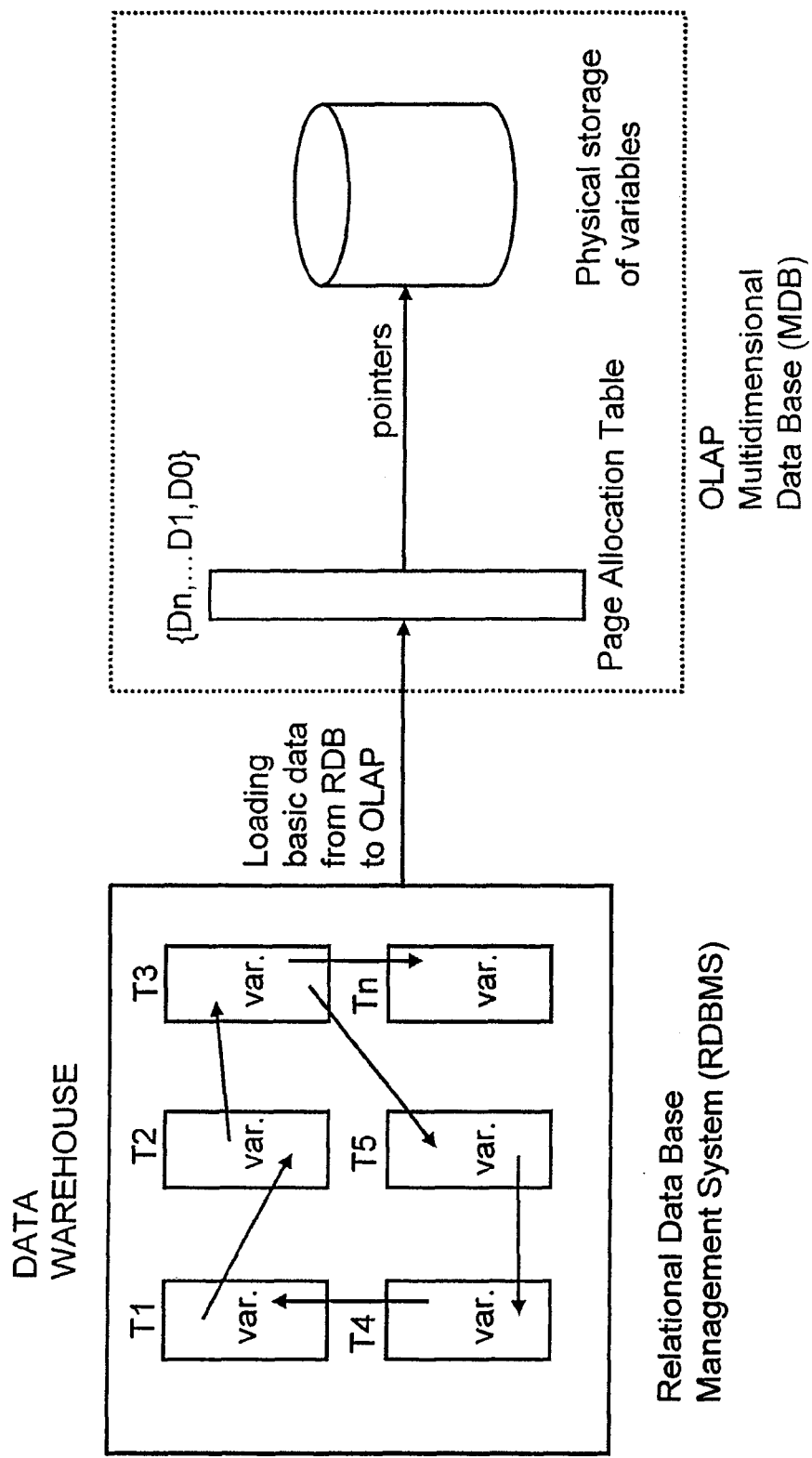
FIG. 2A is a schematic representation of the Data Warehouse shown in the prior art system of FIG. 1B comprising numerous data tables (e.g. T1, T2, . . . Tn) and data field links, and the OLAP multidimensional database shown of FIG. 1B, comprising a conventional page allocation table (PAT) with pointers pointing to the physical storage of variables in an information storage device.
Figure 2B:
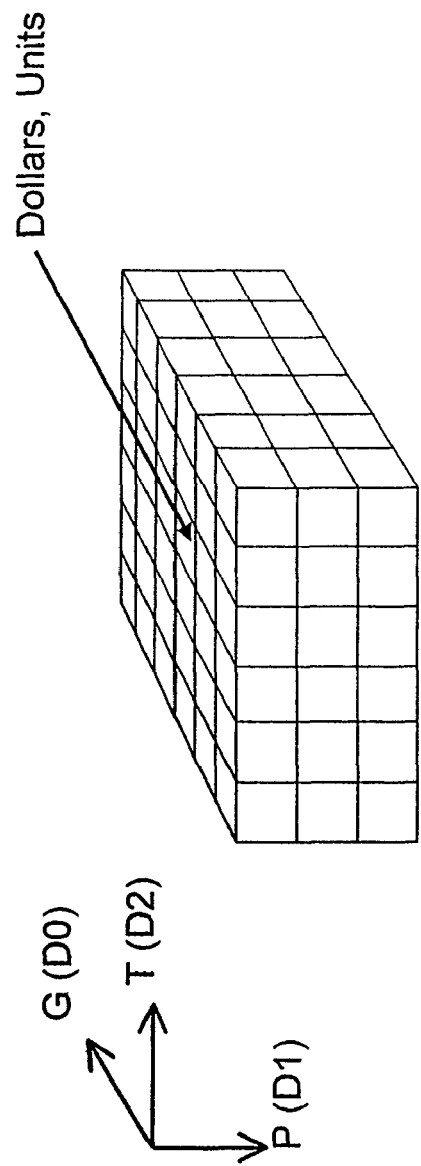
FIG. 2B is a schematic representation of an exemplary three-dimensional MDDB and organized as a 3-dimensional Cartesian cube and used in the prior art system of FIG. 2A, wherein the first dimension of the MDDB is representative of geography (e.g. cities, states, countries, continents), the second dimension of the MDDB is representative of time (e.g. days, weeks, months, years), the third dimension of the MDDB is representative of products (e.g. all products, by manufacturer), and the basic data element is a set of variables which are addressed by 3-dimensional coordinate values.
Figure 2C:
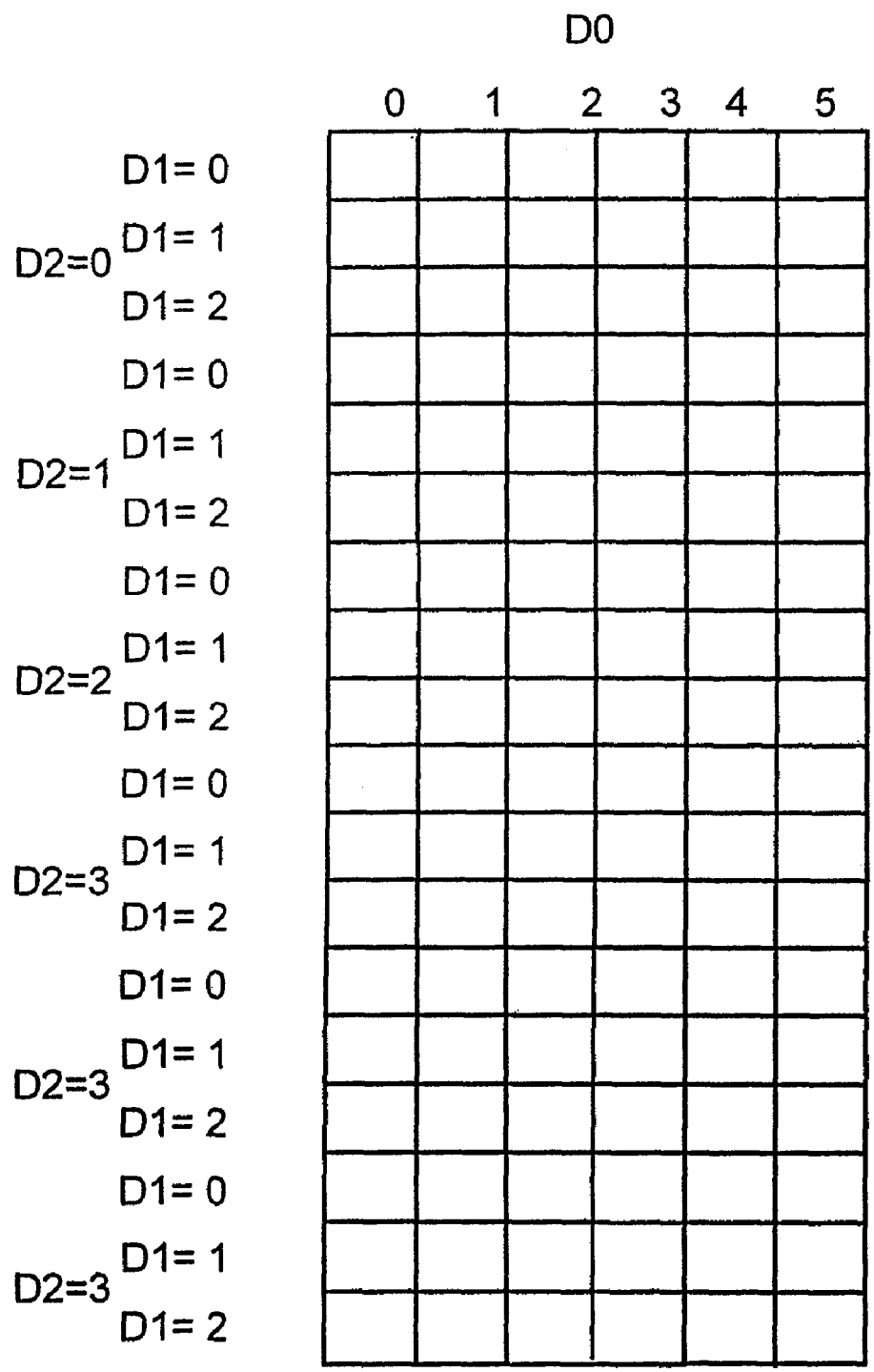
FIG. 2C is a schematic representation of a prior art array structure associated with an exemplary three-dimensional MDDB, arranged according to a dimensional hierarchy.
Figure 2D:
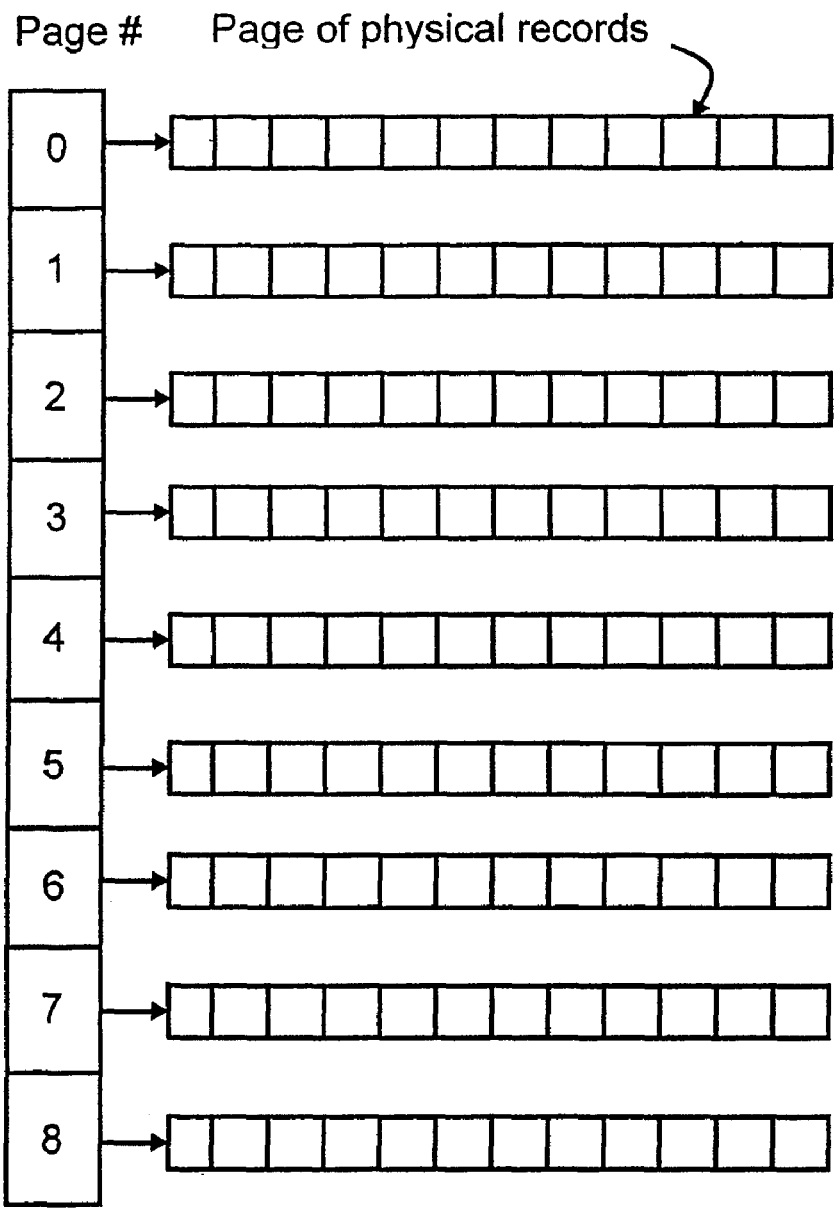
FIG. 2D is a schematic representation of a prior art page allocation table for an exemplary three-dimensional MDDB, arranged according to pages of data element addresses.
Figure 3A:
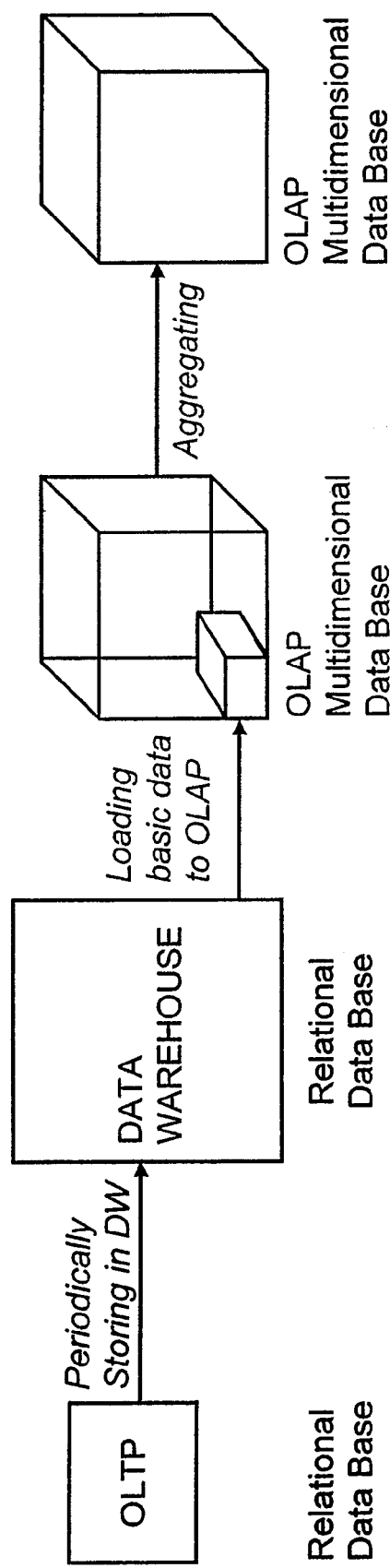
FIG. 3A is a schematic representation of a prior art MOLAP system, illustrating the process of periodically storing raw data in the RDBMS Data Warehouse thereof, serially loading of basic data from the Data Warehouse to the MDDB, and the process of serially pre-aggregating (or pre-compiling) the data in the MDDB along the entire dimensional hierarchy thereof.
Figure 3B:
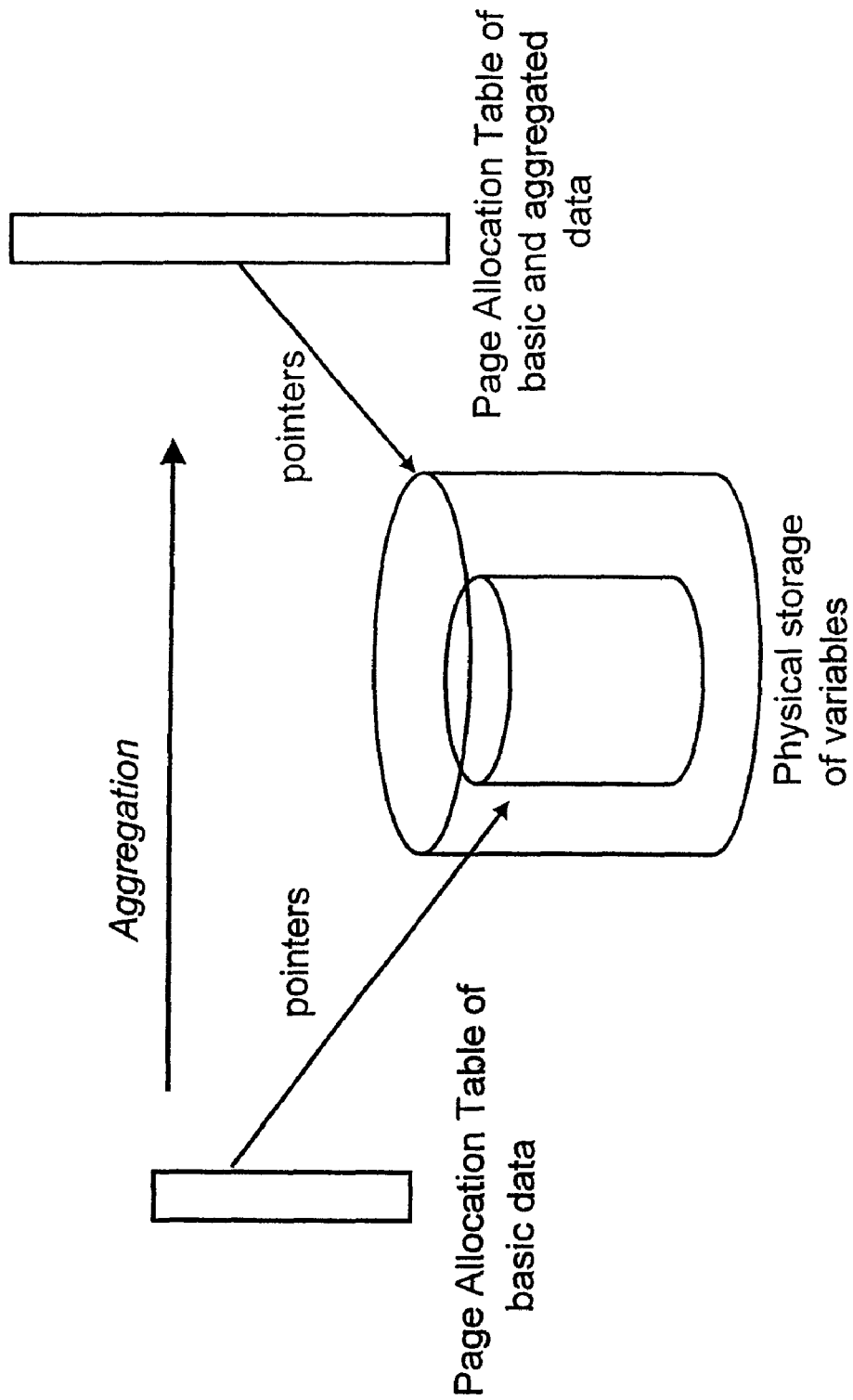
FIG. 3B is a schematic representation illustrating that the Cartesian addresses listed in a prior art page allocation table (PAT) point to where physical storage of data elements (i.e. variables) occurs in the information recording media (e.g. storage volumes) associated with the MDDB, during the loading of basic data into the MDDB as well as during data preaggregation processes carried out therewithin.
Figure 4:
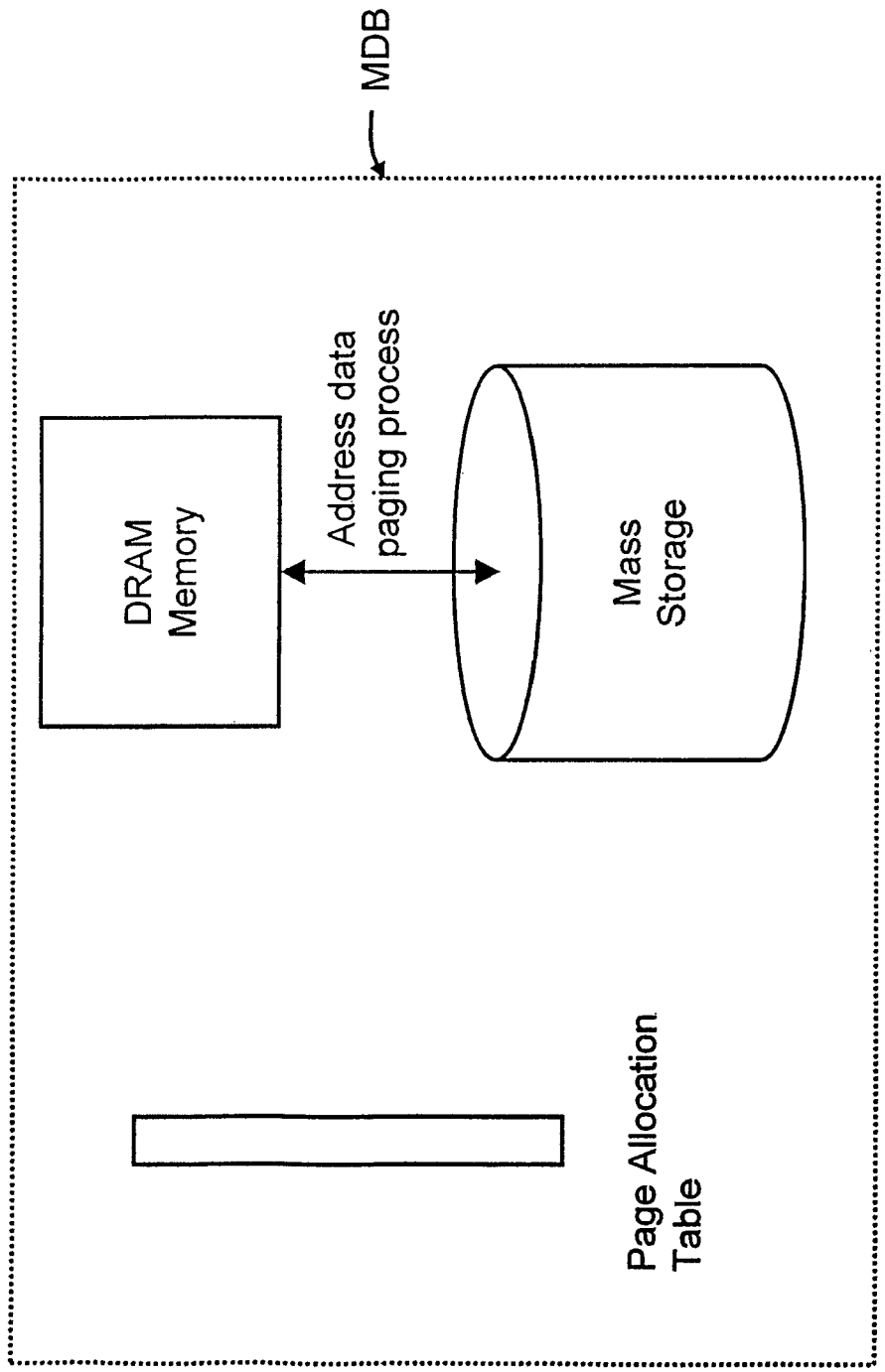
FIG. 4 is a schematic representation illustrating that, for very large prior art MDDBs, very large page allocation tables (PATs) are required to represent the address locations of the data elements contained therein, and thus there is a need to employ address data paging techniques between the DRAM (e.g. program memory) and mass storage devices (e.g. recording discs or RAIDs) available on the serial computing platform used to implement such prior art MOLAP systems.
Figure 5:
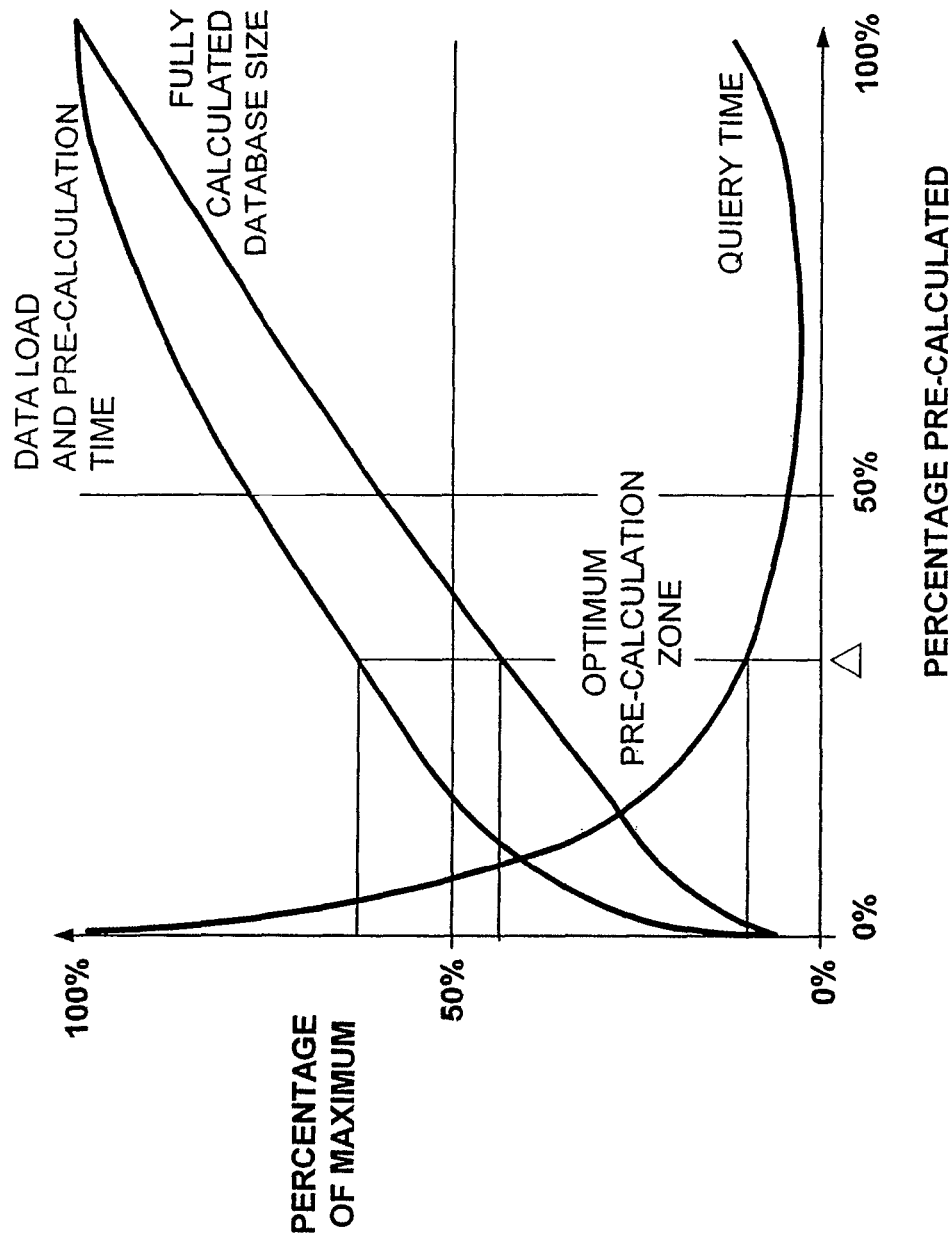
FIG. 5 is a graphical representation showing how search time in a conventional (i.e. prior art) MDDB increases in proportion to the amount of preaggregation of data therewithin.

FIG. 9C1 shows a slice required for building-up a roll-up result of the $2^{nd}$ dimension. In case 1, as shown, the aggregation starts from an existing data, either basic or previously aggregated in the first dimension. This data is utilized as a basis for QDR aggregation along the second dimension. In case 2, due to lack of previous data, a QDR involves an initial slice aggregation along dimension 3, and thereafter aggregation along the $2^{nd}$ dimension.

FIG. 9C2 shows two corresponding QDR cases for gaining results in the 3d dimension. Cases 1 and 2 differ in the amount of initial aggregation required in $2^{nd}$ dimension.

Figure 10A:
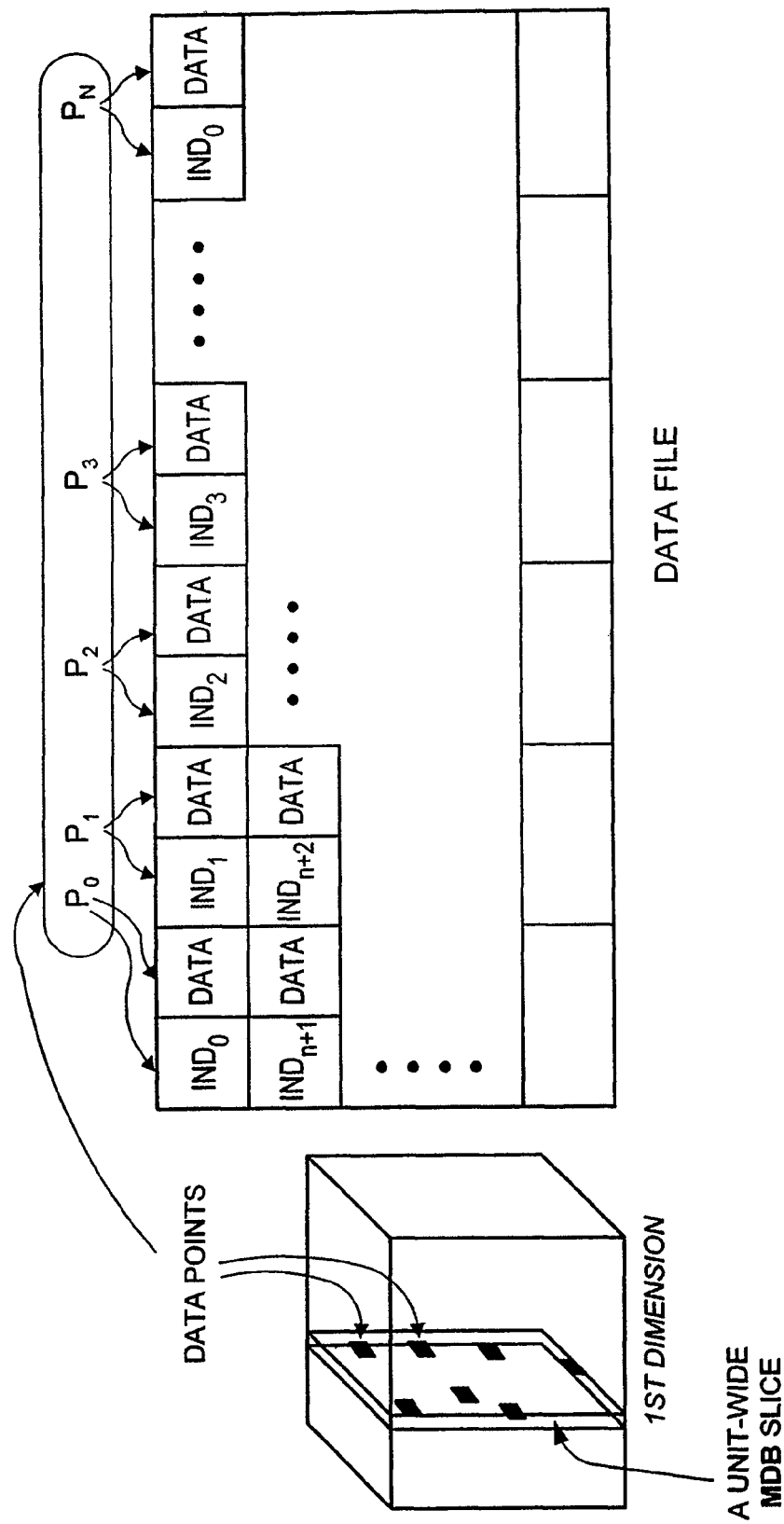
FIG. 10A is a schematic representation of the "slice-storage" method of storing sparse data in the disk storage devices of the MDDB of FIG. 6B in accordance with the principles of the present invention, based on an ascending-ordered index along aggregation direction, enabling fast retrieval of data.

FIG. 10A illustrates the "Slice-Storage" method of storing sparse data on storage disks. In general, this data storage method is based on the principle that an ascending-ordered index along aggregation direction, enables fast retrieval of data. FIG. 10A illustrates a unit-wide slice of the multidimensional cube of data. Since the data is sparse, only few non-NA data points exist. These points are indexed as follows. The Data File consists of data records, in which each n-1 dimensional slice is being stored, in a separate record. These records have a varying length, according to the amount of non-NA stored points. For each registered point in the record, $IND_k$ stands for an index in a n-dimensional cube, and Data stands for the value of a given point in the cube.

Figure 10B:
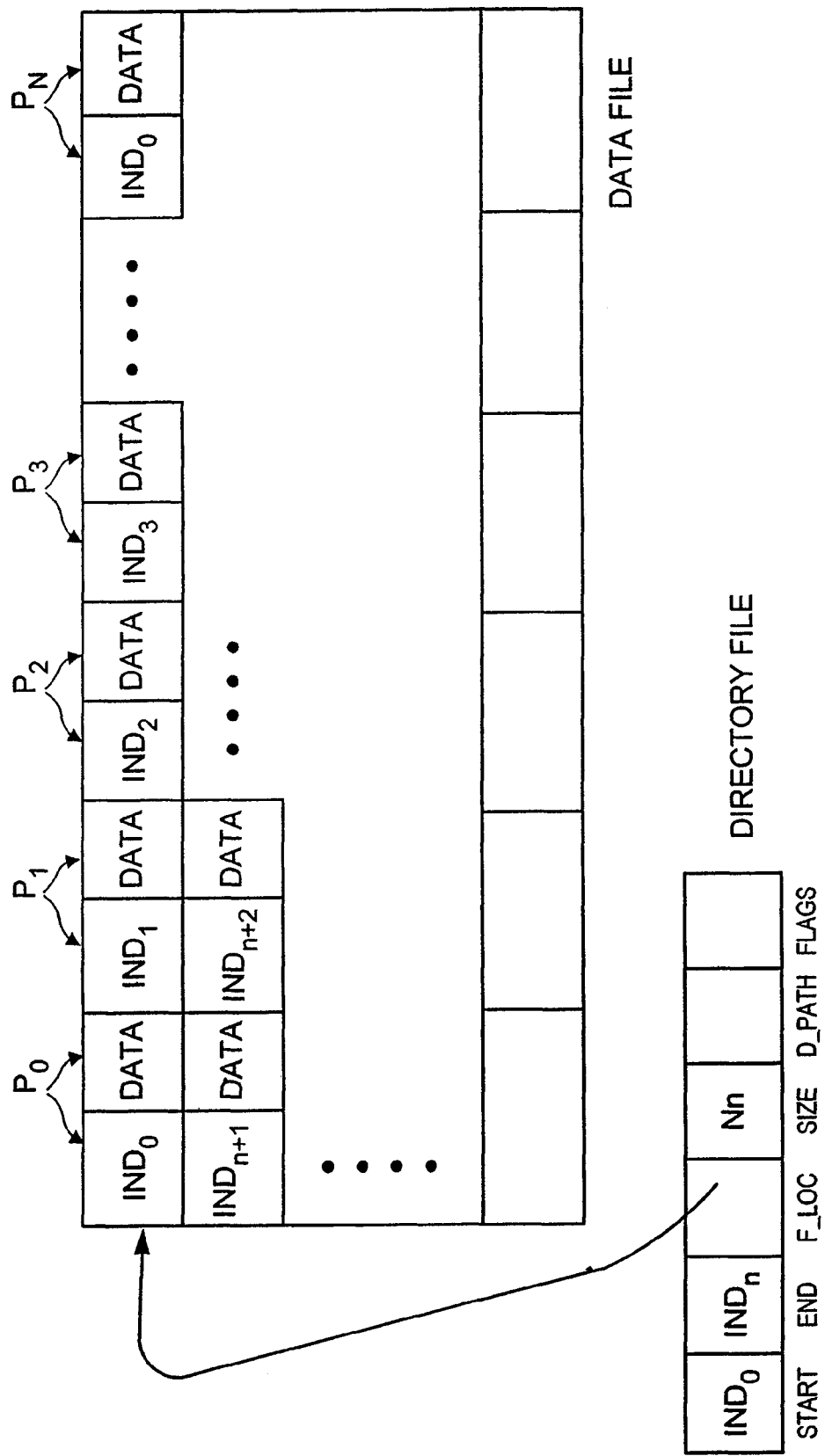
FIG. 10B is a schematic representation of the data organization of data files and the directory file used in the storages of the MDDB of FIG. 6B, and the method of searching for a queried data point therein using a simple binary search technique due to the data files ascending order.

FIG. 10B illustrates a novel method for randomly searching for a queried data point in the MDDB of FIG. 6B by using a novel technique of organizing data files and the directory file used in the storages of the MDDB, so that a simple binary search technique can then be employed within the Aggregation Server of the present invention. According to this method, a metafile termed DIR File, keeps pointers to Data Files as well as additional parameters such as the start and end addresses of data record ($IND_0$, $IND_n$), its location within the Data File, record size (n), file's physical address on disk (D_Path), and auxiliary information on the record (Flags).

A search for a queried data point is then performed by an access to the DIR file. The search along the file can be made using a simple binary search due to file's ascending order. When the record is found, it is then loaded into main memory to search for the required point, characterized by its index $IND_k$. The attached Data field represents the queried value. In case the exact index is not found, it means that the point is a NA.

Figure 11A:
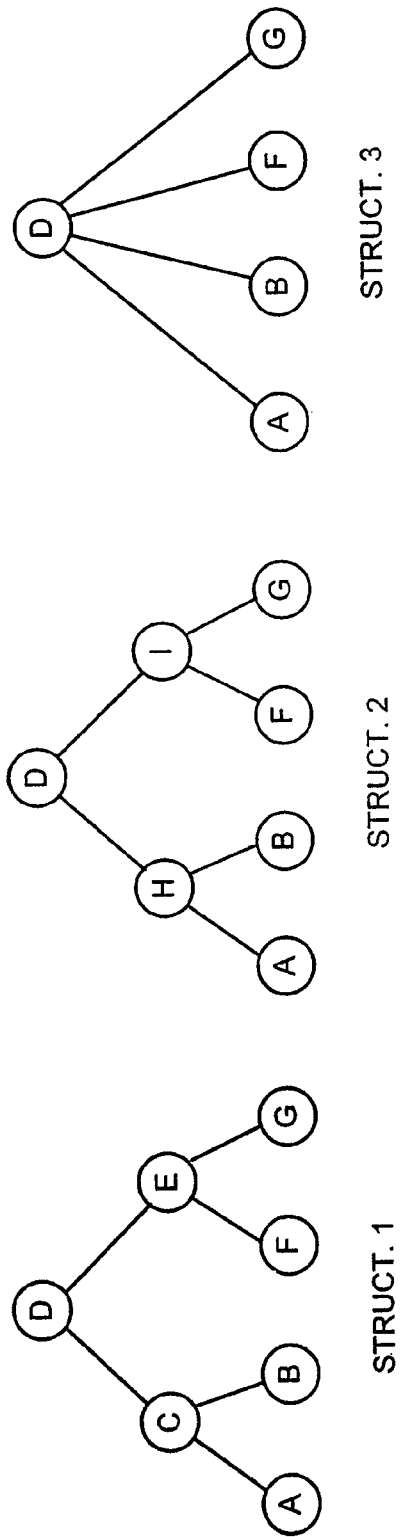
FIG. 11A is a schematic representation of three exemplary multi-hierarchical data structures for storage of data within the MDDB of FIG. 6B, having three levels of hierarchy, wherein the first level representative of base data is composed of items A,B,F, and G, the second level is composed of items C,E,H and I, and the third level is composed of a single item D, which is common to all three hierarchical structures.
Figure 11B:
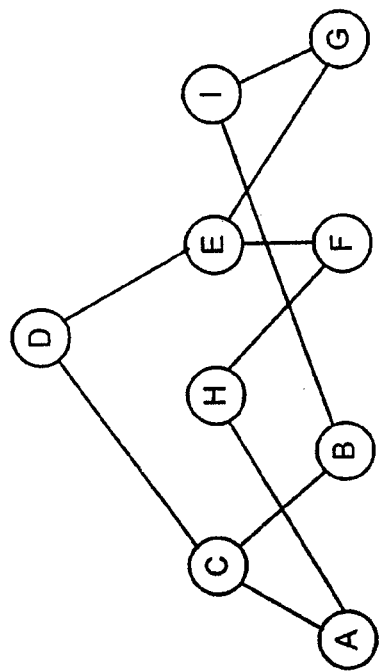
FIG. 11B is a schematic representation of an optimized multi-hierarchical data structure merged from all three hierarchies of FIG. 11A, in accordance with the principles of the present invention.

FIGS. 11A and 11B illustrate a novel method for preprocessing data such that multi-hierarchies in multi-hierarchical structures are optimally merged.

In particular, FIG. 11A illustrates a novel method which the stand-alone Aggregation Server employs for handling hierarchies. According to the devised method, the inner order of hierarchies within a dimension is optimized, to achieve efficient data handling for summations and other mathematical formulas (termed in general "Aggregation"). The order of hierarchy is defined externally. It is brought from a data source to the stand-alone aggregation engine, as a descriptor of data, before the data itself. In the illustrative embodiment, the method assumes hierarchical relations of the data, as shown in FIG. 11A. The way data items are ordered in the memory space of the Aggregation Server, with regard to the hierarchy, has a significant impact on its data handling efficiency.

Notably, when using prior art techniques, multiple handling of data elements, which occurs when a data element is accessed more than once during aggregation process, has been hitherto unavoidable when the main concern is to effectively handle the sparse data. The data structures used in prior art data handling methods have been designed for fast access to a non NA data. According to prior art techniques, each access is associated with a timely search and retrieval in the data structure. For the massive amount of data typically accessed from a Data Warehouse in an OLAP application, such multiple handling of data elements has significantly degraded the efficiency of prior art data aggregation processes. When using prior art data handling techniques, the data element D shown in FIG. 11A must be accessed three times, causing poor aggregation performance.

In accordance with the data handling method of the present present, the data is being pre-ordered for a singular handling, as opposed to multiple handling taught by prior art methods. According to the present invention, elements of base data and their aggregated results are contiguously stored in a way that each element will be accessed only once. This particular order allows a forward-only handling, never backward. Once a base data element is stored, or aggregated result is generated and stored, it is never to be retrieved again for further aggregation. As a result the storage access is minimized. This way of singular handling greatly elevates the aggregation efficiency of large data bases. An efficient handling method as used in the present invention, is shown in FIG. 7A. The data element D, as any other element, is accessed and handled only once.

FIG. 11A shows an example of a multi-hierarchical database structure having 3 hierarchies. As shown, the base data includes the items A, B, F, and G. The second level is composed of items C, E, H and I. The third level has a single item D, which is common to all three hierarchical structures. In accordance with the method of the present invention, a minimal computing path is always taken. For example, according to the method of the present invention, item D will be calculated as part of structure 1, requiring two mathematical operations only, rather than as in structure 3, which would need four mathematical operations. FIG. 11B depicts an optimized structure merged from all three hierarchies.

Figure 12:
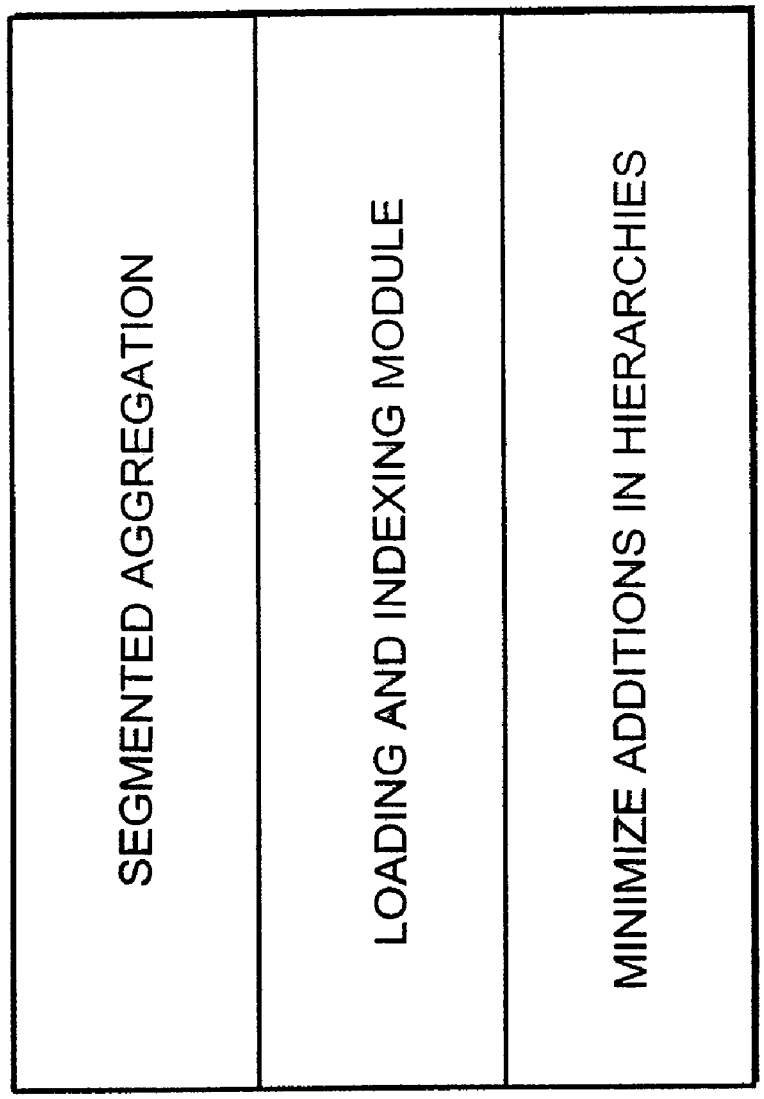
FIG. 12 is a schematic representation showing the levels of operations performed by the stand-alone Aggregation Server of FIG. 6B, summarizing the different enabling components for carrying out the method of segmented aggregation in accordance with the principles of the present invention.

FIG. 12 summarizes the different enabling components for segmented aggregation. The minimized operations in handling multi-hierarchies need analysis of the base data. It greatly optimizes data handling and contribute to aggregation speed. Based on this technology loading and indexing operations become very efficient, minimizing memory and storage access, and speeding up storing and retrieval operations. On top of all the enabling technologies is the segmented aggregation technique, not just outperforming by orders of magnitude the prior-art aggregation algorithms, but also enabling the unique QDR which waves out the need of waiting for full pre-aggregation.

Figure 13:
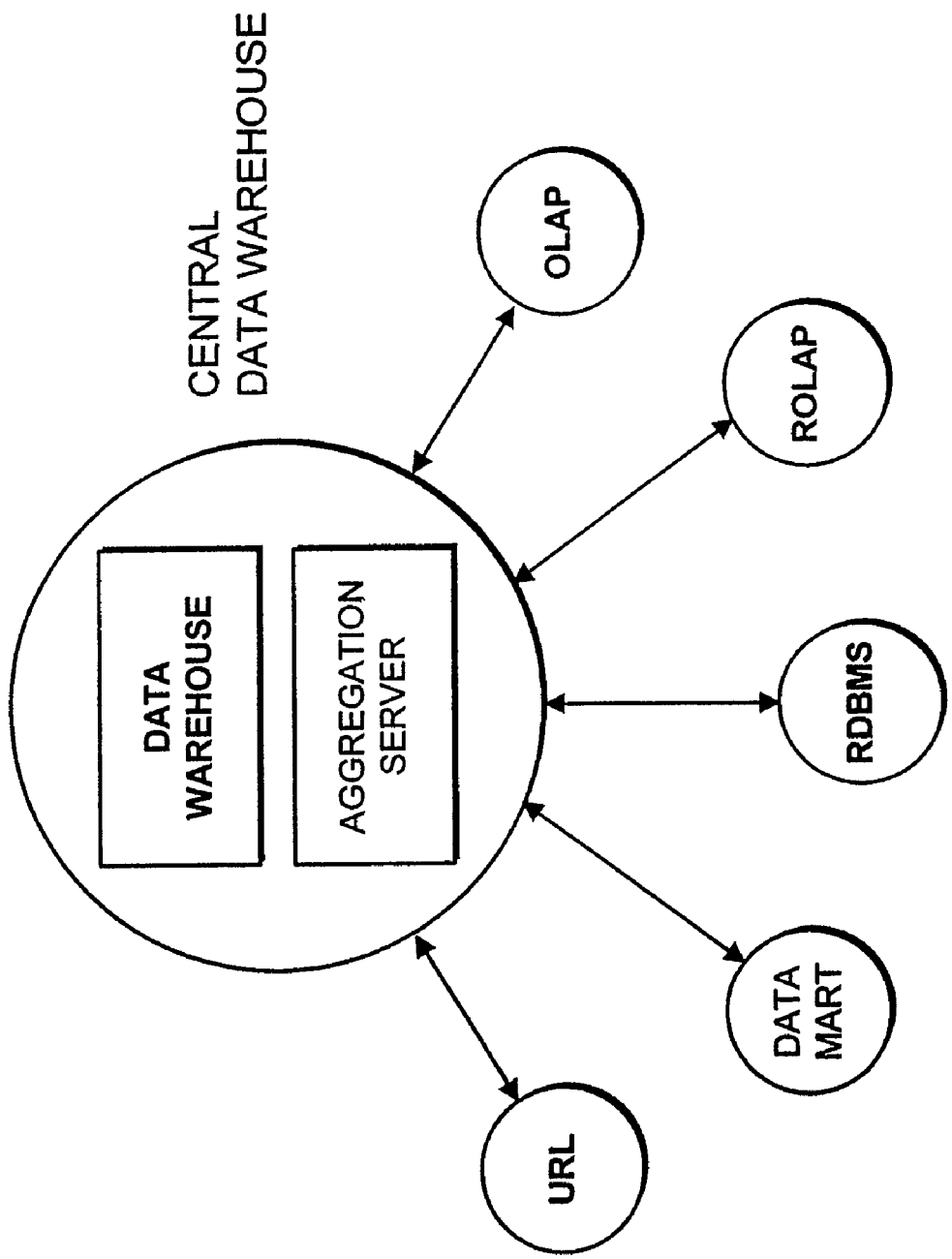
FIG. 13 is a schematic representation of the stand-alone Aggregation Server of the present invention shown as a component of a central data warehouse, serving the data aggregation needs of URL directory systems, Data Marts, RDBMSs, ROLAP systems and OLAP systems alike.

FIG. 13 shows the stand-alone Aggregation Server of the present invention as a component of a central data warehouse, serving the data aggregation needs of URL directory systems, Data Marts, RDBMSs, ROLAP systems and OLAP systems alike.

The reason for the central multidimensional database's rise to corporate necessity is that it facilitates flexible, high-performance access and analysis of large volumes of complex and interrelated data.

A stand-alone specialized aggregation server, simultaneously serving many different kinds of clients (e.g. data mart, OLAP, URL, RDBMS), has the power of delivering an enterprise-wide aggregation in a cost-effective way. This kind of server eliminates the roll-up redundancy over the group of clients, delivering scalability and flexibility.

Performance associated with central data warehouse is an important consideration in the overall approach. Performance includes aggregation times and query response.

Effective interactive query applications require near real-time performance, measured in seconds. These application performances translate directly into the aggregation requirements.

In the prior art, in case of MOLAP, a full pre-aggregation must be done before starting querying. In the present invention, in contrast to prior art, the query directed roll-up (QDR) allows instant querying, while the full pre-aggregation is done in the background. In cases a full pre-aggregation is preferred, the currently invented aggregation outperforms any prior art. For the ROLAP and RDBMS clients, partial aggregations maximize query performance. In both cases fast aggregation process is imperative. The aggregation performance of the current invention is by orders of magnitude higher than that of the prior art.

The stand-alone scalable aggregation server of the present invention can be used in any MOLAP system environment for answering questions about corporate performance in a particular market, economic trends, consumer behaviors, weather conditions, population trends, or the state of any physical, social, biological or other system or phenomenon on which different types or categories of information, organizable in accordance with a predetermined dimensional hierarchy, are collected and stored within a RDBMS of one sort or another. Regardless of the particular application selected, the address data mapping processes of the present invention will provide a quick and efficient way of managing a MDDB and also enabling decision support capabilities utilizing the same in diverse application environments.

Functional Advantages Gained by the Data Aggregation Server of the Present Invention The stand-alone "cartridge-style" plug-in features of the data aggregation server of the present invention, provides freedom in designing an optimized multidimensional data structure and handling method for aggregation, provides freedom in designing a generic aggregation server matching all OLAP vendors, and enables enterprise-wide centralized aggregation.

The method of Segmented Aggregation employed in the aggregation server of the present invention provides flexibility, scalability, a condition for Query Directed Aggregation, and speed improvement.

The method of Multidimensional data organization and indexing employed in the aggregation server of the present invention provides fast storage and retrieval, a condition for Segmented Aggregation, improves the storing, handling, and retrieval of data in a fast manner, and contributes to structural flexibility to allow sliced aggregation and QDR. It also enables the forwarding and single handling of data with improvements in speed performance.

The method of Query Directed Aggregation (QDR) employed in the aggregation server of the present invention minimizes the data handling operations in multi-hierarchy data structures.

The method of Query Directed Aggregation (QDR) employed in the aggregation server of the present invention eliminates the need to wait for full aggregation to be completed, and provides build-up aggregated data required for full aggregation.

It is understood that the System and Method of the illustrative embodiments described hereinabove may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed:

1. A database management system comprising:
a multi-dimensional data store configured to store data in a multi-dimensional data structure; and
a computer system comprising computer hardware, the computer system programmed to implement:
 a query servicing mechanism configured to service one or more database queries, the query servicing mechanism comprising:
  a query processing mechanism configured to process a given database query, the query processing mechanism configured to:
   make a determination of whether servicing the given database query needs data that was previously aggregated;
   upon a determination that servicing the given database query needs data that was not previously aggregated,
    determine a sequence for performing segmented aggregation; and
    dynamically aggregate data in the multi-dimensional data store based at least in part on the determined sequence for performing segmented aggregation, so that aggregated data can be accessed and forwarded to the query processing mechanism for use in servicing the given database query; and
   upon a determination that servicing the given database query needs data that was previously aggregated,
    access and forward the previously aggregated data to the query processing mechanism for use in servicing the given database query.

2. The database management system of claim 1, wherein the query servicing mechanism is implemented in a module within the database management system.

3. The database management system of claim 1, wherein the system is configured to simultaneously store the dynamically aggregated data in the multi-dimensional data store.

4. The database management system of claim 1, wherein the system is configured to aggregate the data by calculating aggregated fact data from fact data according to a multi-dimensional data aggregation process, and storing the aggregated fact data in the multi-dimensional data store.

5. The database management system of claim 1, wherein the aggregation occurs along multiple dimensions.

6. A computer-implemented method comprising:
by a computer system comprising computer hardware:
 receiving one or more database queries from a user;
 determining whether servicing the given database query needs data that was previously aggregated;
 at least partly in response to determining that servicing the given database query needs data that was not previously aggregated,
  determining a sequence for performing segmented aggregation and
  dynamically aggregating data in a multi-dimensional data store based at least in part on the determined sequence for performing segmented aggregation, so that aggregated data can be accessed and forwarded to the user; and
 at least partly in response to determining that servicing the given database query needs data that was previously aggregated,
  accessing and forwarding the previously aggregated data to the user.

7. The method of claim 6, further comprising simultaneously storing the dynamically aggregated data in the multi-dimensional data store.

8. The method of claim 6, wherein the multi-dimensional data store is generated by calculating aggregated fact data from fact data according to a multi-dimensional data aggregation process, and storing the aggregated fact data in the multi-dimensional data store.

9. The method of claim 6, wherein the aggregation occurs along multiple dimensions.

10. A tangible computer-readable medium encoded with instructions thereon, wherein the instructions are readable by a computing device in order to cause the computing device to perform operations comprising:
 receiving one or more database queries from a user;
 determining whether servicing the given database query needs data that was previously aggregated;
 at least partly in response to determining that servicing the given database query needs data that was not previously aggregated,
  determining a sequence for performing segmented aggregation and
  dynamically aggregating data in a multi-dimensional data store based at least in part on the determined sequence for performing segmented aggregation, so that aggregated data can be accessed and forwarded to the user; and
 at least partly in response to determining that servicing the given database query needs data that was previously aggregated,
  accessing and forwarding the previously aggregated data to the user.

11. The tangible computer-readable medium of claim 10, wherein the aggregation occurs along multiple dimensions.

12. The tangible computer-readable medium of claim 10, wherein the multi-dimensional data store is generated by calculating aggregated fact data from fact data according to a multi-dimensional data aggregation process, and storing the aggregated fact data in the multi-dimensional data store.

13. The tangible computer-readable medium of claim 10, wherein the computing device further performs operations comprising simultaneously storing the dynamically aggregated data in the multi-dimensional data store.

* * * * *

UNITED STATES PATENT AND TRADEMARK OFFICE
CERTIFICATE OF CORRECTION

PATENT NO.       : 8,041,670 B2
APPLICATION NO.  : 12/657143
DATED            : October 18, 2011
INVENTOR(S)      : Bakalash et al.

It is certified that error appears in the above-identified patent and that said Letters Patent is hereby corrected as shown below:

Page 4, item (56), under "Other Publications", in Column 1, Line 27, delete "nol. 2;" and insert -- vol. 2; --.

Page 4, item (56), under "Other Publications", in Column 1, Line 37, delete "Web•based" and insert -- Web-based --.

Page 4, item (56), under "Other Publications", in Column 2, Line 2, delete "Post•Newsweek" and insert -- Post-Newsweek --.

Page 4, item (56), under "Other Publications", in Column 2, Line 17, delete "websites" and insert -- website --.

Page 4, item (56), under "Other Publications", in Column 2, Lines 18-19, delete "database" and insert -- databases --.

Page 4, item (56), under "Other Publications", in Column 2, Line 22, delete "ITS" and insert -- IT --.

Page 4, item (56), under "Other Publications", in Column 2, Lines 29-30, delete "Commericial" and insert -- Commercial --.

Page 4, item (56), under "Other Publications", in Column 2, Line 33, delete "Te chnology," and insert -- Technology, --.

Page 4, item (56), under "Other Publications", in Column 2, Line 38, delete "Scalaboloty" and insert -- Scalability --.

Page 4, item (56), under "Other Publications", in Column 2, Line 41, delete "Webs ite Page re: SOL" and insert -- Website Page re: SQL --.

Signed and Sealed this
Twenty-ninth Day of May, 2012

David J. Kappos
*Director of the United States Patent and Trademark Office*

Page 4, item (56), under "Other Publications", in Column 2, Line 45, delete "Abstration," and insert -- Abstraction, --.

Page 5, item (56), under "Other Publications", in Column 2, Line 41, delete "Abstract• Data Base," and insert -- Abstract-Data Base, --.

Page 5, item (56), under "Other Publications", in Column 2, Line 45, delete "Abstract• Data Base," and insert -- Abstract-Data Base, --.

Page 5, item (56), under "Other Publications", in Column 2, Line 64, delete "Abstract•DEXA" and insert -- Abstract-DEXA --.

Page 5, item (56), under "Other Publications", in Column 2, Line 66, delete "Abstract•DEXA" and insert -- Abstract-DEXA --.

Page 6, item (56), under "Other Publications", in Column 1, Line 31, delete "Improving Main Memory Utilization" and insert -- Improving Main Utilization --.

Page 6, item (56), under "Other Publications", in Column 1, Line 63, delete "nD-SQL1:" and insert -- nD-SQL: --.

Page 6, item (56), under "Other Publications", in Column 2, Line 14, delete "Proceddings" and insert -- Proceedings --.

Page 6, item (56), under "Other Publications", in Column 2, Line 15, delete "Scientifice" and insert -- Scientific --.

Page 6, item (56), under "Other Publications", in Column 2, Line 17, delete "Miltidimensional" and insert -- Multidimensional --.

Page 6, item (56), under "Other Publications", in Column 2, Line 42, delete "et ai," and insert -- et al, --.

Page 7, item (56), under "Other Publications", in Column 1, Line 6, delete "What-if'" and insert -- "What-if" --.

Page 7, item (56), under "Other Publications", in Column 1, Line 8, delete "What-if'" and insert -- "What-if" --.

Page 7, item (56), under "Other Publications", in Column 1, Line 32, delete "Patters" and insert -- Patterns --.

Page 7, item (56), under "Other Publications", in Column 1, Line 34, delete "Patters" and insert -- Patterns --.

CERTIFICATE OF CORRECTION (continued)
U.S. Pat. No. 8,041,670 B2

Page 7, item (56), under "Other Publications", in Column 1, Line 35, delete "pp. 48.53." and insert -- pp. 48-53. --.

Page 7, item (56), under "Other Publications", in Column 1, Line 37, delete "Swizerland," and insert -- Switzerland, --.

Page 8, item (56), under "Other Publications", in Column 2, Line 19, delete "OIAP" and insert -- OLAP --.

Page 8, item (56), under "Other Publications", in Column 2, Line 20, delete "OIAP" and insert -- OLAP --.

Page 8, item (56), under "Other Publications", in Column 2, Line 23, delete "OIAP" and insert -- OLAP --.

Page 8, item (56), under "Other Publications", in Column 2, Line 43, delete "Date Engineering" and insert -- Data Engineering --.

Page 8, item (56), under "Other Publications", in Column 2, Line 46, delete "Date Engineering" and insert -- Data Engineering --.

Page 8, item (56), under "Other Publications", in Column 2, Line 61, delete "on" and insert -- On --.

Page 8, item (56), under "Other Publications", in Column 2, Line 63, delete "E-consultancy's" and insert -- e-consultancy's --.

Page 8, item (56), under "Other Publications", in Column 2, Line 67, delete "Ouery" and insert -- Query --.

Page 9, item (56), under "Other Publications", in Column 1, Line 68, delete "Ouery" and insert -- Query --.

Page 9, item (56), under "Other Publications", in Column 1, Line 70, delete "Comptuer" and insert -- Computer --.

Page 9, item (56), under "Other Publications", in Column 2, Line 1, delete "Ouery" and insert -- Query --.

Page 9, item (56), under "Other Publications", in Column 2, Line 3, delete "Comptuer" and insert -- Computer --.

Page 9, item (56), under "Other Publications", in Column 2, Line 18, delete "Workship" and insert -- Workshop --.

Page 9, item (56), under "Other Publications", in Column 2, Line 73, delete "Addison-Wesley, Wesley," and insert -- Addison-Wesley, --.

Page 10, item (56), under "Other Publications", in Column 1, Line 17, delete "Mangement" and insert -- Management --.

Page 10, item (56), under "Other Publications", in Column 1, Line 59, delete "Disseration," and insert -- Dissertation, --.

Page 10, item (56), under "Other Publications", in Column 2, Line 8, delete "pp. 54-49." and insert -- pp. 54-59. --.

Page 10, item (56), under "Other Publications", in Column 2, Line 66, delete "Acm" and insert -- ACM --.

Page 11, item (56), under "Other Publications", in Column 1, Line 34, delete "SQI" and insert -- SQL --.

Page 11, item (56), under "Other Publications", in Column 1, Line 40, delete "Hili," and insert -- Hill, --.

Page 11, item (56), under "Other Publications", in Column 1, Line 64, delete "Csrea" and insert -- CSREA --.

Page 11, item (56), under "Other Publications", in Column 2, Line 5, delete "Oue" and insert -- Que --.

Page 11, item (56), under "Other Publications", in Column 2, Line 18, delete "71-7-52," and insert -- 7-1-7-52, --.

Page 11, item (56), under "Other Publications", in Column 2, Line 57, delete "McGraw-Hili," and insert -- McGraw-Hill, --.

Page 12, item (56), under "Other Publications", in Column 1, Line 65, delete "Sofware" and insert -- Software --.

Page 12, item (56), under "Other Publications", in Column 2, Line 19, delete "Relfex," and insert -- Reflex, --.

Page 12, item (56), under "Other Publications", in Column 2, Line 20, delete "McGraw- Hill," and insert -- McGraw-Hill, --.

Page 12, item (56), under "Other Publications", in Column 2, Line 27, delete "Oue" and insert -- Que --.

Page 12, item (56), under "Other Publications", in Column 2, Line 66, delete "Ouattro" and insert -- Quattro --.

Page 13, item (56), under "Other Publications", in Column 1, Line 24, delete "Ouattro" and insert -- Quattro --.

Page 13, item (56), under "Other Publications", in Column 1, Line 26, delete "Databse" and insert -- Database --.

Page 13, item (56), under "Other Publications", in Column 1, Line 35, delete "Sever" and insert -- Server --.

Page 13, item (56), under "Other Publications", in Column 2, Line 1, delete "Olap" and insert -- OLAP --.

Page 13, item (56), under "Other Publications", in Column 2, Line 13, delete "Sol" and insert -- SQL --.

Page 14, item (56), under "Other Publications", in Column 1, Line 30, delete "pp. 78-72." and insert -- pp. 78-92. --.

Page 14, item (56), under "Other Publications", in Column 1, Line 34, delete "Multidinemsional" and insert -- Multidimensional --.

Page 14, item (56), under "Other Publications", in Column 1, Line 43, delete "U.S. Appl. No." and insert -- U.S. Office Action re Appl. No. --.

Page 14, item (56), under "Other Publications", in Column 1, Line 44, delete "U.S. Appl. No." and insert -- U.S. Final Office Action re Appl. No. --.

Page 14, item (56), under "Other Publications", in Column 1, Line 45, delete "U.S. Appl. No." and insert -- U.S. Office Action re Appl. No. --.

Page 14, item (56), under "Other Publications", in Column 1, Line 52, delete "BrioOuery" and insert -- BrioQuery --.

Page 14, item (56), under "Other Publications", in Column 1, Line 59, delete "No. 12;" and insert -- vol. 2; --.

Page 14, item (56), under "Other Publications", in Column 2, Line 10, delete "Post•Newsweek" and insert -- Post-Newsweek --.

Page 14, item (56), under "Other Publications", in Column 2, Lines 42-43, delete "Commericial" and insert -- Commercial --.

Page 14, item (56), under "Other Publications", in Column 2, Line 51, delete "Scalaboloty" and insert -- Scalability --.

Page 14, item (56), under "Other Publications", in Column 2, Line 54, delete "SOL" and insert -- SQL --.

Page 14, item (56), under "Other Publications", in Column 2, Line 58, delete "Abstration," and insert -- Abstraction, --.

Page 15, item (56), under "Other Publications", in Column 1, Line 2, delete "Ag" and insert -- AG --.

Page 15, item (56), under "Other Publications", in Column 1, Line 2, delete "Vldb" and insert -- VLDB --.

Page 16, item (56), under "Other Publications", in Column 2, Line 12, delete "Edbt" and insert -- EDBT --.

Page 16, item (56), under "Other Publications", in Column 2, Line 28, delete "Proceddings" and insert -- Proceedings --.

Page 16, item (56), under "Other Publications", in Column 2, Line 29, delete "Scientifice" and insert -- Scientific --.

Page 16, item (56), under "Other Publications", in Column 2, Line 31, delete "Miltidimensional" and insert -- Multidimensional --.

Page 16, item (56), under "Other Publications", in Column 2, Line 56, delete "et ai," and insert -- et al, --.

Page 17, item (56), under "Other Publications", in Column 1, Line 58, delete "Patters" and insert -- Patterns --.

Page 17, item (56), under "Other Publications", in Column 1, Line 60, delete "Patters" and insert -- Patterns --.

Page 17, item (56), under "Other Publications", in Column 1, Line 61, delete "pp. 48.53." and insert -- pp. 48-53. --.

Page 17, item (56), under "Other Publications", in Column 1, Line 63, delete "Swizerland," and insert -- Switzerland, --.

Page 18, item (56), under "Other Publications", in Column 1, Line 8, delete "Olap" and insert -- OLAP --.

Page 18, item (56), under "Other Publications", in Column 2, Line 60, delete "OIAP" and insert -- OLAP --.

Page 18, item (56), under "Other Publications", in Column 2, Line 61, delete "OIAP" and insert -- OLAP --.

Page 18, item (56), under "Other Publications", in Column 2, Line 64, delete "OIAP" and insert -- OLAP --.

Page 19, item (56), under "Other Publications", in Column 1, Line 15, delete "Date Engineering" and insert -- Data Engineering --.

Page 19, item (56), under "Other Publications", in Column 1, Line 18, delete "Date Engineering" and insert -- Data Engineering --.

Page 19, item (56), under "Other Publications", in Column 1, Line 43, delete "Ouery" and insert -- Query --.

Page 19, item (56), under "Other Publications", in Column 1, Line 49, delete "Anaylsis" and insert -- Analysis --.

Page 19, item (56), under "Other Publications", in Column 2, Line 59, delete "SOL" and insert -- SQL --.

Page 20, item (56), under "Other Publications", in Column 1, Line 3, delete "Ouery" and insert -- Query --.

Page 20, item (56), under "Other Publications", in Column 1, Line 5, delete "Comptuer" and insert -- Computer --.

Page 20, item (56), under "Other Publications", in Column 1, Line 7, delete "Ouery" and insert -- Query --.

Page 20, item (56), under "Other Publications", in Column 1, Line 9, delete "Comptuer" and insert -- Computer --.

Page 20, item (56), under "Other Publications", in Column 1, Line 39, delete "SQl" and insert -- SQL --.

Page 20, item (56), under "Other Publications", in Column 1, Line 44, delete "Hili," and insert -- Hill, --.

Page 20, item (56), under "Other Publications", in Column 1, Line 71, delete "Oue" and insert -- Que --.

CERTIFICATE OF CORRECTION (continued)
U.S. Pat. No. 8,041,670 B2

Page 20, item (56), under "Other Publications", in Column 2, Line 41, delete "McGraw-Hili," and insert -- McGraw-Hill, --.

Page 20, item (56), under "Other Publications", in Column 2, Line 54, delete "an Kaplan" and insert -- Ari Kaplan --.

Page 21, item (56), under "Other Publications", in Column 1, Line 37, delete "Applicatio.N" and insert -- Application --.

Page 21, item (56), under "Other Publications", in Column 1, Line 38, delete "Sofware" and insert -- Software --.

Page 21, item (56), under "Other Publications", in Column 1, Line 44, delete "SOL" and insert -- SQL --.

Page 21, item (56), under "Other Publications", in Column 1, Line 62, delete "Relfex," and insert -- Reflex, --.

Page 21, item (56), under "Other Publications", in Column 1, Line 68, delete "Oue" and insert -- Que --.

Page 21, item (56), under "Other Publications", in Column 2, Line 27, delete "Ouattro" and insert -- Quattro --.

Page 21, item (56), under "Other Publications", in Column 2, Line 31, delete "SOL" and insert -- SQL --.

Page 21, item (56), under "Other Publications", in Column 2, Line 50, delete "Ouattro" and insert -- Quattro --.

Page 21, item (56), under "Other Publications", in Column 2, Line 56, delete "Databse" and insert -- Database --.

Page 21, item (56), under "Other Publications", in Column 2, Line 60, delete "SOL" and insert -- SQL --.

Page 21, item (56), under "Other Publications", in Column 2, Line 65, delete "Sever" and insert -- Server --.

Page 22, item (56), under "Other Publications", in Column 1, Line 32, delete "SOL" and insert -- SQL --.

Page 22, item (56), under "Other Publications", in Column 1, Line 68, delete "Sypase" and insert -- Sybase --.

CERTIFICATE OF CORRECTION (continued)
U.S. Pat. No. 8,041,670 B2

Page 22, item (56), under "Other Publications", in Column 2, Line 11, delete "Workship" and insert -- Workshop --.

Page 23, item (56), under "Other Publications", in Column 1, Line 10, delete "Mangement" and insert -- Management --.

Page 23, item (56), under "Other Publications", in Column 1, Line 52, delete "Disseration," and insert -- Dissertation, --.

Page 23, item (56), under "Other Publications", in Column 1, Lines 54-55, delete "Petersen, T. B., et al.: "Multidimensional Database Technology", IEEE, vol. 34, No. 12, Dec. 2001, pp. 40-46." and insert -- Pedersen, T.B., Aspects of Data Modeling and Query Processing for Complex Multidimensional Data, 2000, pp. 1-180, Danish Academy of Technical Sciences. --.